US011974705B2

(12) United States Patent
Jones et al.

(10) Patent No.: US 11,974,705 B2
(45) Date of Patent: May 7, 2024

(54) TWO-PIECE FOAM PISTON PUMP

(71) Applicant: OP-Hygiene IP GmbH, Niederbipp (CH)

(72) Inventors: Andrew Jones, St. Anns (CA); Heiner Ophardt, Arisdorf (CH); Zhenchun Shi, Hamilton (CA)

(73) Assignee: OP-Hygiene IP GmbH, Niederbipp (CH)

(*) Notice: Subject to any disclaimer, the term of this patent is extended or adjusted under 35 U.S.C. 154(b) by 137 days.

(21) Appl. No.: 17/729,650

(22) Filed: Apr. 26, 2022

(65) Prior Publication Data

US 2022/0240730 A1 Aug. 4, 2022

Related U.S. Application Data

(63) Continuation of application No. 17/134,615, filed on Dec. 28, 2020, now Pat. No. 11,337,563, which is a continuation of application No. 16/773,430, filed on Jan. 27, 2020, now Pat. No. 10,918,246, which is a continuation of application No. 16/059,612, filed on Aug. 9, 2018, now Pat. No. 10,588,466, which is a continuation of application No. 15/106,720, filed as application No. PCT/CA2014/000903 on Dec. 18, 2014, now Pat. No. 10,105,018.

(30) Foreign Application Priority Data

Dec. 20, 2013 (CA) .................................... 2837774

(51) Int. Cl.

| | |
|---|---|
| ***A47K 5/12*** | (2006.01) |
| ***A47K 5/14*** | (2006.01) |
| ***B05B 11/00*** | (2023.01) |
| ***B05B 11/10*** | (2023.01) |
| ***B67D 3/02*** | (2006.01) |
| ***B67D 7/58*** | (2010.01) |

(52) U.S. Cl.

CPC .............. *A47K 5/14* (2013.01); *A47K 5/1211* (2013.01); *B05B 11/0044* (2018.08); *B05B 11/1087* (2023.01); *B67D 3/02* (2013.01); *B67D 7/58* (2013.01); *A47K 5/1207* (2013.01)

(58) Field of Classification Search

CPC ...... A47K 5/14; A47K 5/1207; A47K 5/1211; A47K 5/1205; A47K 5/1202; A47K 5/122; B05B 11/0016; B05B 11/3087; B05B 11/3001; B05B 11/3097; B05B 11/0059; B05B 11/0044; B05B 11/1087; B67D 7/58; B67D 3/02

USPC ............. 222/181.1, 190, 321.8, 321.9, 181.3

See application file for complete search history.

(56) References Cited

U.S. PATENT DOCUMENTS

| | | | |
|---|---|---|---|
| 3,237,571 | A | 3/1966 | Corsette |
| 3,540,402 | A | 11/1970 | Kocher |
| 4,147,476 | A | 4/1979 | Warren |

(Continued)

FOREIGN PATENT DOCUMENTS

| | | |
|---|---|---|
| CA | 2634981 | 12/2009 |

*Primary Examiner* — Charles P. Cheyney

(74) *Attorney, Agent, or Firm* — Thorpe North & Western, LLP.

(57) ABSTRACT

A piston pump for dispensing fluid from a reservoir, an improved vacuum relief arrangement in which a passageway for flow of air from the atmosphere into the reservoir is provided at least in part through a piston-forming element of the piston pump.

20 Claims, 66 Drawing Sheets

(56) References Cited

U.S. PATENT DOCUMENTS

| | | | | |
|---|---|---|---|---|
| 4,530,449 | A | 7/1985 | Nozawa | |
| 5,016,780 | A | 5/1991 | Moretti | |
| 5,163,588 | A | 11/1992 | Cater | |
| 5,165,577 | A | 11/1992 | Ophardt | |
| 5,282,552 | A * | 2/1994 | Ophardt | B05B 11/1001 417/547 |
| 5,348,189 | A | 9/1994 | Ophardt | |
| 5,445,288 | A * | 8/1995 | Banks | B05B 11/1087 222/105 |
| 5,489,044 | A | 2/1996 | Ophardt | |
| 5,676,277 | A * | 10/1997 | Ophardt | B05B 11/1001 222/541.6 |
| 5,881,927 | A | 3/1999 | Inagawa | |
| 5,975,360 | A | 11/1999 | Ophardt | |
| 6,409,050 | B1 | 6/2002 | Ophardt | |
| 7,303,098 | B2 * | 12/2007 | Backes | B65D 47/18 222/212 |
| 7,303,099 | B2 | 12/2007 | Ophardt | |
| 7,708,166 | B2 | 5/2010 | Ophardt | |
| 7,770,874 | B2 | 8/2010 | Ophardt | |
| 7,815,076 | B2 * | 10/2010 | Ophardt | A47K 5/1202 222/188 |
| 7,823,751 | B2 | 11/2010 | Ophardt | |
| 8,079,497 | B2 | 12/2011 | Brouwer | |
| 8,272,539 | B2 | 2/2012 | Ophardt | |
| 8,267,284 | B2 | 9/2012 | Ray | |
| 8,360,286 | B2 | 1/2013 | Shi et al. | |
| 8,365,965 | B2 | 2/2013 | Ophardt | |
| 8,413,855 | B2 * | 4/2013 | Ophardt | F04B 53/143 222/321.9 |
| 8,474,664 | B2 | 7/2013 | Ophardt | |
| 8,616,418 | B2 * | 12/2013 | Painchaud | B65D 47/2081 222/496 |
| 8,944,294 | B2 | 2/2015 | Ophardt | |
| 9,027,797 | B2 | 5/2015 | Mann | |
| 9,596,963 | B2 * | 3/2017 | Harris | B05B 11/00442 |
| 9,648,990 | B1 * | 5/2017 | Corney | B65D 53/02 |
| 11,820,546 | B2 * | 11/2023 | Pozzi | B65D 47/18 |
| 2005/0205600 | A1 | 9/2005 | Ophardt | |
| 2006/0237483 | A1 | 10/2006 | Ophardt | |
| 2006/0249538 | A1 | 11/2006 | Ophardt | |
| 2009/0314806 | A1 * | 12/2009 | Ray | A47K 5/16 222/145.5 |
| 2010/0260632 | A1 | 10/2010 | Ophardt | |
| 2011/0014076 | A1 | 1/2011 | Shi et al. | |
| 2011/0240680 | A1 | 10/2011 | Ophardt | |
| 2013/0112715 | A1 | 5/2013 | Ophardt | |
| 2015/0291345 | A1 | 10/2015 | Ophardt | |
| 2016/0367084 | A1 | 12/2016 | Mizushima | |

* cited by examiner

TWO-PIECE FOAM PISTON PUMP

RELATED APPLICATION

This application is a continuation of U.S. patent application Ser. No. 17/134,615, filed Dec. 28, 2020 which is a continuation of U.S. patent application Ser. No. 16/773,430, filed Jan. 27, 2020 which issued to U.S. Pat. No. 10,918,246 on Feb. 16, 2021 which is a continuation of U.S. patent application Ser. No. 16/059,612, filed Aug. 9, 2018 which issued to U.S. Pat. No. 10,588,466 on Mar. 17, 2020 which is a continuation of U.S. patent application Ser. No. 15/106,720, filed Jun. 20, 2016 which issued to U.S. Pat. No. 10,105,018 on Oct. 23, 2018 and which claims the benefit of 35 U.S.C. 120.

SCOPE OF THE INVENTION

This invention relates to a piston pump for dispensing fluid as from a container optionally including one or more of: a vacuum relief arrangement for relieving vacuum developed within a container from which fluid is pumped, an arrangement for enhancing the mixing of discharged air with liquid as to produce a foam, and arrangements which facilitate the manufacture of each of a piston chamber forming member and a piston forming element as a unitary element by injection molding.

BACKGROUND OF THE INVENTION

Arrangements are well known in which fluid is dispensed from a fluid containing reservoir. For example, known hand soap dispensing systems provide a reservoir containing liquid soap from which soap is to be dispensed. When the reservoir is enclosed and not collapsible, then on dispensing liquid soap from the reservoir, a vacuum comes to be created in the reservoir. One-way valves are known which permit atmospheric air to enter the reservoir and permit the vacuum in the reservoir to be reduced.

U.S. Pat. No. 5,676,227 to Ophardt, which issued Oct. 14, 1997 and U.S. Pat. No. 7,815,076 to Ophardt, issued Oct. 19, 2010 disclose known one-way air vent vacuum relief valve structures entirely formed by the piston chamber-forming member of a piston pump for vacuum relief of a reservoir independent of the piston.

The inventors of the present invention have appreciated that in the context of many fluid containing reservoirs from which fluid is to be dispensed by piston pumps, that the opening to the reservoir as characterized by the neck of a bottle has a limited cross-sectional area. The inventors of the present invention have appreciated that these known vacuum release arrangements have the disadvantage of utilizing a portion of a cross-sectional area of the neck of a bottle for the provision of an air vent passageway through the piston chamber forming member.

Pump arrangements are known in which a liquid and air are simultaneously passed through a passageway leading to a discharge outlet for example through a foam inducing screen to create and discharge foam. The inventors of the present invention have appreciated that previously known pump arrangement often suffer the disadvantage that they generate foam of varying quality during the course of discharge stroke of the piston pumps.

Piston pump arrangements are known in which a piston-forming element is reciprocally slidable relative a piston chamber forming member. The inventors of the present invention have appreciated that previously known pump arrangement typically suffer the disadvantage that the configurations of each of the piston-forming element and the piston chamber-forming member require each to be made from a multiple of components and that the requirement of multiple components typically complicate manufacture, increases costs, and might be consider necessary to provide advantageous operational characteristics of the pump including consistency of foam produced by the pumps and arrangements for relief of vacuum from containers from which the pumps draw liquid.

SUMMARY OF THE INVENTION

To at least partially overcome some these disadvantages of previously known devices, the present invention provides in a piston pump for dispensing fluid from a reservoir, an improved vacuum relief arrangement in which a passageway for flow of air from the atmosphere into the reservoir is provided at least in part through a piston-forming element of the piston pump.

To at least partially overcome other of these disadvantages of previously known devices, the present invention provides in a piston pump in which a liquid and air are simultaneously passed through a passageway leading to a discharge outlet an arrangement for providing an advantageous restriction to flow in the passageway towards enhancing mixing.

To at least partially overcome other of these disadvantages of previously known devices, the present invention provides configurations for piston pumps advantageously permitting each of the piston forming element and the piston chamber forming member to be manufactured as a unitary element by injection molding.

In one aspect, the present invention provides a pump for dispensing liquid from a reservoir comprising:

piston chamber-forming member having an inner cylindrical chamber and an outer cylindrical chamber, the inner chamber and outer chamber each having a diameter, a chamber wall, an inner end and an outer end, the diameter of the inner chamber being different than the diameter of the outer chamber, the inner chamber and outer chamber being coaxial with the outer end of the inner chamber opening into the inner end of the outer chamber, the inner end of the inner chamber in fluid communication with the reservoir, a piston-forming element received in the piston chamber-forming member axially slidable inwardly and outwardly therein, said piston-forming element being generally cylindrical in cross-section with a central axially extending stem having an inner end and an outer end, a fluid passageway axially through the stem from a fluid outlet at the outer end of the stem to a fluid inlet duct axially inwardly from the fluid outlet, an inner circular flexing disc extending radially outwardly from the stem between the inner end and the outer end of the piston-forming element, the inner flexing disc having an elastically deformable edge portion proximate the chamber wall of the inner chamber circumferentially thereabout, an outer circular flexing disc extending radially outwardly from the stem spaced axially outwardly from the inner flexing disc, the outer flexing disc having an elastically deformable edge portion proximate the chamber wall of the outer chamber circumferentially thereabout, a circular sealing disc extending radially outwardly from the stem spaced axially outwardly from the outer flexing disc, the sealing disc engaging the chamber wall of the outer chamber circumferentially thereabout to prevent fluid flow in the outer chamber past the outer flexing disc in an outward direction therewith on sliding of said piston forming element inwardly and outwardly, the fluid inlet duct is located on the stem between the outer flexing disc and the sealing disc, the piston-forming element slidably received in the piston chamber-forming member for reciprocal axial inward and outward movement therein with the inner flexing disc in the inner chamber and the outer flexing disc and sealing disc in the outer chamber, the inner flexing disc substantially preventing fluid flow in the inner chamber past the inner flexing disc in an inward direction, the outer flexing disc substantially preventing fluid flow in the outer chamber past the outer flexing disc in an inward direction, the inner flexing disc elastically deforming away from the chamber wall of the inner chamber to permit fluid flow in the inner chamber past the inner flexing disc in an outward direction, the outer flexing disc elastically deforming away from the chamber wall of the outer chamber to permit fluid flow in the outer chamber past the outer flexing disc in an outward direction, wherein with reciprocal sliding of the piston-forming element within the piston chamber-forming member fluid from the reservoir is drawn from the reservoir past the inner flexing disc to between the inner flexing disc and the outer flexing disc, and is discharged from between the inner flexing disc and the outer flexing disc past the outer flexing disc and via the fluid outlet duct into the fluid passageway and out the outlet, an air passageway through the piston-forming element from an air vent outlet on the piston-forming element in communication with the reservoir axially inwardly of the inner flexing disc, the air passageway extending through the piston-forming element within the stem of the piston-forming member axially past the inner flexing disc, the outer flexing disc and the sealing disc to an air inlet port on the stem of the piston-forming element axially outwardly of the sealing disc, the air inlet port in communication with atmospheric air, a one-way air vent valve preventing air and fluid flow through the air passageway from the reservoir to the atmosphere, and permitting fluid flow through the air passageway from the atmosphere to the reservoir when atmospheric pressure is greater than a pressure in the reservoir by a pressure differential greater than a threshold pressure.

In another aspect, the present invention provides a piston pump for dispensing from a discharge outlet a liquid from a reservoir admixed with air, the pump comprising:

a piston chamber-forming member disposed about an axis, the piston chamber-forming member having an outer tubular member and a center post member coaxial about the axis with an annular end wall joining an inner end of the outer tubular member and an axially inner end of the center post member, the outer tubular member extending axially outwardly from the end wall to an open outer end of the outer tubular member, the center post member extending axially outwardly from the end wall along an axial extent to a closed outer end of the center post member, the piston chamber-forming member defining a chamber therein within the outer tubular member open axially outwardly at the open outer end of the outer tubular member, the chamber including an annular inner portion between the outer tubular member and the center post member along the axial extent of the center post member, a piston-forming element having a hollow central axially extending stem, the stem having a central passageway through the stem from an axial inner end of the stem to the discharge outlet at an axial outer end of the stem, the stem having a plurality of axially spaced annular members which extend radially outwardly from the stem, the stem of the piston-forming element coaxially slidably received in the chamber of the piston chamber-forming member with the center post member extending axially into the central passageway of the stem through the axial inner end of the stem and the annular members extending radially outwardly from the stem towards the outer tubular member;

a flow space defined within the central passageway between the center post member and the stem providing an axial passage for fluid between the center post member and the stem, the piston-forming element coaxially slidably received in the piston chamber-forming member for reciprocal axial inward and outward movement in a cycle of operation between an extended position and a retracted position, the cycle of operation including a retraction stroke from the extended position to the retracted position and an extension stroke from the retracted position to the extended position, a pair of the annular members on the stem cooperating with axially spaced portions of the outer tubular member of different diameters to provide a variable volume liquid compartment of a stepped chamber liquid piston pump which in cycle of operation draws fluid from the reservoir for discharge into the flow space, which variable volume liquid compartment has its volume vary cyclically with movement of the piston-forming element between the retracted position and the extended position in a cycle of operation, at least one of the annular members on the stem axially outwardly of the pair of the annular members cooperating with of the tubular member to provide within the chamber a variable volume air compartment of an air piston pump which variable volume air compartment has its volume vary cyclically with movement of the piston-forming element between the retracted position and the extended position in a cycle of operation, a channel extending radially from an outlet in the passageway wall through the passageway wall of the stem to connect the air compartment with the flow space, the air pump in the cycle of operation drawing air from the atmosphere into the air compartment from the discharge outlet via the passageway, the flow space and the channel and discharging air from the air compartment via the channel into the flow space and through the passageway to out the discharge outlet, in a cycle of operation the liquid pump and the air pump operative to simultaneously discharge the liquid and air axially outwardly past or through of the outlet through the flow space to the discharge outlet, the flow space providing about the outlet of the channel a restriction to flow axially through the flow space which increases the velocity of fluid flowing axially outwardly through the flow space and assists in increasing the mixing of the air with liquid in the restriction of the flow space.

In another aspect, the present invention provides a piston pump for dispensing from a discharge outlet a liquid from a reservoir admixed with air as a foam, the pump comprising:

a piston chamber-forming member disposed about an axis, the piston chamber-forming member having an outer tubular member and a center post member coaxial about the axis with an annular end wall joining an inner end of the outer tubular member and an axially inner end of the center post member, the outer tubular member extending axially outwardly from the end wall to an open outer end of the outer tubular member, the center post member extending axially outwardly from the end wall along an axial extent to a closed outer end of the center post member, the piston chamber-forming member defining a chamber therein within the outer tubular member open axially outwardly at the open outer end of the outer tubular member, the chamber including an annular inner portion between the outer tubular member and the center post member along the axial extent of the center post member, the outer tubular member having a radially inwardly directed circumferential chamber wall over its axial length, the center post member having a radially outwardly directed circumferential post wall over its axial extent, a piston-forming element having a hollow central axially extending stem, the stem having a central passageway through the stem from an axial inner end of the stem to the discharge outlet at an axial outer end of the stem, the central passageway defined within a radially inwardly directed passageway wall of the stem, the stem having a plurality of axially spaced annular members which extend radially outwardly from the stem, the stem of the piston-forming element coaxially slidably received in the chamber of the piston chamber-forming member with the center post member extending axially into the central passageway of the stem through the axial inner end of the stem and the annular members extending radially outwardly from the stem towards the chamber wall;

a foam inducing member in the central passageway axially inwardly of the discharge outlet and axially outwardly of the closed outer end of the center post member, a flow space defined within the central passageway between the post wall of the center post member and the passageway wall of the stem providing an axial passage for fluid between the center post member and the stem, the piston-forming element coaxially slidably received in the piston chamber-forming member for reciprocal axial inward and outward movement in a cycle of operation between an extended position and a retracted position, the cycle of operation including a retraction stroke from the extended position to the retracted position and an extension stroke from the retracted position to the extended position, a pair of the annular members on the stem cooperating with axially spaced portions of the chamber wall of different diameters to provide a variable volume liquid compartment of a stepped chamber liquid piston pump which in cycle of operation draws fluid from the reservoir for discharge into the flow space, which variable volume liquid compartment has its volume vary cyclically with movement of the piston-forming element between the retracted position and the extended position in a cycle of operation, at least one of the annular members on the stem axially outwardly of the pair of the annular members cooperating with of the chamber wall to provide within the chamber a variable volume air compartment of an air piston pump which variable volume air compartment has its volume vary cyclically with movement of the piston-forming element between the retracted position and the extended position in a cycle of operation, a channel extending radially from an outlet in the passageway wall through the passageway wall of the stem to connect the air compartment with the flow space, the air pump in the cycle of operation drawing air from the atmosphere into the air compartment from the discharge outlet via the passageway, the flow space and the channel and discharging air from the air compartment via the channel into the flow space and through the passageway and the foam inducing member to out the discharge outlet, in a cycle of operation the liquid pump and the air pump operative to simultaneously discharge the liquid and air axially outwardly past or through of the outlet through the flow space to the discharge outlet (foam inducing member), the flow space providing about the outlet of the channel a restriction to flow axially through the flow space which increases the velocity of fluid flowing axially outwardly through the flow space and assists in increasing the mixing of the air with liquid in the restriction of the flow space.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
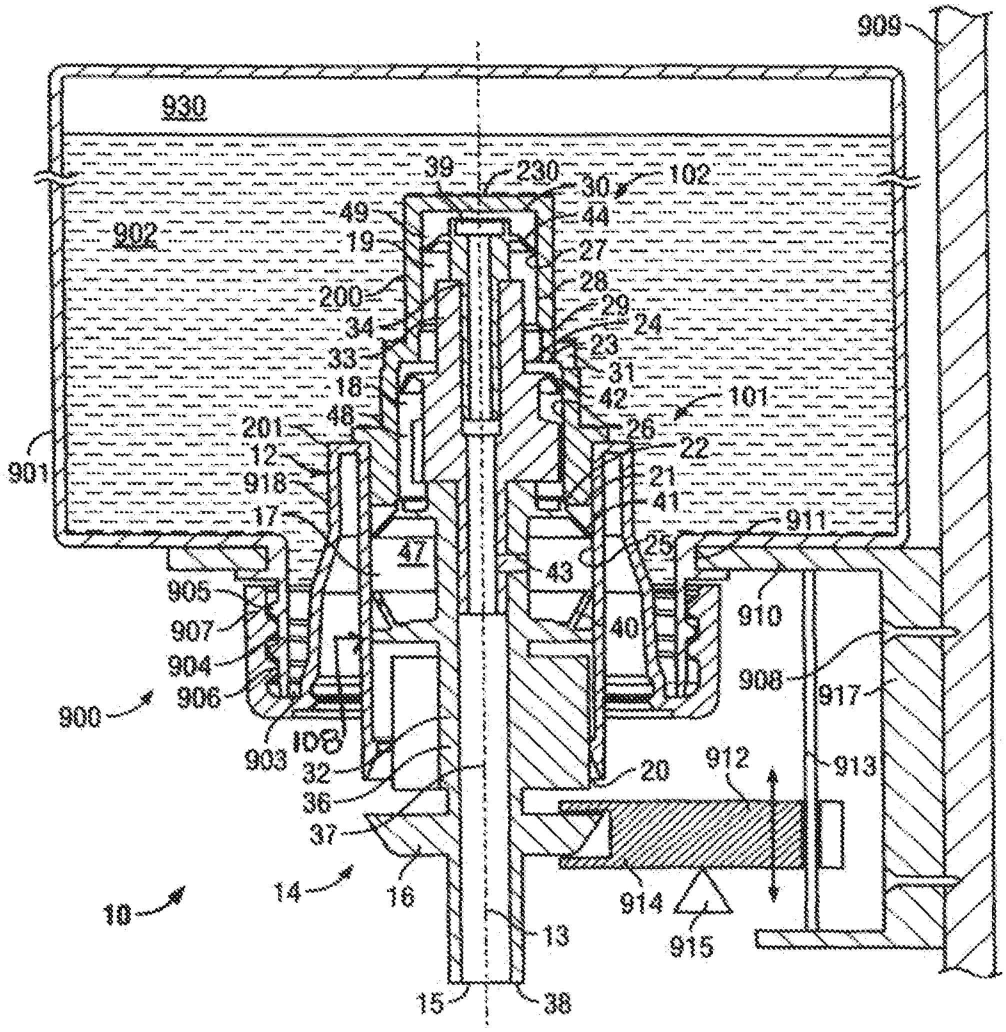
FIG. 1 is a cross-sectional front view schematically illustrating a downwardly dispensing fluid dispenser with a first embodiment of a piston pump in accordance with the present invention in which a piston-forming element of the piston pump is in a fully retracted position.

Reference is made to FIG. 1 which shows a dispensing apparatus 900 in accordance with a first embodiment of the invention including an inverted reservoir or bottle 901 containing fluid 902 to be dispensed below a pocket of air 930 within the bottle. The bottle 900 has an outlet opening 903 and a cylindrical neck 904 about the opening 903 carrying external threads 905. The dispensing apparatus 900 includes a piston pump 10 formed from a piston chamber-forming member 12 and a piston-forming element 14. The piston chamber-forming member 12 is secured to the bottle 901 with internal threads 906 on an outer cylindrical collar 907 of the piston chamber-forming member 12 threadably engaging the external threads 905 on the neck 904. The piston-forming element 14 is coaxially received within the piston chamber-forming member 12 for reciprocal coaxial sliding movement about a common axis 13 to dispense fluid from a discharge outlet 15 of the piston-forming element 14.

FIG. 1 schematically illustrates the dispensing apparatus 900 as including a support structure 917 schematically mounted as by screws 908 to a wall 909 and serving to support the bottle 901 and the piston pump 10 via a horizontally extending support flange 910 engaging in an annular slot 911 defined in the neck 904 of the bottle 901. The support structure 917 is shown to include an actuator member 912 vertically slidably mounted for sliding on a guide rod 913 and having a catch member 914 for removable engagement with an engagement flange 16 carried on the piston-forming element 14. A suitable activating mechanism 915 is schematically shown to reciprocally move the actuator member 912 vertically upwardly and downwardly in a cycle of operation to reciprocally move the piston-forming element 14 relative to the piston chamber-forming member 12. The actuating mechanism 915 may include manually operated levers, electric motors and the like without limitation.

The bottle 901 is not collapsible and does not have any openings into and out of the interior cavity of the bottle other than the outlet opening 903. With the operation of the pump 10, as the fluid 902 within the bottle is withdrawn from the bottle, a vacuum comes to be developed within the bottle 901 which is at a pressure less than the pressure of the atmosphere about the bottle. The bottle 901 may be a rigid bottle, however, the bottle need not be rigid and may be flexible and to some extent collapse. A characteristic of the bottle 901 is that it is non-collapsible meaning that with dispensing of fluid from the bottle in the absence of atmospheric air being vented into the bottle, a vacuum will become developed within the bottle 901.

In accordance with the present invention, novel arrangements are provided to permit atmospheric air to enter the bottle 901 to relieve vacuum within the bottle.

The piston chamber-forming member 12 is coaxial about the common axis 13 and has an outer tubular member 108 that defines coaxial cylindrical chambers of different diameters including a cylindrical liquid outer chamber 17, a cylindrical liquid inner chamber 18 and a cylindrical inner air chamber 19. In FIG. 1, each of the outer chamber 17, inner chamber 18 and air chamber 19 are coaxial about the axis 13. The outer chamber 17 opens axially outwardly at an open outer end 20. The outer chamber 17 has an inner end 21 formed as a radially inwardly extending, axially outwardly directed shoulder through which the inner chamber 18 opens at an outer open end 22 of the inner chamber 18. The inner chamber 18 ends at an inner end 23 formed at a radially inwardly extending, axially outwardly directed shoulder through which an outer end 24 of the air chamber 19 opens outwardly. The outer chamber 17 has a radially inwardly directed wall 25. The inner chamber 18 has a radially inwardly directed wall 26. The air chamber 19 has a radially inwardly directed wall 27. The wall 27 of the air chamber has an inner portion 28 and an outer portion 29 with the diameter of the outer portion 29 being greater than the diameter of the inner portion 28. The air chamber 19 is closed at its inner end 30 by an air chamber end wall 230.

The piston chamber-forming member 12 has a transfer port 31 radially through the wall 26 of the inner chamber 18 proximate the inner end 23 of the inner chamber 18 and proximate the outer end 24 of the air chamber 19. Only one such transfer port 31 is shown however preferably a plurality of similar transfer ports 31 are provided at corresponding circumferential locations about the piston chamber-forming member 12.

The piston chamber-forming member 12 has a stepped chamber-forming portion formed by the walls 25, 26 and 27 of the three chambers 17, 18 and 19, respectively, and closed at an inner end by the air chamber end wall 30. The piston chamber-forming portion is connected via an annular wall 918 to the internally threaded outer cylindrical collar 907. For ease of construction, preferably as shown only in FIG. 1, the piston chamber-forming member 12 is formed from two separate portions 200 and 201.

The piston-forming element 14 is generally cylindrical in cross-section. The piston-forming element 14 is coaxially slidably received within the chambers 17, 18 and 19 of the piston chamber forming member 12 for reciprocal sliding movement inwardly and outwardly. For ease of construction, preferably as shown only in FIG. 1, the piston-forming element 14 is formed from three separate portions fixedly secured together, namely an outer piston portion 32, a middle piston portion 33 and an inner piston portion 34, each of which is preferably injection molded as a unitary element.

The piston-forming element 14 comprises a central hollow piston stem 36 extending along the axis 13. The piston stem 36 has a central passageway 37 from the discharge outlet 15 at the outer end 38 of the piston-forming element 14 through to an inner opening 39 at an inner end 203 of the piston-forming element.

The piston-forming element 14 carries a series of axially spaced annular members which extend radially outwardly from the piston stem 36 and notably indicated as discs 40, 41 and 44. Axially outwardly of the outer end 20 of the outer chamber 17, the piston stem 36 carries the radially outwardly extending engagement flange 16 adapted for engagement to move the piston-forming element axially.

The piston stem 36 carries within the outer chamber 17 a sealing disc 40 and an outer disc 41. The outer disc 41 is carried on the piston stem 36 axially inwardly from the sealing disc 40. The piston stem 36 carries in between the sealing disc 40 and the outer disc 41 a duct 43 providing communication radially through the stem 36 between the passageway 37 at a radial inner end and the interior of the outer chamber 17 at a radial outer end. The piston stem 36 carries within the inner chamber 18 an inner disc 42. The piston stem 36 carries within the air chamber 19 an air vent disc 44.

The sealing disc 40 extends radially outwardly from the piston stem 36 to sealably engage with the wall 25 of the outer chamber 17. The sealing disc 40 has an elastically deformable edge portion proximate the wall 25 of the outer chamber 17 circumferentially thereabout. The sealing disc 40 engages the wall 25 of the outer chamber 17 circumferentially thereabout to prevent fluid flow in the outer chamber 17 axially outwardly pass the sealing disc 40 in an axial outward direction on sliding of the piston chamber-forming element 14 axially inwardly and outwardly.

The outer disc 41 extends radially outwardly from the piston stem 36 to engage the wall 25 of the outer chamber 17. The outer disc 41 includes an elastically deformable edge portion proximate the wall 25 circumferentially thereabout. The outer disc 41 engages the wall 25 of the inner chamber 17 to substantially prevent fluid flow in the outer chamber 17 axially pass the outer disc 41 in an axially inward direction, however, the outer disc 41 is adapted to elastically deform away from the wall 25 of the outer chamber 17 to permit fluid flow in the outer chamber 17 pass the outer disc 41 in an axial outward direction.

The inner disc 42 extends axially outwardly from the piston stem 36 to engage the wall 26 of the inner chamber 18. The inner disc 42 includes an elastically deformable edge portion proximate the wall 26 of the inner chamber 18 circumferentially thereabout. The inner disc 42 is adapted to elastically deform away from the wall 26 of the inner chamber 18 to permit fluid flow in the inner chamber 18 pass the inner disc 42 in an axial outward direction. The inner disc 42 engages the wall 26 of the inner chamber 18 to substantially prevent fluid flow in the inner chamber 18 pass the inner disc 42 in an axially inward direction.

The air vent disc 44 extends radially outwardly from the piston stem 36 to engage the wall 27 of the air chamber 19 axially outwardly of the inner opening 39 of the passageway 37. The air vent disc 44 includes an elastically deformable edge portion proximate the wall 27 of the air chamber 19 circumferentially thereabout. The air vent disc engages the wall 27 of the air chamber 19 to substantially prevent fluid flow in the air chamber pass the air vent disc 44 in an axially inward direction. The air vent disc 44 is adapted to elastically deform away from the wall 27 of the air chamber 19 to permit flow in the air chamber 19 outwardly pass the air vent disc 44 in an axially outward direction.

The inner chamber 18 is in communication with the interior of the bottle 901 at its outer end 24 via the transfer port 31. The stepped configuration of the outer chamber 17 and the inner chamber 18 in combination with piston forming element 12 and its sealing disc 40, outer disc 41 and the inner disc 42 provide a stepped fluid pump generally designated 101.

Within the outer chamber 17, a transfer compartment 47 is defined between the piston stem 36, the sealing disc 40 and the outer disc 41. Within the outer chamber 17 and the inner chamber 18, a liquid compartment 48 is defined between the piston stem 36, intermediate the outer disc 41 and the inner disc 42. Within the air chamber 19 inwardly of the air vent disc 44, an air compartment 49 is defined.

Figure 2:
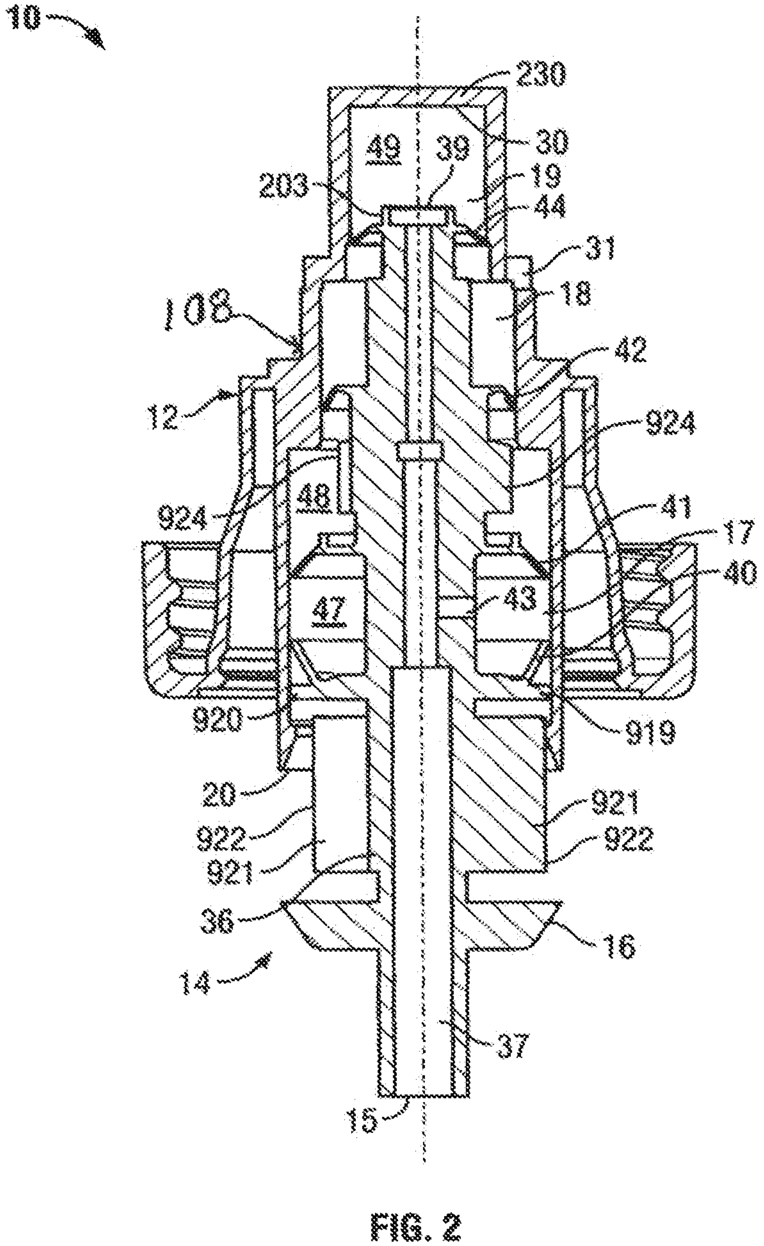
FIG. 2 is a cross-sectional front view of the piston pump of FIG. 1 with the piston-forming element in an intermediate position between the fully retracted position and a fully extended position.
Figure 3:
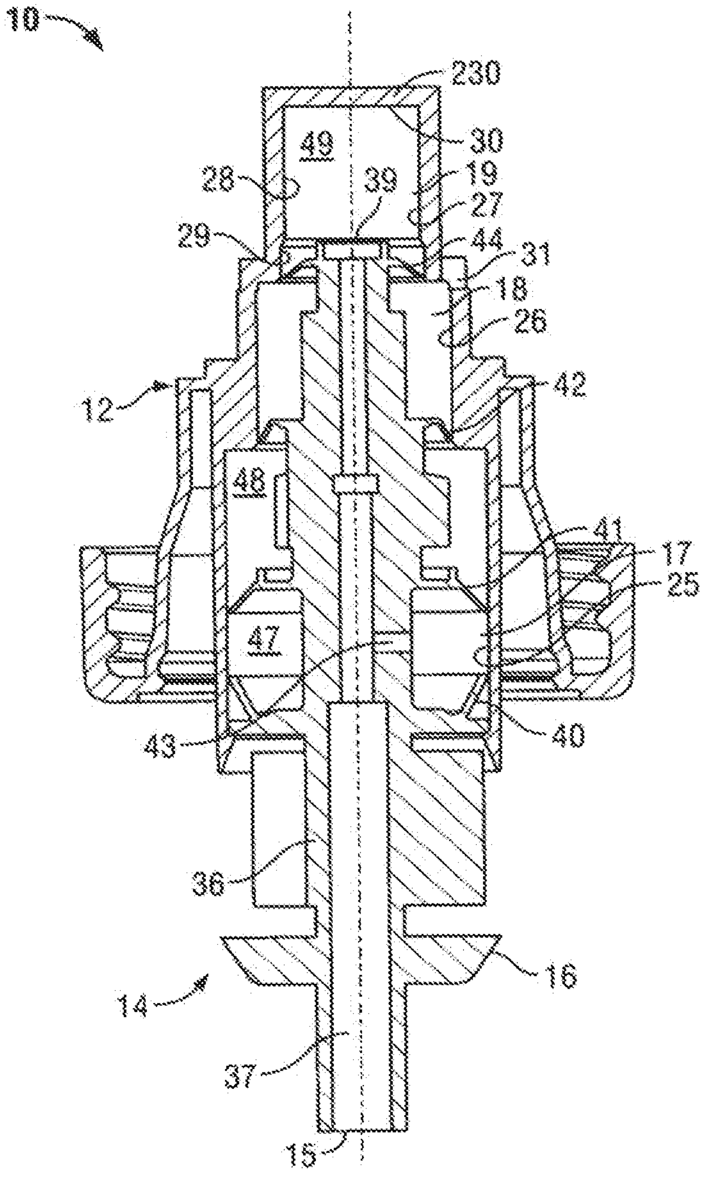
FIG. 3 is a cross-sectional front view of the pump of FIG. 1 with the piston-forming element in the fully extended position.

The operation of the piston pump 10 of the first embodiment of FIGS. 1 to 3 is now explained with reference to a cycle of operation during which the piston-forming element 14 is moved in a withdrawal stroke from the full retracted position shown in FIG. 1 through the intermediate position of FIG. 2 to a fully extended position of FIG. 3 and then in a retraction stroke from the fully extended position of FIG. 3 through the intermediate position of FIG. 2 to the fully retracted position of FIG. 1. In the withdrawal stroke, in movement from the fully retracted position of FIG. 1 to the fully extended position of FIG. 3, since the diameter of the inner chamber 18 is less than the diameter of the outer chamber 17, the volume within the liquid compartment 48 increases creating a vacuum which deflects the inner disc 42 and draws fluid from the bottle 901 via the transfer port 31 into the inner chamber 18 pass the inner disc 42 into the liquid compartment 48. In a retraction stroke on moving the piston-forming element 14 from the fully extended position of FIG. 3 to the fully retracted position of FIG. 1, the volume of the liquid compartment 48 decreases with pressure developed in the liquid compartment 48 between the outer disc 41 and the inner disc 42 causing the outer disc 41 to deflect such that fluid flows axially outwardly pass the outer disc 41 from the liquid compartment 48 to the transfer compartment 47, from the transfer compartment 47 through the duct 43 into the central passageway 37 and via the passageway 37 to out the discharge outlet 15. Vacuum is developed in the bottle 901 with dispensing of fluid from the bottle 901 by the stepped fluid pump 101 such that the pressure within the bottle 901 will become less than atmospheric pressure.

The stepped configuration of the outer chamber 17 and the inner chamber 18 thus provides the fluid pump 101 to draw fluid from inside the bottle 901 and discharge it out the discharge outlet 15. Such a fluid pump 101 is substantially the same as the stepped pump described in U.S. Pat. No. 5,767,277 to Ophardt, issued Oct. 14, 1997, the disclosure of which is incorporated herein by reference.

The air chamber 19 on the axially inner side of the air vent disc 44 is open to atmospheric pressure via the passageway 37 through the piston-forming element 14 to the discharge outlet 15. The outer end 24 of the air chamber 19 and hence the axially outer side of the air vent disc 44 is in communication with the interior of the bottle 901 via the transfer port 31.

The air vent disc 44 has an elastically deformable edge portion which is biased into the wall 27 of the air chamber 19. Having regard to the extent to which the air vent disc 44 is biased into the wall 27 of the air chamber 19, when the pressure within the bottle 901 is sufficiently less than the pressure in the air compartment 49, the air vent disc 44 will deflect radially inwardly away from the wall 27 of the air chamber 19 to permit flow from the air compartment 49 past the air vent disc 44 axially outwardly and hence into the interior of the bottle 901 via the transfer port 31.

Preferably as shown, the air chamber 19 is a stepped chamber having an axially inner portion 28 of a diameter less than a diameter of an axially outer portion 29. While the air vent disc 44 is in the smaller diameter inner piston portion 28, a pressure difference between the pressure in the bottle 901 and the pressure in the air compartment 49 which is required to deflect the air vent disc 44 for air flow axially outwardly therepast is greater than a pressure differential required between the pressure in the bottle 901 and the pressure in the air compartment 49 when the air vent disc 44 is in the larger diameter outer piston portion 29. As can be seen by a comparison of FIGS. 1, 2 and 3, the air vent disc 44 is in the outer piston portion 29 when the piston-forming element 14 is in or proximate the fully extended position of FIG. 3 or between the fully extended position of FIG. 3 and the intermediate position of FIG. 2. The air vent disc 44 is in the inner piston portion 28 when the piston-forming element 14 is in or between the fully retracted position of FIG. 1 and the intermediate position of FIG. 2.

The air vent disc 44 will deflect to permit air flow from the air compartment 49 into the bottle 901 when the air vent disc 44 is in the outer piston portion 29 when the pressure differential between the pressure in the bottle 901 and the pressure in the air compartment 49 is at a first pressure differential threshold. The air vent disc 44 will deflect to permit air flow from the air compartment 49 into the bottle 901 when the air vent disc 44 is in the inner portion 28, the pressure differential between the pressure in the bottle 901 and the pressure in the air compartment 49 is a second pressure differential. The first pressure differential is less than the second pressure differential.

Preferably, in accordance with the first embodiment illustrated in FIGS. 1 to 3, during cyclical operation of the piston pump 10, on moving from the fully retracted position of FIG. 1 to the intermediate position of FIG. 2, preferably the air vent disc 44 is engaged with the wall 27 of the air chamber 19 to prevent air flow therepast, however, during the withdrawal stroke, on the air vent disc 44 leaving the inner piston portion 28 and entering the outer piston portion 29 as in movement from the intermediate position of FIG. 2 towards the fully extended position of FIG. 3, venting of air may occur axially outwardly from the air compartment 49 past the air vent disc 44 into the bottle 901 via the transfer of port 31 assuming that the pressure differential between the pressure in the bottle 901 is insufficiently less than the atmospheric pressure in the air compartment 49.

In the embodiment of FIG. 1, in movement of the piston-forming element 14 from the retracted position of FIG. 1 to the full extended position of FIG. 3, the volume of the air compartment 49 increases and thus there will be a tendency to draw air and/or liquid upwardly in the passageway 37 into the air compartment 49. Similarly, in movement of the piston-forming element 14 in a retraction stroke from the fully extended position of FIG. 3 to the retracted position of FIG. 1, the volume of the air compartment 49 decreases thus pressurizing air and/or fluid in the air compartment 49. In this regard in FIGS. 1 to 3, insofar as the air compartment 49 and piston-forming element 14 forms a secondary pump generally indicated 102, this secondary pump 102 is in phase with the primary liquid pump 101 formed by the stepped outer chamber 17 and inner chamber 18, that is, with both pumps simultaneously drawing in material and simultaneously discharging material.

Preferably, in operation in a withdrawal stroke the volume of liquid drawn in by the liquid compartment 48 is substantially greater than the volume drawn into the air compartment 49 and the relative pumping action of the secondary air pump 102 does not prevent discharge of fluid from the discharge outlet 15 nor does it prevent atmospheric air from finding its way from the discharge outlet 15 to the air compartment 49.

The piston-forming element 14 carries a number of optional locating members to assist in coaxially locating the piston-forming element 14 within the chambers of the piston chamber-forming member 12. These locating members include a locating disc 919, locating vanes 921 and locating vanes 924. As seen in FIG. 2, the locating disc 919 extends radially from the stem 36 and is provided with circumferentially spaced slot openings 920 about the periphery of the disc 919. The locating vanes 921 are provided as a plurality of circumferentially spaced axially extending locating vanes 921 which extend from the stem 36 outwardly to an outer edge 922. Each vane 921 is a relatively thin planar member extending radially from the stem 36 outwardly and extending axially. The locating vanes 921 are on the stem 36 between the locating disc 919 and the engagement flange 16. The locating vanes 924 are provided as a plurality of locating vanes 924 at circumferentially spaced locations about the axis 13 extending outwardly for coaxial location within the inner chamber 18 and which locating vanes 924 similar to the locating vanes 921 inside the outer chamber 17. The locating vanes are on the stem 36 intermediate the outer disc 41 and the inner disc 42.

In the embodiment of FIGS. 1 to 3, the air chamber 49 is shown to be stepped in diameter with a larger diameter outer portion 29 and a larger diameter inner portion 28. The stepping of the air chamber 19 is not necessary and air flow for vacuum relief can be provided in an air chamber 19 of constant diameter merely by relying on the resiliency of the air vent disc 46.

Figure 4:
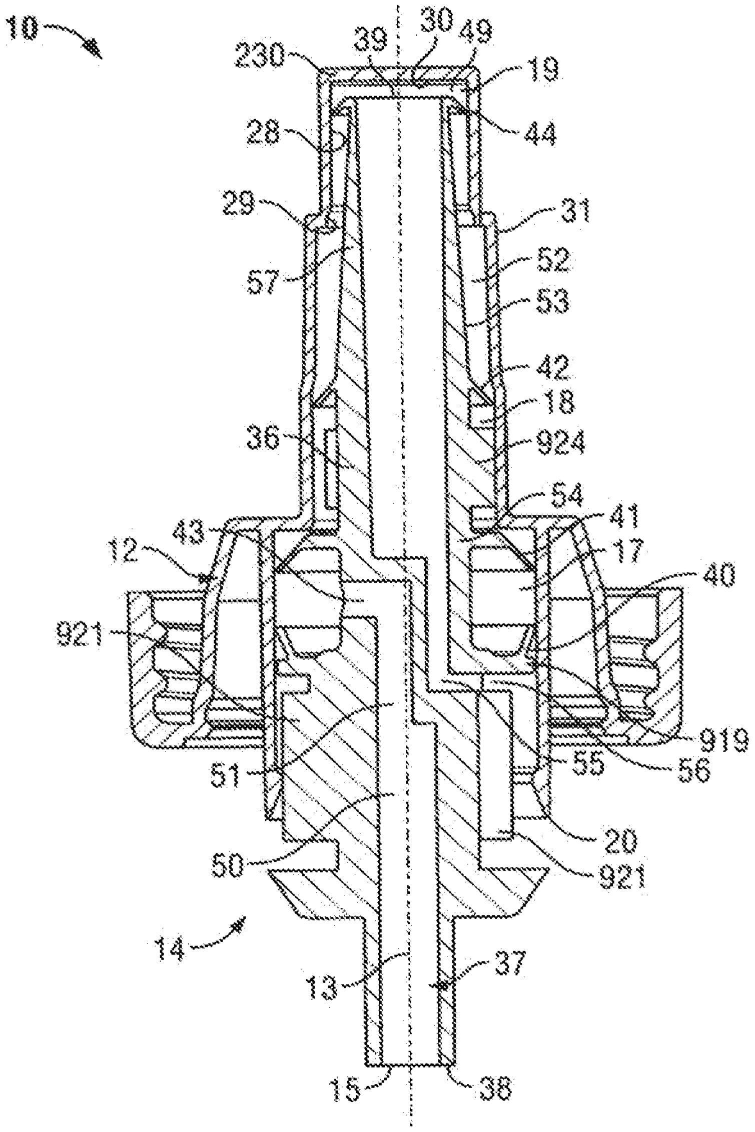
FIG. 4 is a cross-sectional front view of a piston pump in accordance with a second embodiment of the present invention with a piston-forming element in a fully retracted position.

Reference is made to FIGS. 4 to 7 which illustrate a second embodiment of a piston pump 10 in accordance with the present invention. The functional operation of the second embodiment of FIG. 4 is very similar to that in the first embodiment of FIGS. 1 to 3. In FIGS. 4 to 7 and in all the figures, the same reference numerals are used to indicate equivalent elements. The piston chamber-forming member 12 is illustrated as having an outer chamber 17, an inner chamber 18 and an air chamber 19 of successively reduced diameters as is the case in the embodiment of FIGS. 1 to 3 closed by the air chamber end wall 230 and with a similarly located transfer port 31 into the inner chamber 18. The piston chamber-forming element 14 similarly carries the sealing disc 40 and outer disc 41 within the outer chamber 17, the inner disc 42 within the inner chamber 18 and the air seal disc 44 within the air chamber 19.

Figure 7:
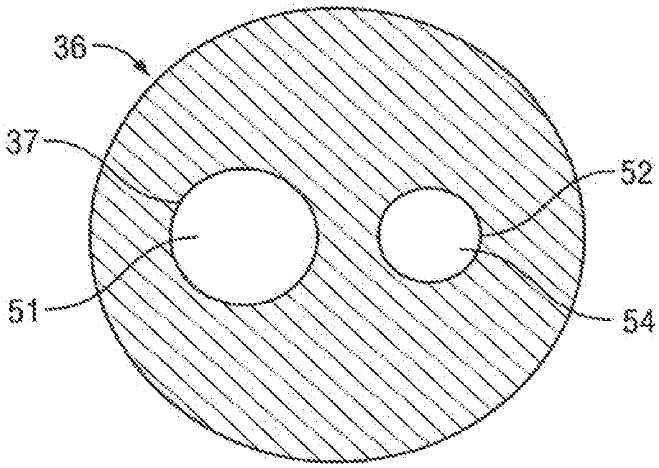
FIG. 7 is a cross-sectional view through the stem of the piston-forming element along section line 7-7' in FIG. 5.

The stem 36 has a central passageway 37 open at the outer end 38 of the piston-forming element 14 at the discharge opening 15. The passageway 37 has an outer portion 50 which is coaxial about the axis 13 and inner portion 51 which is axially asymmetrical about the axis 13 as best seen in FIG. 7. The inner portion 51 connects the outer portion 50 to the duct 43. An air passage 52 is provided through the stem 36 from the inner opening 39 at the inner end of the piston forming element 14 to an outer opening 56. The air passage 52 includes a first coaxial inner portion 53 coaxial about the axis 13, an axially extending outer portion 54 which is asymmetrical relative to the axis 13 as best seen in FIG. 7 and a radially extending ductway 55. The inner portion 53 provides communication axially from the inner opening 39 to the outer portion 54. The outer portion 54 provides communication axially to the ductway 55. The ductway 55 provides communication radially to the outer opening 56. The outer opening 56 is open to the atmosphere through the outer chamber 17 and its open outer end 20 since the outer opening 56 opens on the axially outer side of the circular locating disc 919 and communication is always provided axially outwardly of the disc 919 through the outer chamber 17 to the atmosphere axially between the locating vanes 921. As can be seen in FIG. 7, the piston stem 36 carries the inner portion 51 of the passageway 37 and the outer portion 54 of the air passage 52 with each extending axially past the other radially separated from each other.

In the second embodiment in FIGS. 4 to 7, the innermost portions of the stem 36 provide the air passage 52 inside a hollow tubular member 57 with the outer disc 41, the inner disc 42 as well as locating ribs 924 extending radially outward from the tubular member 57 and having configurations substantially the same as those shown in the first embodiment of FIGS. 1 to 3. The air vent disc 44 in the embodiment of FIGS. 4 to 7 comprises an annular radially outwardly extending disc which extends generally axially outwardly as it extends radially outwardly. The air vent disc 44 in the embodiment of FIGS. 4 to 7 will function in the same manner the air vent disc 44 in the embodiments of FIGS. 1 to 3 with the threshold vacuum required to provide for vacuum relief air flow from the air compartment 49 into the bottle to be less when the air vent disc 44 is in the enlarged diameter outer portion 29 of the air chamber 19 than when the air vent disc 44 is in the lesser diameter inner portion 28 of the air chamber 19.

In the embodiment of FIGS. 4 to 7, the configuration of the piston-forming element 14 is selected so as to permit the piston forming element 14 to be injection molded as a unitary element as from plastic material. Similarly, the piston chamber-forming member 12 of FIGS. 4 to 7 is configured so as to permit the piston chamber-forming member 12 to be injection molded as a unitary element as from plastic material. Thus, the advantageous arrangement of the second embodiment as illustrated in FIGS. 4 to 7 provides a piston pump with advantageous vacuum relief properties which can be injection molded from plastic and comprises merely two separate components 12 and 14.

Figure 8:
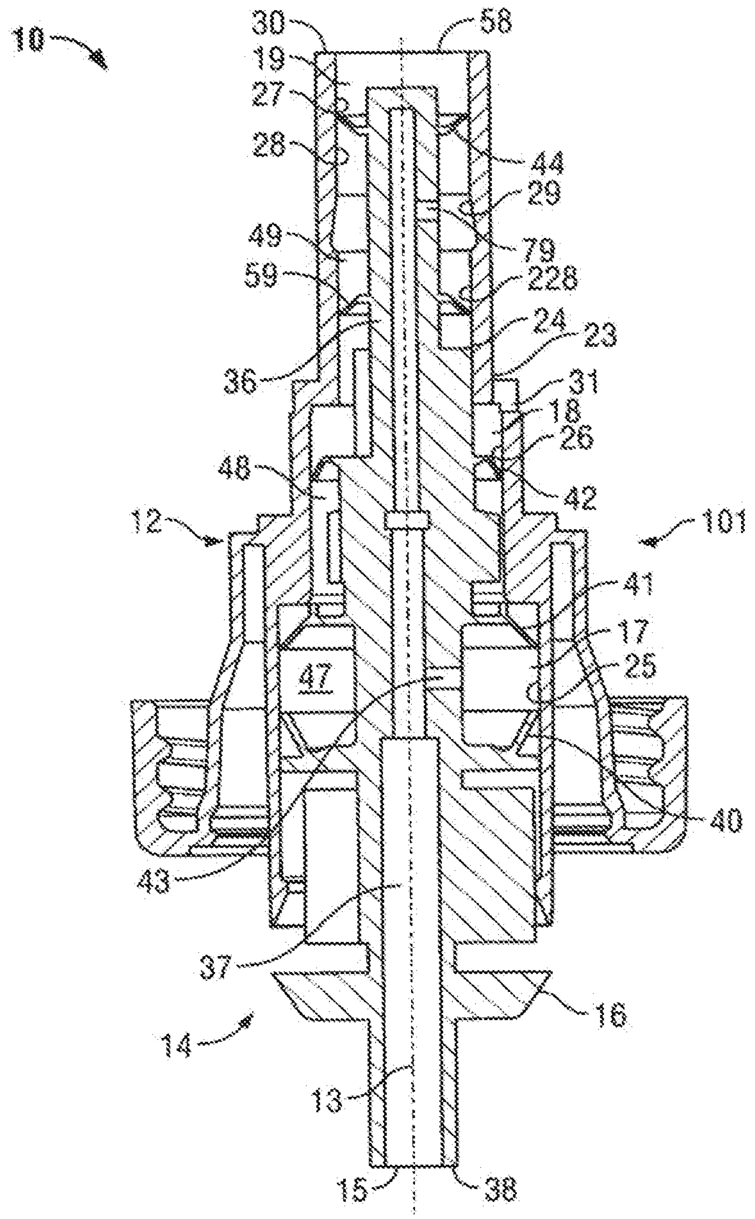
FIG. 8 is a cross-sectional front view of a piston pump in accordance with a third embodiment of the present invention with the piston-forming element in a fully retracted position.
Figure 9:
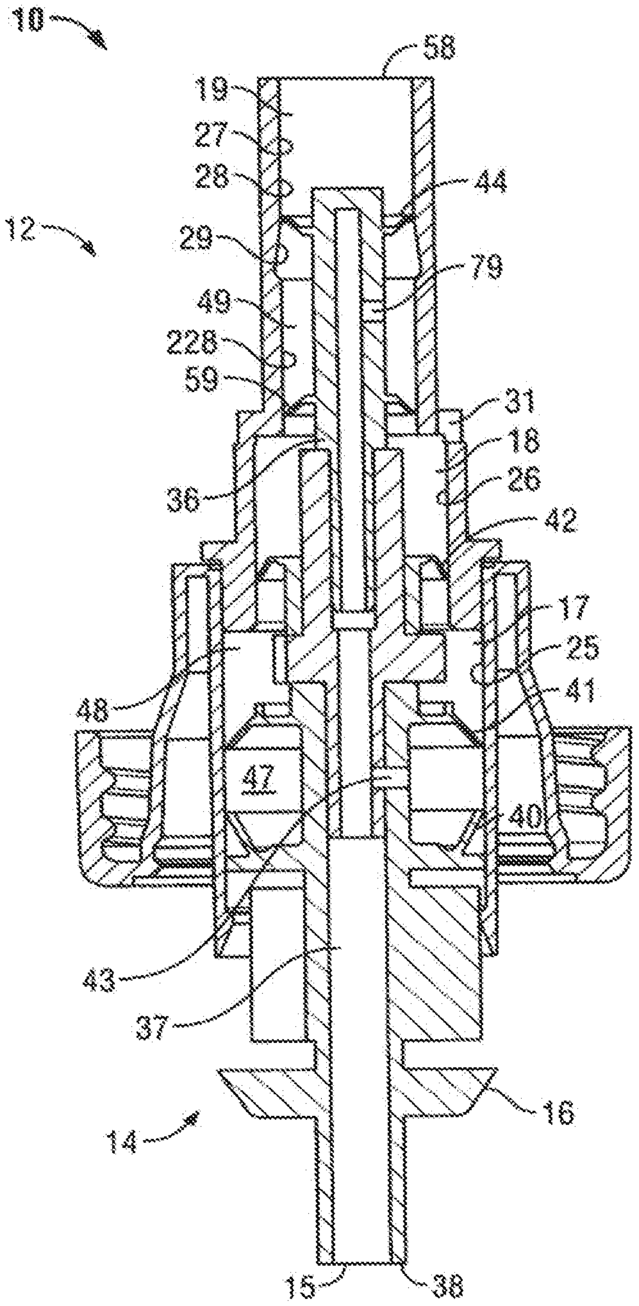
FIG. 9 is a cross-sectional front view of the piston pump of FIG. 8 with the piston-forming element in an intermediate position between the fully retracted position and a fully extended position.
Figure 10:
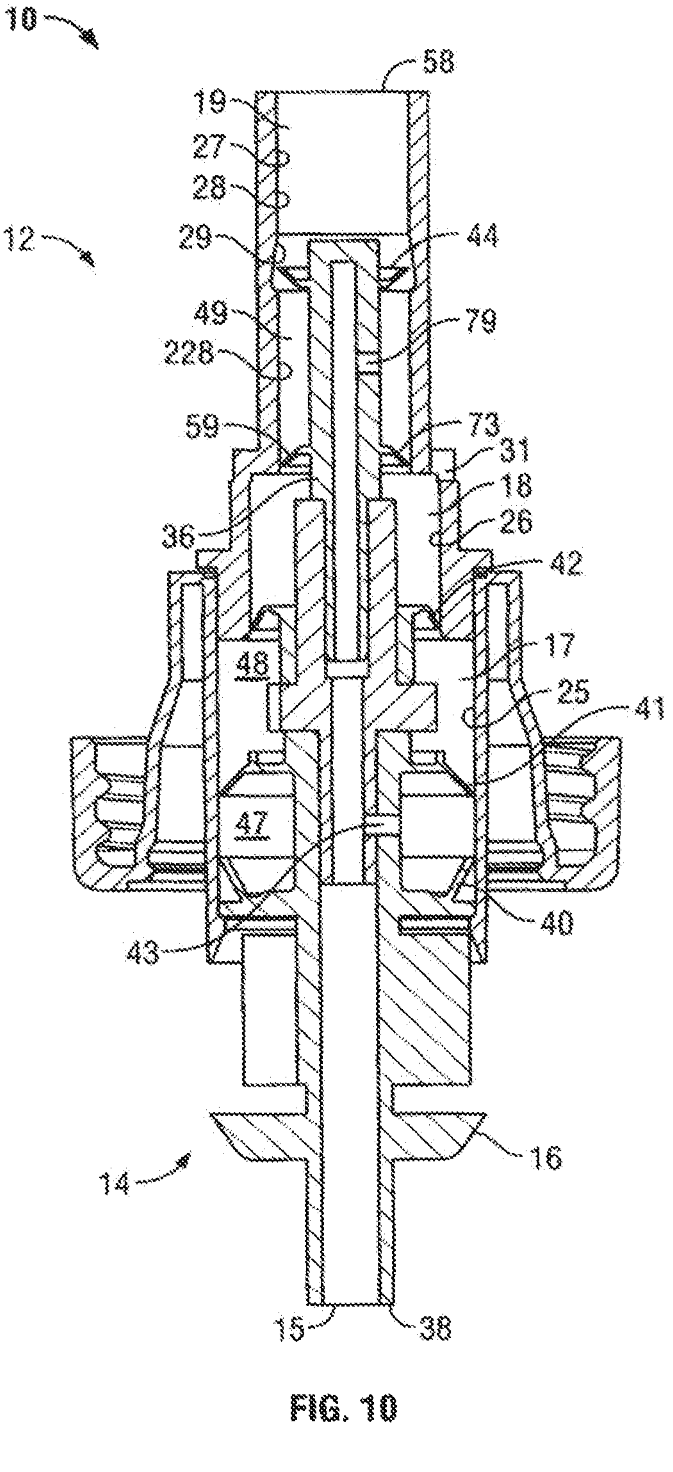
FIG. 10 is a cross-sectional front view of the pump of FIG. 8 with the piston-forming element in the fully extended position.

Reference is made to FIGS. 8 to 10 which illustrate a third embodiment of the invention in accordance with the present invention. In the third embodiment of FIGS. 8 to 10, the piston chamber-forming member 12 is identical to that in the first embodiment of FIGS. 1 to 3 with the exceptions that: (a) the air chamber end wall 230 of the embodiment of FIGS. 1 to 3 has been eliminated such that the air chamber 19 is open axially inwardly at an opening 58 at its inner end 30; (b) the axial length of the air chamber 19 has been increased; (c) the enlarged diameter axially outer portion 29 of the air chamber 19 is provided between the axially inner portion 28 of lesser diameter and an axially outermost portion 228 of the same diameter as the axially inner portion 28; and (d) the enlarged diameter axially outer portion 29 increases in diameter as it extends axially outwardly preferably being frustoconical as shown. The piston-forming element 14 in the embodiment of FIGS. 8 to 10 is identical to the piston-forming element 14 in the first embodiment of FIGS. 1 to 3 with the exceptions that: (a) the air vent disc 44 is inverted to permit fluid flow axially inwardly; (b) axially outwardly from the air vent disc 44, an air seal disc 59 is provided in the air chamber 19; and (c) a radially extending inner bore 79 provides communication through the wall of the hollow piston stem 36 from the central passageway 37 into the air chamber 19 between the air vent disc 44 and the air seal disc 59.

In the embodiment of FIGS. 8 to 10, the air vent disc 44 extends radially outwardly from the piston stem 36 to sealably engage with the wall 27 of the air chamber 19. The air vent disc 44 has an elastically deformable edge portion proximate the wall 27 of the air chamber 19 circumferentially thereabout. The air vent disc 44 engages the wall 27 of the air chamber 19 circumferentially thereabout to prevent fluid flow in the air chamber 19 axially outwardly past the air vent disc 44 in an axial outward direction. The air vent disc 44 elastically deforms away from the wall 27 of the air chamber 19 to permit flow in the air chamber 19 past the air vent disc 44 in an axial inward direction when there is a sufficient pressure differential across the air vent disc 44.

The air seal disc 59 extends radially outwardly from the piston stem 36 to sealably engage the outermost portion 228 of the wall 27 of the air chamber 19. The air seal disc 59 has an elastically deformable edge portion proximate the wall 27 of the air chamber 19 circumferentially thereabout. The air seal disc 59 engages the wall 27 of the air chamber 19 circumferentially thereabout to prevent flow in the air chamber 19 axially inwardly and outward past the air seal disc 59 while the air seal disc 59 is within the outermost portion 228 of the air chamber 19.

The piston chamber-forming member 12 has the wall 27 of the air chamber 19 as being substantially of a constant diameter over the inner portion 28 from the inner end 30 to the outer portion 29 and over the outermost portion 228 from the outer portion 29 to the outer end 24. The outer portion 29 has a greater diameter than the diameter of the inner portion 28 and the outermost portion 228. In the third embodiment, the air compartment 49 is formed within the air chamber 19 outwardly of the stem 39 intermediate the air vent disc 44 and the air seal disc 59. The air compartment 49 is in communication at all times with the central passageway 39 via the inner bore 79.

Operation of the third embodiment of FIGS. 8 to 10 is now described. The interaction and operation of the fluid pump 101 notably with the sealing disc 40, outer disc 41 and inner disc 42 in the outer chamber 17 and inner chamber 18 is identical to that with the first embodiment. In a cycle comprising a withdrawal stroke and a return stroke on moving the piston-forming element 14 between the fully retracted position of FIG. 8, the intermediate position of FIG. 9 and the extended position of FIG. 10, the air seal disc 59 is always in engagement with outermost portion 228 of the wall 27 of the air chamber 19 to prevent flow axially inwardly therepast. In movement of the air vent disc 44 between the fully retracted position of FIG. 8 and the intermediate position of FIG. 9, the air vent disc 44 is in engagement with the inner portion 28 of the wall 27 of the air chamber. In movement of the piston-forming element 14 from the intermediate position of FIG. 9 to the fully extended position of FIG. 10, the air vent disc 44 is withdrawn outwardly from the inner portion 28 of the wall 27 of the air chamber 19 into the enlarged diameter outer portion 29. Insofar as there is a sufficient pressure differential across the air vent disc 44, then flow may occur axially inwardly from the air compartment 49, past the air vent disc 44, through the air chamber 19 and through the opening 58 into the bottle 901 whether the air vent disc 44 is in the inner portion 28 or the enlarged diameter outer portion 29. However, the pressure differential required for the air vent disc 44 to deflect to let air flow inwardly therepast is less when the air vent disc 44 is in the enlarged diameter outer portion 29. That is, the threshold vacuum required to provide for vacuum relief air flow from the air compartment 49 into the bottle is less when the air vent disc 44 is in the enlarged diameter outer portion 29 of the air chamber 19 than when the air vent disc 44 is in the lesser diameter inner portion 28 of the air chamber 19.

In the third embodiment of FIGS. 8 to 10, liquid flow from the reservoir 901 into the inner compartment 18 is via the transfer port 31 and an air flow for vacuum relief to the reservoir is via the opening 58 at the inner end 30 of the air chamber 19. The axial as well as radial separation of the transfer port 31 for fluid outlet from the bottle 901 and the opening 58 at the inner end 30 for air inlet into the bottle 901 is advantageous to assist in ensuring that any air bubbles which might form in the fluid within the bottle 901, especially in a relatively viscous fluid, would not impede the ability of the fluid in the bottle to flow to or through the transfer port 31. Such air bubble formation is generally of a lesser concern with fluids of a relatively lesser viscosity.

In the preferred embodiment of FIGS. 8 to 10, the wall 27 of the air chamber 19 is shown to include the innermost portion 28, the outer portion 29 and the outermost portion 228. The innermost portion 28 and the outermost portion 228 are described to have the same diameter. This, however, is not necessary. Since the air seal disc 59 is the only disc which engages with the outermost portion 228, it is to be appreciated the outermost portion 228 may, for example, be of a different diameter, preferably a larger diameter than the innermost portion 28. The outermost portion 228 may, for example, be of the same diameter as the outer portion 29. For example, to facilitate manufacture, the outermost portion 228 could be of the same diameter as the diameter of the inner chamber 18.

In the embodiment of FIGS. 8 to 9, the air vent disc 44 becomes received within the enlarged diameter outer portion 29 when the piston 14 is proximate the fully extended position. This is believed to be preferred, particularly, in a configuration where the piston element 14 is to be used such that in cycles of operation, the piston element 14 remains in the fully extended position. However, the relative location of the enlarged outer portion 29 may be located such that the air vent disc 44 is received in the outer portion 29 at different positions in a stroke of operation as, for example, in a fully retracted position or at some intermediate position which will facilitate release of vacuum within the bottle by atmospheric air having an increased ability to flow past the air vent disc 44 at least once during a cycle of operation of the piston pump.

The second embodiment of FIGS. 4 to 7 illustrates the passageway 37 for fluid to be discharged from the bottle 901 to be separate from the air passage 52 via which atmospheric air is delivered to the air compartment 49 and may pass to the bottle 901 to relieve vacuum in the bottle. In each of the first embodiment of FIGS. 1 to 3 and the third embodiment of FIGS. 8 to 10, the passageway 37 is used for both flow of liquid to be discharged and atmospheric air for vacuum relief. Each of the first embodiment of FIGS. 1 to 3 and the third embodiment of FIGS. 8 to 10 could have their piston-forming member 14 configured to be equivalent to that illustrated in the second embodiment of FIGS. 4 to 7 to have a separate passageway 37 for liquid flow and a separate air passage 52 for air flow by adopting a configuration for the separate passageway 37 and separate air passage 52 in a manner as illustrated in FIGS. 4 to 7 and without changing the various other features of the first embodiment and the third embodiment. Similar modifications may be made to other embodiments disclosed herein.

Figure 11:
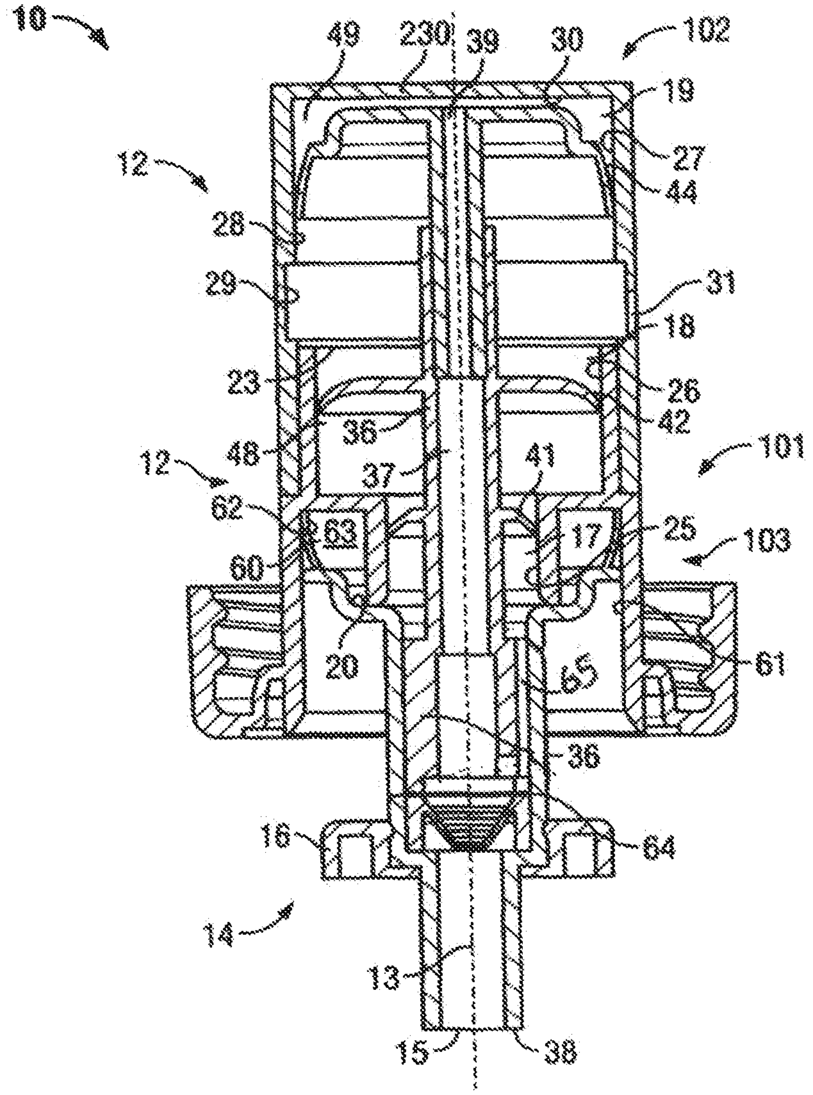
FIG. 11 is a cross-sectional front view of a piston pump in accordance with a fourth embodiment of the present invention with the piston-forming element in a fully retracted position.
Figure 12:
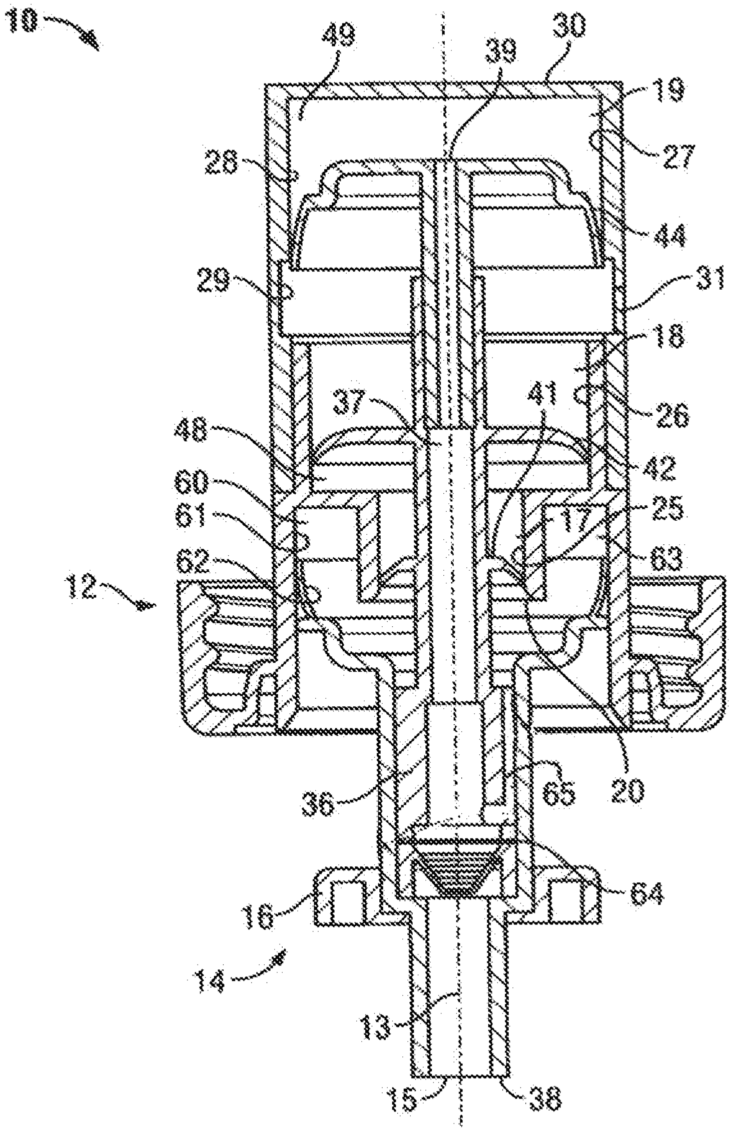
FIG. 12 is a cross-sectional front view of the pump of FIG. 11 with the piston-forming element in a fully extended position.

Reference is made to FIGS. 11 and 12 which illustrate a fourth embodiment of a piston pump in accordance with the present invention adapted to simultaneously dispense liquid mixed with air preferably to produce a foam. The piston pump 10 of FIGS. 11 and 12 has substantial similarities to foam pumps disclosed in U.S. Pat. No. 7,770,874 to Ophardt et al, issued Aug. 10, 2012, the disclosure of which is incorporated herein by reference.

The piston chamber-forming member 12 defines coaxial cylindrical chambers including the outer chamber 17, an inner chamber 18, an inner air chamber 19 and an outer air chamber 60. The outer air chamber 60 is axially outwardly of the outer chamber 17 and partially annular radially thereabout. The transfer port 31 is provided through the wall 27 of the inner air chamber 19 approximate the inner end 23 of the inner chamber 18. The four chambers 60, 17, 18 and 19 are formed by walls 61, 25, 26 and 27, respectively. The inner air chamber 19 is closed at its inner end 30 by the end wall 230. The diameter of the outer chamber 17 is less than the diameter of the inner chamber 18. Each of the outer air chamber 60, outer chamber 17, inner chamber 18 and inner air chamber 19 are coaxial about the axis 13. The outer chamber 17 opens axially outwardly at an open outer end 20 into the outer air chamber 60.

The piston-forming element 14 has a central hollow piston stem 36 extending along the axis 13. The piston stem 36 has a central passageway 37 from the discharge outlet 15 at the outer end 38 through to the inner opening 39 of the piston-forming element 14. The piston-forming element 14 carries within the outer air chamber 60, an air seal disc 62. The piston stem 36 carries within the outer chamber 17 the outer disc 41. The piston disc 36 carries within the inner chamber 18 the inner disc 42. The piston stem 36 carries within the inner air chamber 19 the air vent disc 44.

The air seal disc 62 extends radially outwardly from the piston stem 36 to engage the wall 61 of the outer air chamber 60. The air seal disc 62 includes an elastically deformable edge portion proximate the wall 61 of the outer air chamber 60 circumferentially thereabout. The air seal disc 62 engages the wall 61 of the outer chamber 60 to substantially prevent flow in the outer air chamber 60 past the air seal disc 62 in an axially outward direction. Each of the outer disc 41, the inner disc 42 and the air vent disc 44 engages the respective wall of their respective chambers 17, 18 and 19 in the same manner as that described with reference to the first embodiment of FIGS. 1 to 3. As with the first embodiment, in the embodiment of FIGS. 11 and 12, an air compartment 49 is defined inwardly of the air vent disc 44 within the inner chamber 19; a liquid compartment 48 is defined within the outer chamber 17 and the inner chamber 18 outwardly of the stem 36 in between the outer disc 41 and the inner disc 42. In addition, an outer air compartment 63 is defined within the outer air chamber 60 and the outer chamber 17 between the air seal disc 62 and the outer disc 41. A channel 65 is provided in the piston stem 36 providing communication through the stem 36 between the passageway 37 at a radially directed inner end of the channel 65 and the interior of the outer air compartment 63 at an axially directed inner end of the channel 65.

The stepped configuration with the outer chamber 17 and the inner chamber 18 of different diameters provides a fluid pump 101 to draw fluid from inside the bottle via the transfer port 31 and discharge it out the outer end 20 of the outer chamber 17.

Within the piston stem 36 axially outwardly of the duct 43 a foam forming member 64 is provided including small apertures through which air and the liquid when simultaneously passed aid foam production as by creating turbulent flow as, for example, through small pores or apertures of a screen which may comprise the member 64.

An inner air pump 102 is formed by the air vent disc 44 together with the inner air chamber 19 which serves to either draw air via the passageway 37 into the inner air compartment 49 or to discharge air from the inner air compartment 49 out the passageway 37.

The air seal disc 62 together with the outer air chamber 60 form an outer air pump 103 which is operative to draw air into the air compartment 63 via the discharge outlet 15 and passageway 37 and to discharge air and liquid from within the outer air compartment 63 outwardly via the passageway 37 and the discharge outlet 15.

The outer air pump 103 is in phase with the inner air pump 102 in the sense that during a withdrawal stroke, each of the inner air pump 102 and the outer air pump 103 draw air in and in a retraction stroke each of the air pumps discharge air. The liquid pump 101 is out of phase with the air pumps 102 and 103. The liquid pump 101 draws liquid in a retraction stroke and discharges it in a withdrawal stroke. During operation of the piston pump 10, liquid discharged by the liquid pump 101 in a withdrawal stroke flows under gravity to the bottom of the outer air compartment 63 forming a sump about the stem 36 in the bottom of the outer air compartment 63 open to the channel 65. In a retraction stroke, while the liquid pump 101 operates to draw liquid from the bottle into the liquid compartment 48, the outer air pump 103 pressurizes the outer air compartment 63 discharging liquid and air in the outer air compartment 63 through the channel 65 and through the foam inducing member 64 simultaneously with the inner air pump 102 pressurizing the inner air compartment 49 to discharge air via the passageway 37 through the foam inducing member 64. As a result, a mixture of air and liquid is discharged as foam out the discharge outlet 15.

In the same manner as described with reference to the first embodiment, in the third embodiment, if the pressure differential across the air vent disc 44 between the pressure within the bottle and the pressure within the central passageway 37 is sufficiently great, then air within the inner air compartment 49 may pass axially outwardly pass the air vent disc 44 and into the bottle to relieve vacuum pressure within the bottle. Preferably as shown in the embodiment of FIGS. 10 to 12, the inner air chamber 19 has an inner portion 28 of a diameter larger than an outer portion 29 such that the pressure differential required to permit air flow axially outwardly pass the air vent disc 44 is least proximate the end of a withdrawal stroke when the air vent disc 44 is within the larger diameter outer portion 29. By suitable selection of the air vent disc 44 and the relative diameters of the inner portion 28 and the outer portion 29, in a preferred manner of operation, the inner air compartment 19 may serve as a portion of the inner air pump 102 on one hand and also as a vacuum relief arrangement on the other hand.

In the fourth embodiment of FIGS. 11 and 12, the liquid pump 101 is out of phase with the two air pumps. This is not necessary and it is to be appreciated that a modified arrangement could be provided in which as is the case of the embodiment of FIGS. 1 to 3, in which either air pump 102 or air pump 103 or both is in phase with the liquid pump 101.

Figure 13:
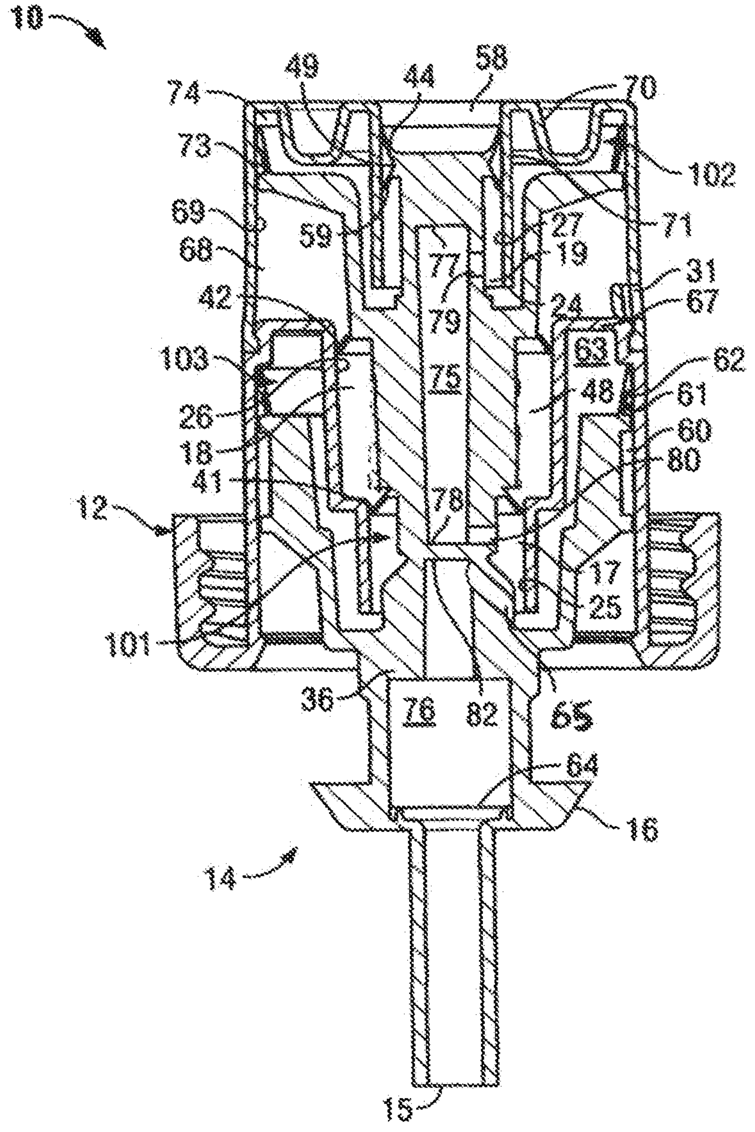
FIG. 13 is a cross-sectional front view of a piston pump in accordance with a fifth embodiment of the present invention with the piston-forming element in a fully retracted position.
Figure 14:
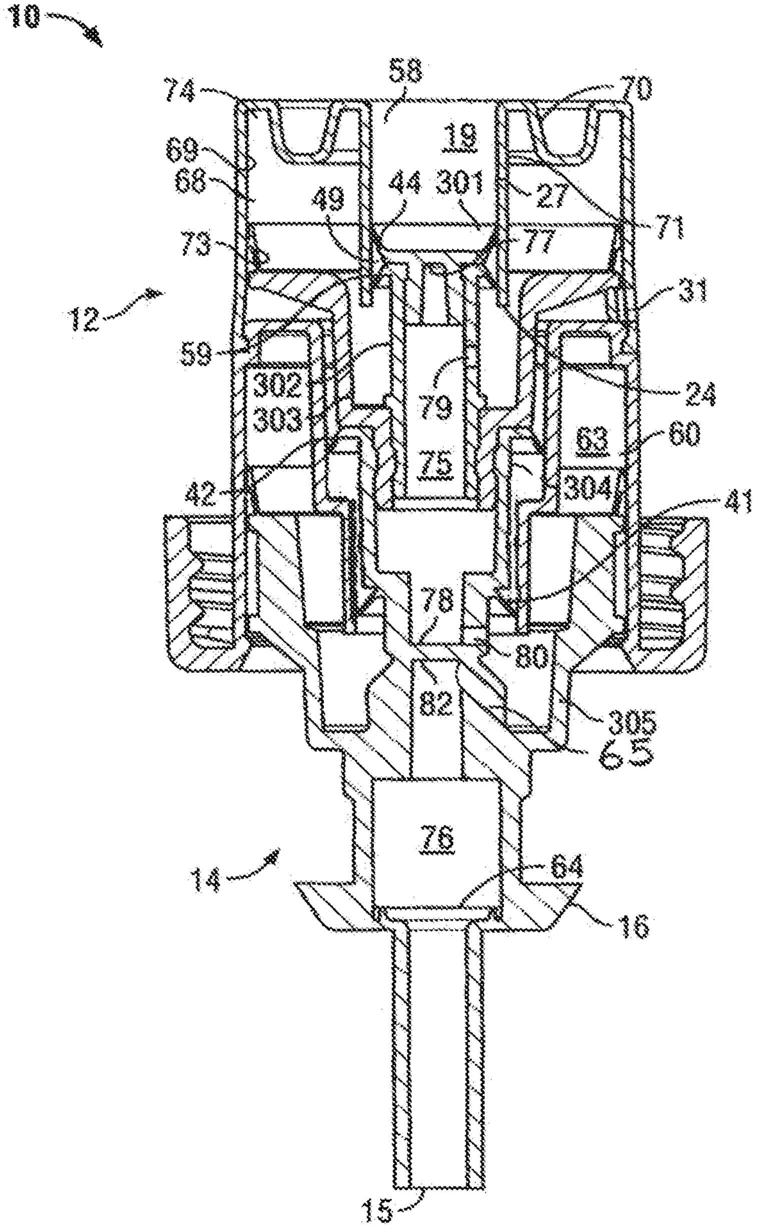
FIG. 14 is a cross-sectional front view of the piston pump of FIG. 13 with the piston-forming element in an intermediate position between the fully retracted position and a fully extended position.
Figure 15:
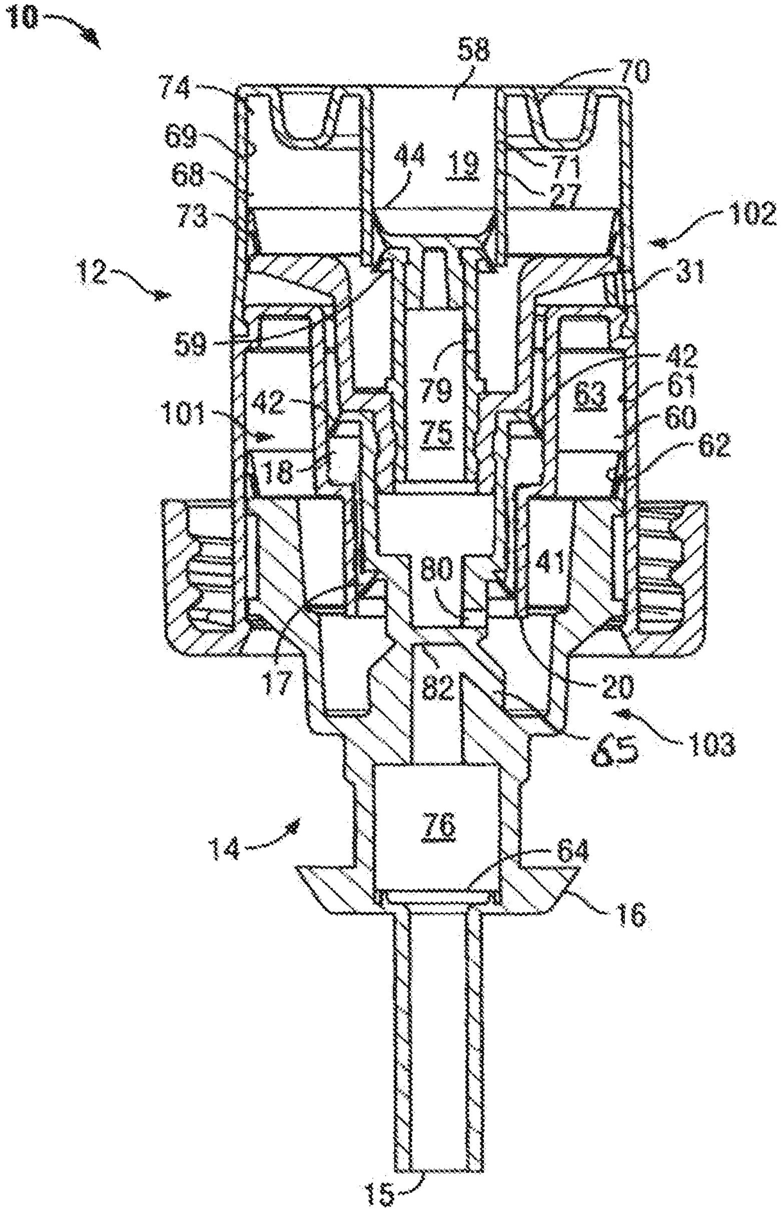
FIG. 15 is a cross-sectional front view of the pump of FIG. 13 with the piston-forming element in the fully extended position.

Reference is made FIGS. 13 to 15 which illustrate a fifth embodiment of a piston pump 10 in accordance with the present invention.

The fifth embodiment of FIGS. 13 to 15 has may similarities to the fourth embodiment of FIGS. 11 and 12 including providing an outer air compartment 63 within the outer air chamber 60 and the outer chamber 17 between the air seal disc 62 and the outer disc 41 and a liquid compartment 48 within the outer chamber 17 and the inner chamber 18 between the outer disc 41 and the inner disc 42. In FIGS. 13 to 15, the stem 36 has been modified to provide the channel 65 as being angled to extend axially inwardly as it extends radially inwardly as in a manner as described in U.S. Pat. No. 8,272,539 to Ophardt et al, issued Sep. 25, 2012, the disclosure of which is incorporated herein by reference.

In the fifth embodiment of FIGS. 13 to 15, the piston chamber-forming body 12 defines five coaxial chambers, namely an outer air chamber 60, an outer chamber 17, an inner chamber 18, an inner air chamber 19 and an inner air pump chamber 68.

From a shoulder 67 between the wall 26 of the inner chamber 18 and the wall 61 of the outer air pump chamber 60, the piston chamber-forming body 12 extends inwardly as a cylindrical wall 69 to a radially inwardly extending annular end wall 70 which supports a central axially extending tube member 71. The tube member 71 extends through the annular end wall 70 with the tube member 71 open at both axial ends. The inner air pump chamber 68 is defined within the wall 69.

The inner air chamber 19 is defined coaxially within the tube member 71 with the wall of the tube member 71 comprising the wall 27 of the inner air chamber 19, the open axially inner end of the tube member 71 comprising the opening 58 of the inner air chamber 19 to the bottle and the open axially outer end of the tube member 71 comprising the outer end 24 of the inner air chamber 19.

An air vent disc 44 is carried at the axially inner end of the piston stem 36 and an air seal disc 59 is provided axially outwardly therefrom such that an air compartment 49 is defined inside the air chamber 19 about the piston stem 36 intermediate the air vent disc 44 and the air seal disc 59. In the fifth embodiment of FIGS. 13 to 15, the axially inner end 24 of the inner air chamber 19 opens into the inner air pump chamber 68.

Within the inner air pump chamber 68, an inner air pump seal disc 73 extends radially outwardly from the piston stem 36 sealably engaging with the wall 69 of the inner air pump chamber 68. The inner air pump seal disc 73 extends radially and axially from the stem 36 radially outwardly of the tube member 71 with the tube member 71 between the inner air pump seal disc 73 and an inner portion of the stem 36 carrying the air vent disc 44 and the air seal disc 59. The inner air pump seal disc 73 has an elastically deformable edge portion proximate the wall 69 of the inner air pump chamber 68 circumferentially thereabout. The inner air pump seal disc 73 engages the wall 69 of the inner air pump chamber 68 circumferentially thereabout to prevent flow in the inner air pump chamber 68 axially outwardly past the inner air seal disc 73 in an axially outwardly direction. An inner air pump compartment 74 is defined within the inner air pump chamber 68 and the inner air chamber 19 between the inner air pump seal disc 73 and the air seal disc 59.

In FIGS. 13 to 15, the passageway 37 through the stem 36 includes an axially extending inner passage 75 and an axially extending outer passage 76.

The inner passage 75 of the passageway 37 extends from a closed axial inner end 77 to a closed axial outer end 78. Near the inner end 77, a radially extending inner bore 79 provides communication from the inner passage 75 to an opening open into the inner air pump compartment 74. Near the outer end 78, a radially extending outer bore 80 provides communication from the inner passage 75 to an opening open into the outer air compartment 63.

The outer passage 76 of the passageway 37 extends from a closed axial inner end 82 to the discharge outlet 15. The bore 43 provides communication between the outer air compartment 63 and the outer passage 76.

The inner air pump compartment 74 is at all times in communication with the discharge outlet 15 via a communication route including the inner bore 79, the inner passage 75, the outer bore 80, the outer air compartment 63, the bore 43 and the outer passage 76.

Operation of the air seal disc 59 and the air vent disc 44 in the fifth embodiment of FIGS. 13 to 15 is as follows. In a withdrawal stroke, as the air seal disc 59 moves axially outwardly to out of the air chamber 19, the air compartment 49 comes to be open to the inner air pump compartment 74 such that the pressure differential across the air vent disc 44 represents the pressure differential between the pressure within the bottle and the pressure within the inner air pump compartment 44 which is open to the atmosphere through the communication route to the discharge outlet 15. When the pressure differential across the air vent disc 44 is sufficient to deflect the air vent disc 44 then air may flow axially inwardly pass the air vent disc 44 into the bottle to relieve vacuum within the bottle.

The liquid compartment 48 is defined within the chambers 17 and 18 in the annular space about the stem between the discs 42 and 41. The liquid pump 101 is a stepped pump which discharges fluid axially outwardly through the annular space about the stem 36 inside the chamber walls 25 and 26 axially outwardly into the outer air compartment 63.

In the fifth embodiment of the FIGS. 13 to 15 as in the fourth embodiment of FIGS. 11 and 12, the liquid pump 101 is out of phase with the inner air pump 102 and outer air pump 103. Fluid drawn by the liquid pump 101 via the transfer port 31 is in a withdrawal stroke discharged into the outer air pump compartment 63 and, in a retraction stroke, the inner air pump 102 and outer air pump discharge material such that liquid and air are simultaneously passed through the foam inducing member 64 to produce foam.

In the fifth embodiment of FIGS. 13 to 15, the liquid pump 101 is formed by the expansion and contraction of the liquid compartment 48, the outer air pump 102 is formed by the expansion and contraction of the outer air compartment 63 and the inner air pump 103 is formed by the expansion and contraction of the inner air pump compartment 74.

In FIG. 13, the piston element 14 is illustrated for ease of illustration as a single unitary element, however, in FIGS. 14 and 15, the piston element 14 is functionally similar to that in FIG. 13 and is illustrated as six sub-elements 301, 302, 303, 304, 305 and 64 fixedly secured together. Each of the sub-elements 301 to 305 may be injection molded from plastic and different plastic materials may be used to provide different resiliency to different of the sub-elements. Towards assisting in manufacture the various sub-elements may comprise a plurality of parts such as notably sub-element 304.

Figure 16:
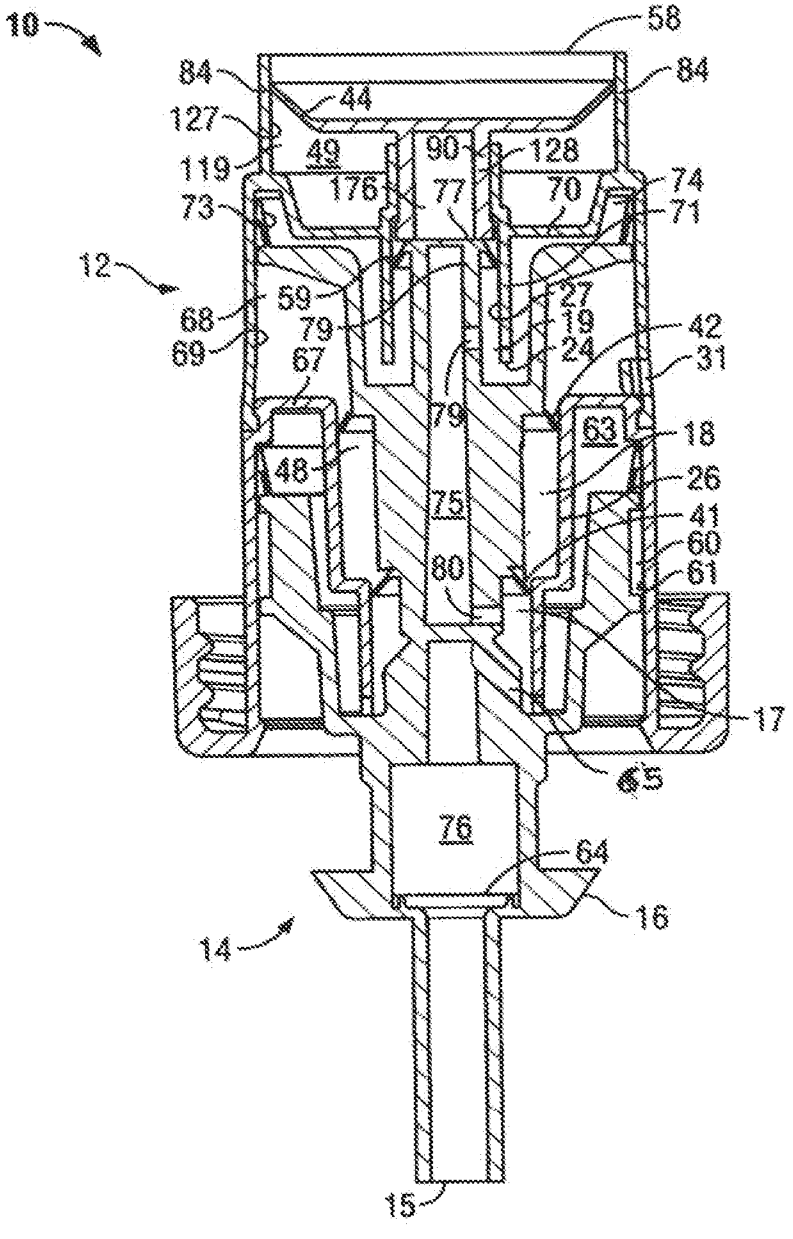
FIG. 16 is a cross-sectional front view of a piston pump in accordance with a sixth embodiment of the present invention with the piston-forming element in a fully retracted position.
Figure 17:
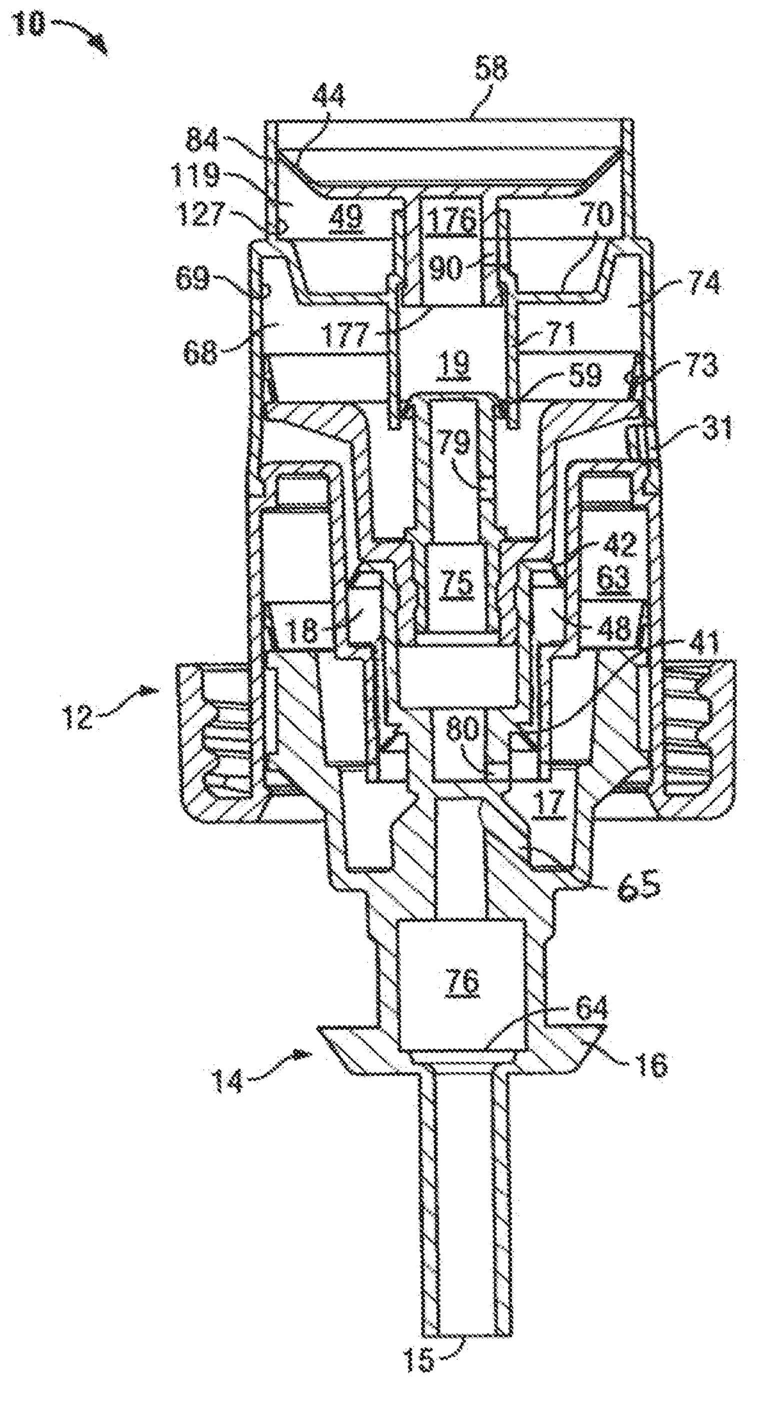
FIG. 17 is a cross-sectional front view of the piston pump of FIG. 16 with the piston-forming element in an intermediate position between the fully retracted position and the fully extended position.
Figure 18:
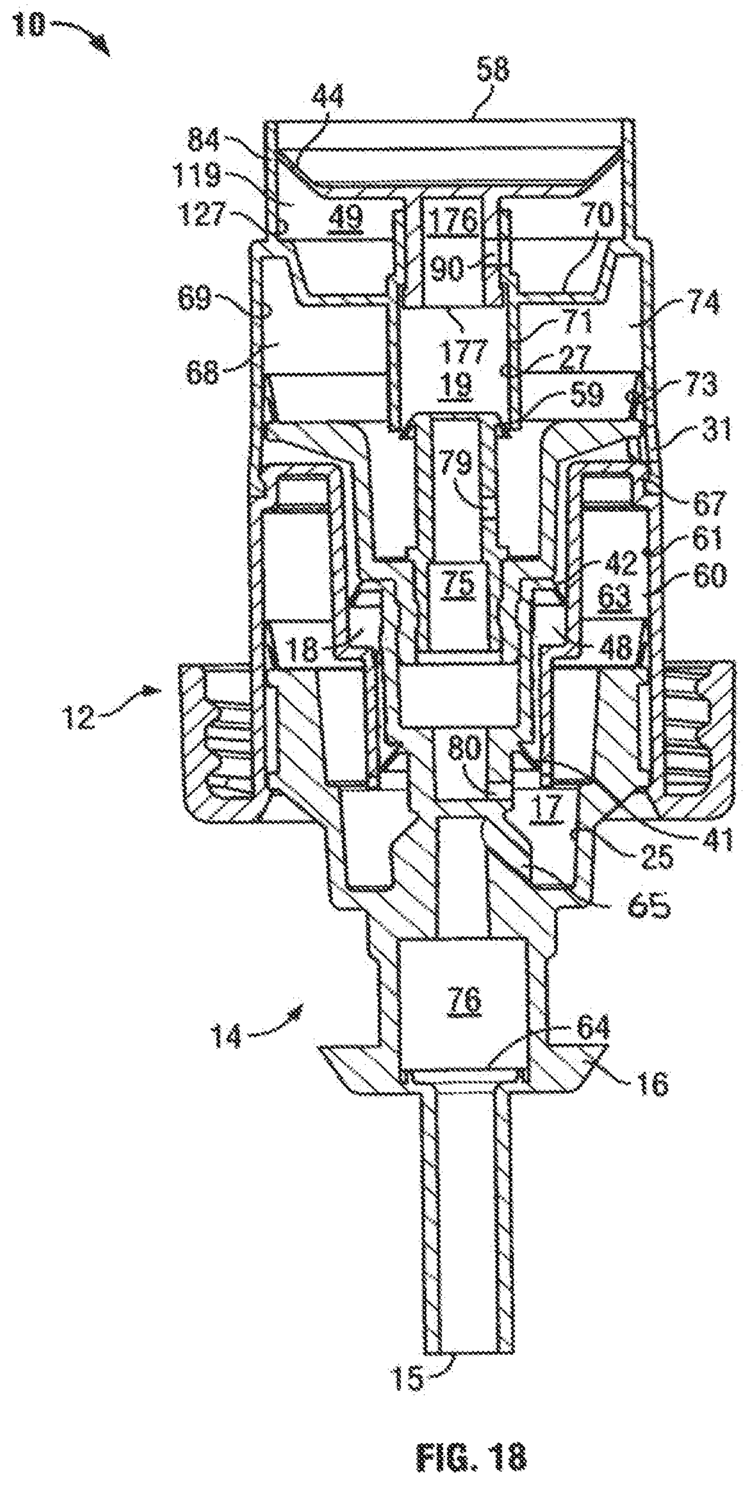
FIG. 18 is a cross-sectional front view of the pump of FIG. 16 with the piston-forming element in a fully extended position.

Reference is made to FIGS. 16 to 18 which illustrate a sixth embodiment of a piston pump 10 in accordance with the present invention. The sixth embodiment has close similarities to the fifth embodiment, however, in the sixth embodiment, the air vent disc 44 is shown as carried by the piston body forming member 12 rather than by the piston forming element 14 which was the case with the fifth embodiment.

The piston chamber-forming body 12 defines six coaxial chambers, namely an outer air chamber 60, an outer chamber 17, an inner chamber 18, an inner air pump chamber 68, a vent chamber 119 and an inner air chamber 19.

In the sixth embodiment of FIGS. 16 to 18, as in the fifth embodiment, from the shoulder 67 between the wall 26 of the inner chamber 18 and the wall 61 of the outer air pump chamber 60, the piston chamber-forming body 12 extends inwardly as the cylindrical wall 69 to the radially inwardly extending annular end wall 70 which supports the central axially extending tube member 71. The tube member 71 extends through the annular end wall 70 with the tube member 76 open at both axial ends. The inner air pump chamber 68 is defined within the wall 69.

In the sixth embodiment of FIGS. 16 to 18, from the end wall 70, the piston chamber-forming body 12 extends inwardly as a cylindrical outer vent tube 84 having a cylindrical wall 127. The outer vent tube 84 is open at an inner end 58 into the bottle. An inner air chamber 119 is defined inside the wall 127.

The air vent disc 44 is provided within the inner air chamber 119 mounted to the tube member 71 of the piston chamber-forming member 12. The air vent disc 44 is carried by an axially inner vent tube 128 which is coaxially received and secured within the tube member 71. The inner vent tube 128 has an inner vent passage 176 open at its inner end 177 into tube member 71 and the vent chamber.

The air vent disc 44 extends radially outwardly from the tube member 71 to engage the wall 127 of the inner air chamber 119. The air vent disc 44 includes an elastically deformable edge portion proximate the wall 127 circumferentially thereabout. The air vent disc 44 engages the wall 127 of the inner air chamber 119 to substantially prevent fluid flow in the inner air chamber 119 axially past the air vent disc 44 in an axially outward direction, however, the air vent disc 44 is adapted to elastically deform away from the wall 127 of the inner air chamber 119 to permit fluid flow in the inner air chamber 119 past the air vent disc 44 in an axial inward direction.

In the embodiment of FIGS. 16 to 18, the inner air pump chamber 68 is provided inside its cylindrical wall 69 is closed by the annular end wall 70. The annular end wall 70 carries the tube member 71 having a wall 27. A seal disc 59 is carried on an inner end of the piston-forming element 14. The seal disc 59 is axially slidable within the tube member 71 to selectively engage the wall 27.

A vent duct 90 is provided through the inner vent tube 128 and through the wall 127 of the tubular member 71 to provide communication at all times from the inner air chamber 119 to the vent chamber 19.

Within the inner air chamber 119 and the vent chamber 19 in between the air vent disc 44 and the air seal disc 59, an inner air compartment 49 is defined in which communication between the inner air chamber 119 and the vent chamber 19 is provided at all time through the vent duct 90.

Within the vent chamber 19 and the inner air pump chamber 68 outwardly of the piston stem 36 and between the air seal disc 59 and the inner air pump seal disc 73 an inner air pump compartment 74 is defined. The inner end 24 of the tube member 71 opens into the inner air pump compartment 74.

As in the fifth embodiment of FIGS. 13 to 15, in the sixth embodiment of FIGS. 16 to 18, the inner passage 75 via the inner bore 79 and the outer bore 80 places the inner air pump compartment 74 in communication with the outer air pump compartment 63, and the outer passage 76 via the channel 65 places the outer air pump compartment 63 in communication with the outlet opening 15.

In operation, on the air seal disc 59 being moved in a withdrawal stroke outwardly, the air seal disc 59 will in the fully withdrawn position of FIG. 18 cease to prevent flow axially outwardly therepast from the inner air pump compartment 74 to the inner air compartment 49 at which time the air vent disc 44 will experience the pressure differentially there across between the pressure inside of the bottle and pressure in the inner air compartment 49 which is in communication with the atmosphere at the discharge outlet 15. As may be seen in FIG. 18 with the air seal disc 59 withdrawn axially outwardly of the outer end 20 of the tube member 71, communication is provided between the axially outward side of the air vent disc 44 and the discharge outlet 15 via the inner air compartment 119, vent duct 90, the inner vent passage 176, the vent chamber 19, inner air pump compartment 74, duct 79, inner passage 75, duct 80, outer air pump compartment 63, channel 65 and outer passage 76. When there is a sufficient pressure differential there across the air vent disc 44, the air vent disc 44 will permit air flow into the bottle for vacuum relief.

Figure 19:
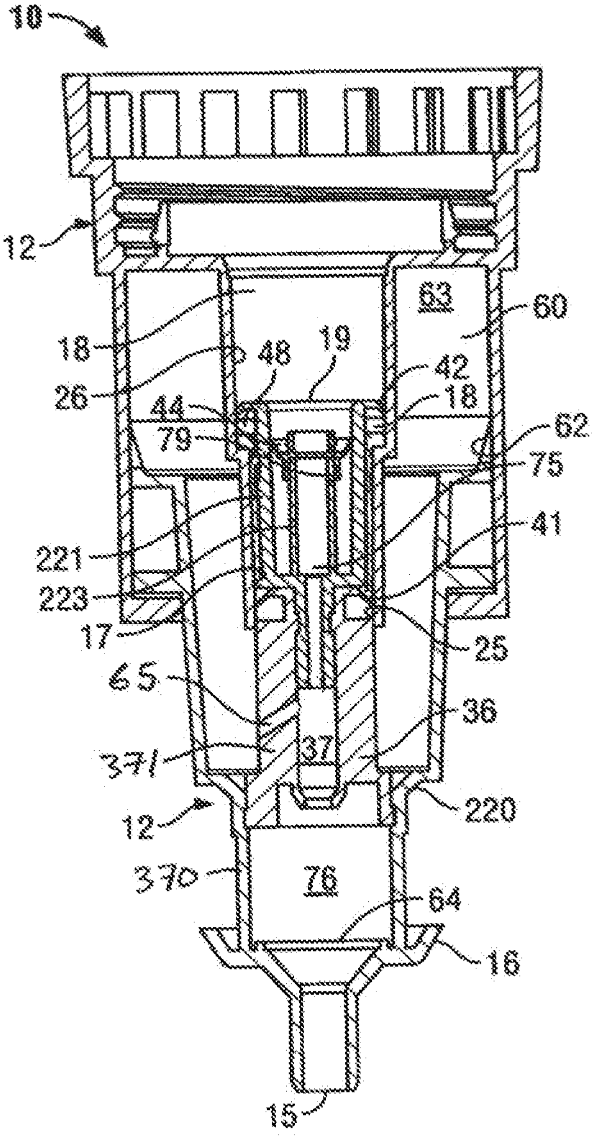
FIG. 19 is a cross-sectional front view of a piston pump in accordance with a seventh embodiment of the present invention with a piston-forming element in a fully extended position.
Figure 20:
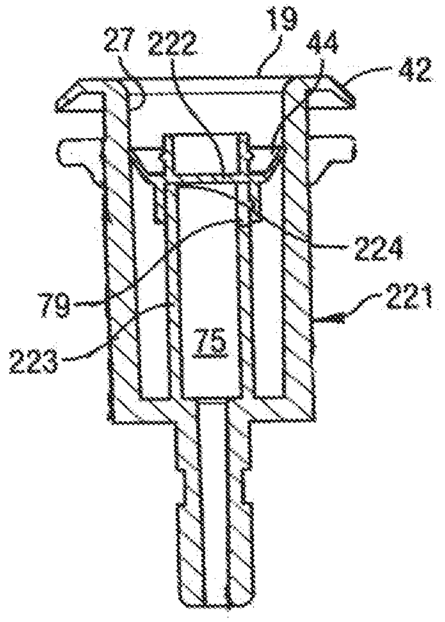
FIG. 20 is an enlarged view of a portion of the piston-forming element of the piston pump of FIG. 19.

Reference is made to FIGS. 19 to 22 which show a seventh embodiment of a piston pump in accordance with the present invention. The piston pump 10 as with the other embodiments includes a piston chamber-forming member 12 and a piston-forming element 14 coaxially slidably received therein. The seventh embodiment, as seen in FIG. 19, has close similarities to the embodiment of FIG. 13 in having an outer air compartment 63 within the outer air chamber 60 and the outer chamber 17 between the air seal disc 62 and the outer disc 41; and a liquid compartment 48 within the outer chamber 17 and the inner chamber 18 between the outer disc 41 and the inner disc 42. Channel 65 extends from the outer air compartment 63 radially into the central passageway 37 to dispense air and fluid through the foam forming member 64 and out the discharge outlet 15. The piston-forming element 14 is shown as comprising an outer member 220, an intermediate member 221 and an inner member 222. The outer member 220 comprises an outer element 370 and an inner element 371. The intermediate member 221 carries the inner disc 42 as extending radially outwardly therefrom. Coaxially within the intermediate member 221 there is provided a cylindrical air chamber 19 with a wall 27. Coaxially within the chamber 19 there is provided an inner tube 223 spaced radially inwardly from the wall 27 and extending upwardly to an axially inner end 224. The inner tube 223 defines an inner passageway 75 therein open at its outer end to the central passageway 37. The inner member 222 is secured to the inner end 224 of the inner tube 223 and closes the inner end of the inner passageway 75. The inner member 222 carries the air vent disc 44 extending radially outwardly and axially inwardly. A radially extending inner bore 79 provides communications from the inner passageway 75 within the interior tube 223 into the air chamber 19. The air vent disc 44 is adapted to elastically deform away from the wall 27 of the air chamber 19 to permit flow in the air chamber 19 inwardly past the air vent disc 44 in an axially inwardly direction when the pressure differential between the pressure within the bottle is less than the pressure within the central passageway 37.

Figure 21:
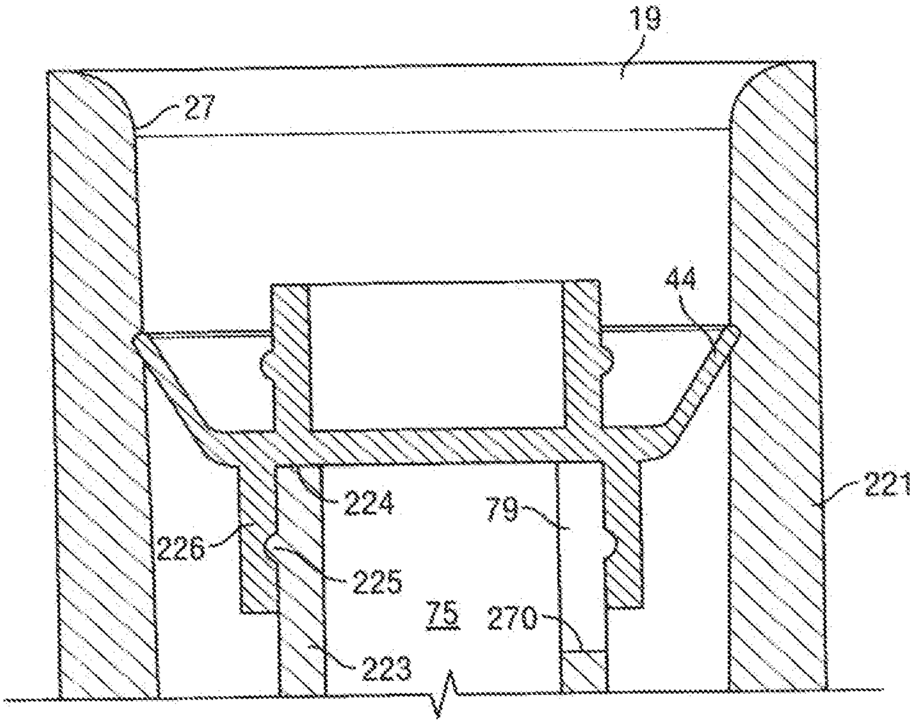
FIG. 21 is a further schematic enlarged view of a selected area of the portion of the piston shown in FIG. 20.
Figure 22:
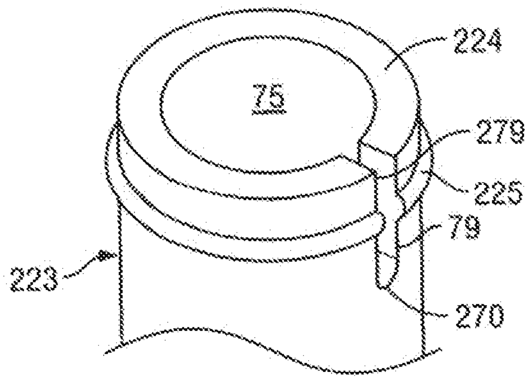
FIG. 22 is a pictorial view of the inner tube of the portion of the piston shown in FIG. 21.

As seen in FIGS. 21 and 22, the inner bore 79 is provided as a slotway 279 extending axially outwardly and radially through the wall of the inner tube 223 from the inner end 224 of the inner tube 223 to a blind outer end 270. The inner tube 223 has an annular boss 225 circumferentially there around which is adapted to be received in an annular groove inside an axially outwardly extending cylindrical stub wall 226 of the inner element 220 to securely couple the inner member 222 onto the axially inner end 224 of the inner tube 223 as in a snap-fit manner yet with the inner bore 79 open to permit fluid flow radially through the wall of the inner tube 223.

Figure 23:
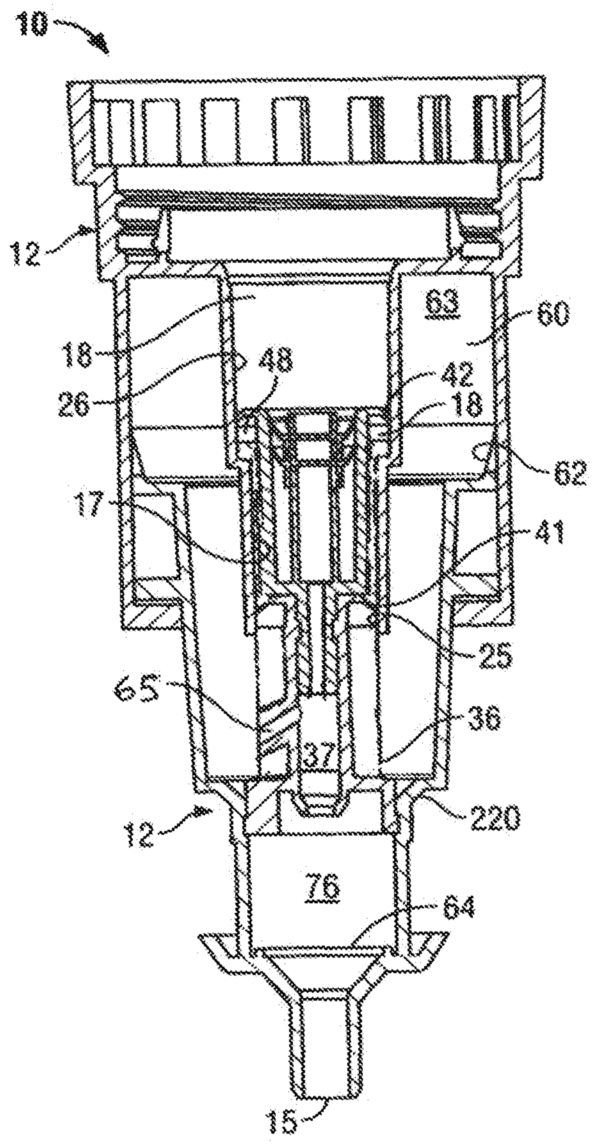
FIG. 23 is a cross-sectional front view of a piston pump in accordance with an eighth embodiment of the present invention with a piston-forming element in a fully extended position.
Figure 24:
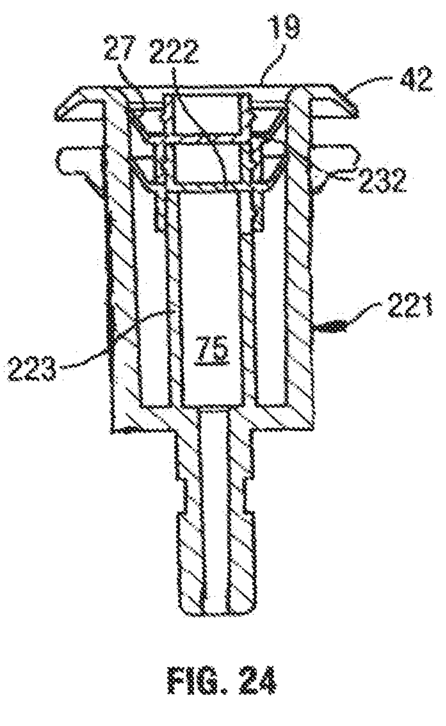
FIG. 24 is an enlarged view of a portion of the piston-forming element of the piston pump of FIG. 23.
Figure 25:
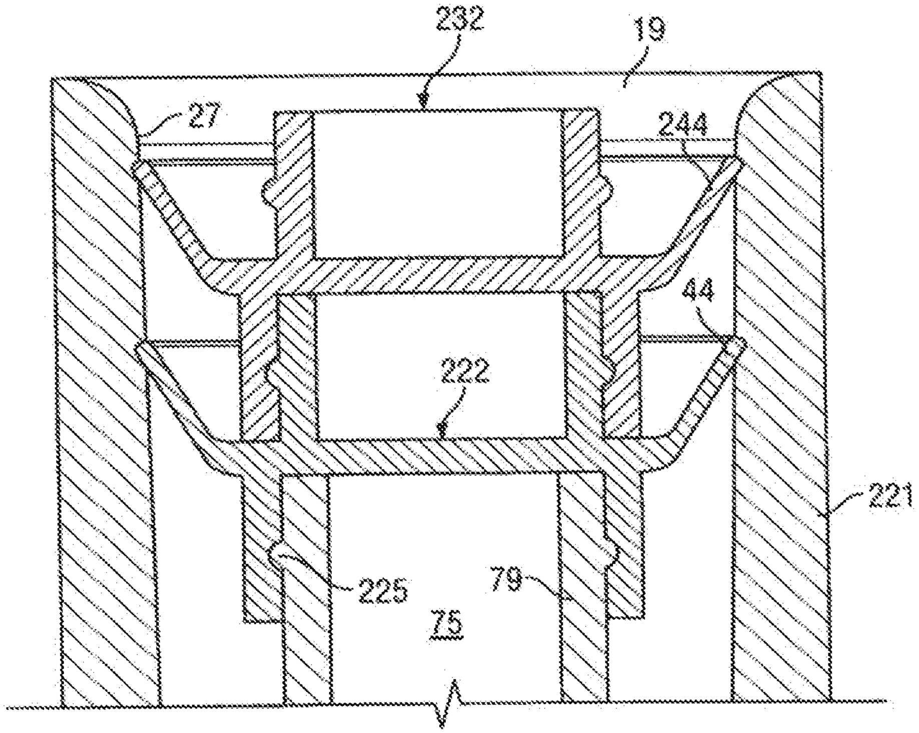
FIG. 25 is a further schematic enlarged view of a selected area of the portion of the piston shown in FIG. 23.
Figure 26:
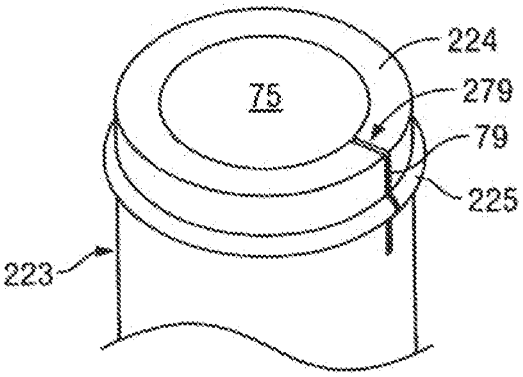
FIG. 26 is a pictorial view of the inner tube of the portion of the piston shown in FIG. 25.
Figure 27:
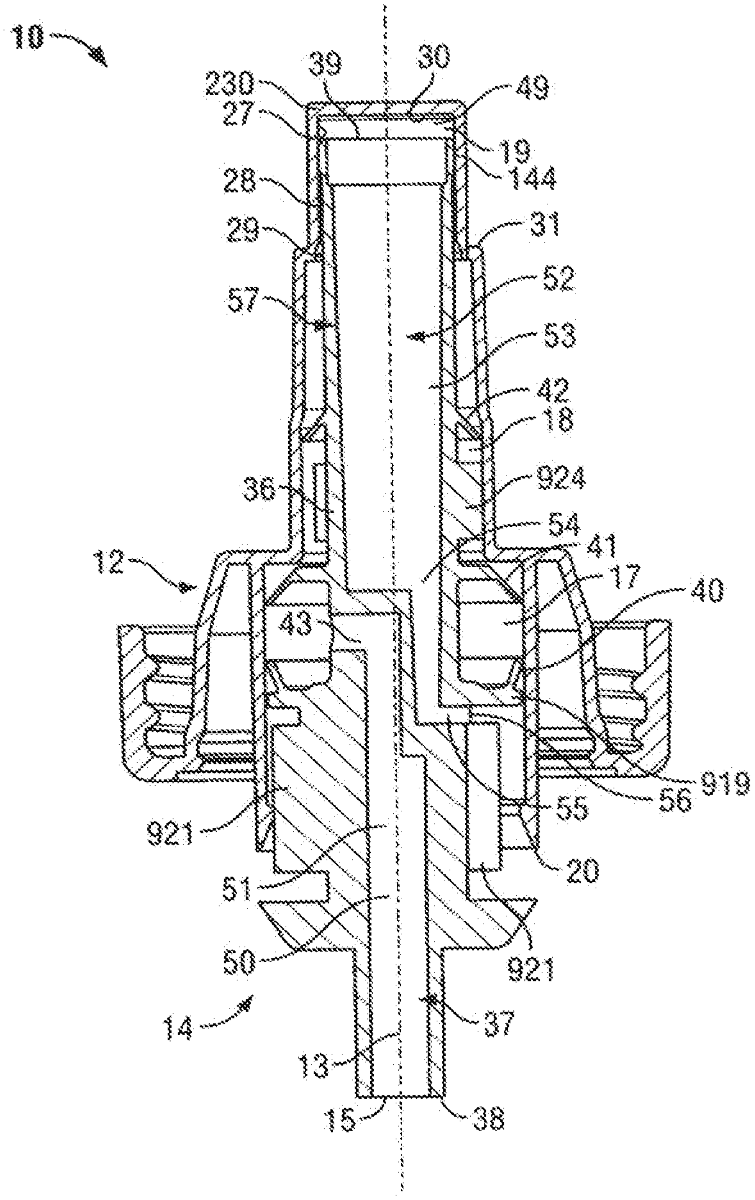
FIG. 27 is a cross-sectional front view of a piston pump in accordance with a ninth embodiment of the present invention with a piston-forming element in a fully retracted position.
Figure 28:
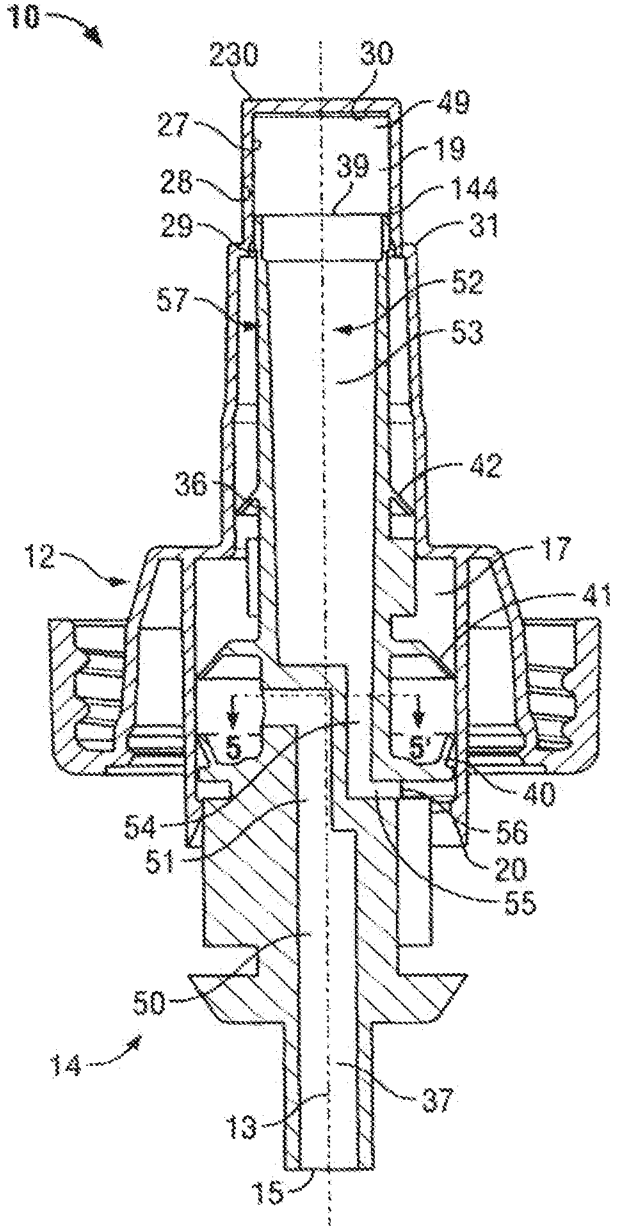
FIG. 28 is a cross-sectional front view of the piston pump of FIG. 27 with the piston-forming element in an intermediate position between the fully retracted position and a fully extended position.

Reference is made to FIGS. 23 to 26 which show an eighth embodiment of the piston pump in accordance with the present invention. The embodiment of FIGS. 23 to 26 is substantially identical to the embodiment illustrated in FIGS. 19 to 22 but for the exceptions that the slotway 279 forming the inner bore 79 is of substantially reduced circumferential extent and a secondary inner member 232 is provided identical to the inner member 222 and coupled to the inner member 222 with an annular channel of the secondary inner member 232 engaged on an annular boss 235 on the inner member 222. The secondary member 232 carries a secondary air vent disc 244 which, like the air disc 44, is resiliently biased radially outwardly into the wall 27 of the inner air chamber 19. In the embodiment of FIG. 25, each of the air disc 44 and the secondary air disc 244 will deflect away from the wall 27 of the air chamber 19 when the pressure differential there across is sufficiently great.

In each of the embodiments of FIGS. 19 and 23, the air vent disc 44 and the secondary air vent disc 244 do not slide axially relative to the wall 27 and thus there is not the opportunity for each air vent disc to become, during movement of the piston-forming element, engaged with different portions of the wall 27 of the chamber 19. Thus, in the embodiments of FIGS. 19 and 23, the integrity of the air vent disc 44 in preventing leakage of fluid from the reservoir bottle out to the passageway 37 is important. Whereas in FIG. 19, there is but the single air vent disc 44, in the embodiment of FIG. 23, there is a secondary air vent disc 244 thus leakage of fluid pass the air vent discs would only occur if both the air vent disc 44 and the secondary air vent disc 244 would fail.

In addition, in the embodiment of FIGS. 23 to 26, should both air vent discs 44 and 244 fail, the provision of the slot 279 to have a relatively small width can act as an effective one-way mechanism to restrict fluid flow radially therepast in that fluids, particularly viscous fluids, would have a relatively large frictional resistance to passing through the narrow slotway 279 as contrasted with the relatively low frictional resistance of air to pass radially outwardly therethrough. In addition, if there is leakage of fluid past the air vent disc 44, the annular space within the air chamber 19 annularly outward of the inner tube 223 would fill with liquid and insofar as liquid would rise to a height above where the inner bore 79 opens outwardly underneath the inner tube 226, this would further assist the resistance of fluid flow outwardly.

Reference is made to FIGS. 27 to 30 which illustrate a ninth embodiment of a piston pump 10 in accordance with the present invention. The operation of the ninth embodiment of FIG. 27 has similarities to that in the second embodiment of FIGS. 4 to 6. The seventh embodiment of FIGS. 27 to 30 is identical to the embodiment of FIG. 4 with the exceptions (a) the air disc 44 in the embodiment of FIGS. 4 to 7 is replaced in FIGS. 27 to 29 with an annular radially outwardly extending protrusion or boss 144 formed annularly as a radially outwardly directed surface of the tubular member 57, and (b) the hollow tubular member 57 has a slightly different shape and wall thickness. The boss 144 in the embodiment of FIGS. 27 to 29 interacts with the wall 27 of the air chamber 19 in a different manner than the air seal disc 44 in the embodiments of FIGS. 1 to 3.

Figure 29:
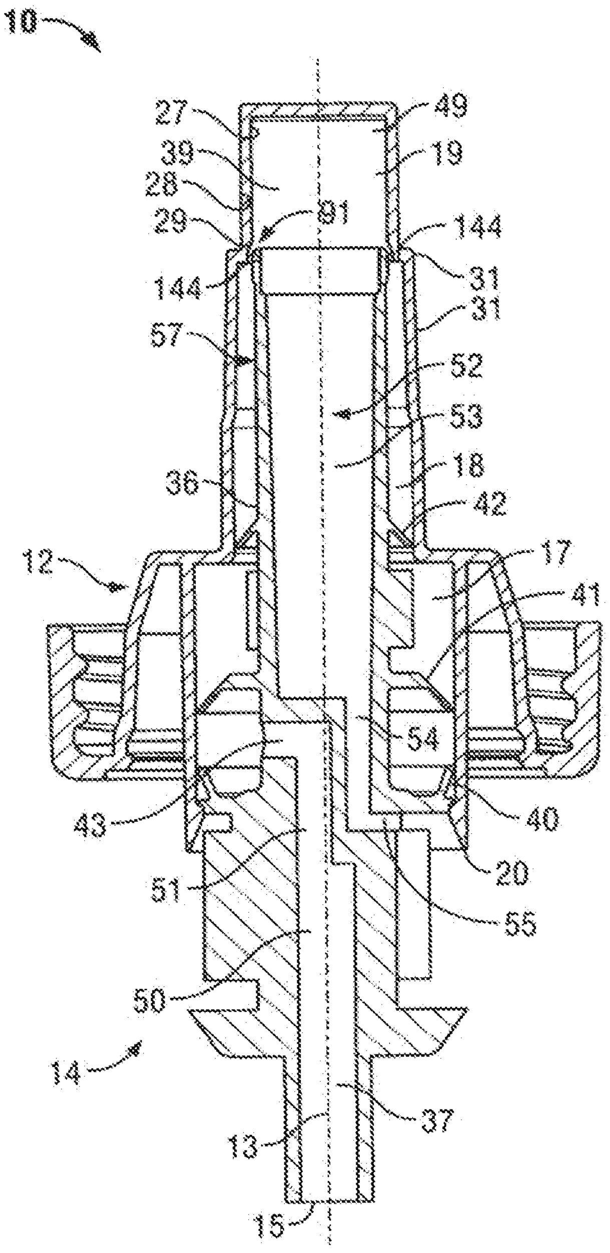
FIG. 29 is a cross-sectional front view of the pump of FIG. 27 with the piston-forming element in the fully extended position.

The ninth embodiment of FIGS. 27 to 30 operates more in the manner of a shuttling valve arrangement in which the interaction between the boss 144 and the wall 27 of the air chamber 19 effectively prevents fluid flow in either direction therepast other than proximate the fully extended position of FIG. 29 in which the boss 144 at the inner end of the hollow tubular member 57 is juxtapositioned relative to the air chamber 19 that air can flow therebetween when a sufficient pressure differential exists between the pressure within the bottle and the air chamber 19.

Figure 30:
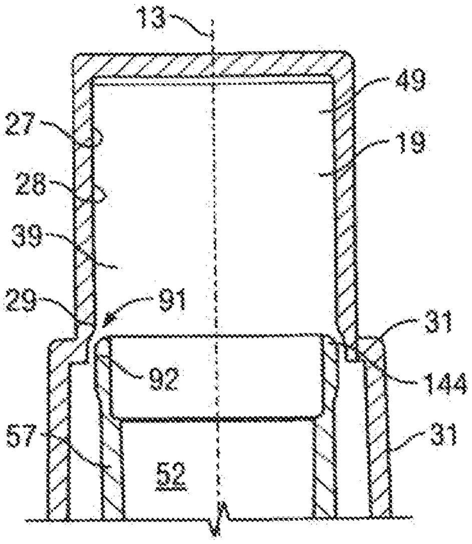
FIG. 30 is an enlarged view of the innermost portion of the piston pump shown in FIG. 29.

As can be seen in FIG. 29 as enlarged in FIG. 30, in the fully extended position, a gap 91 exists between the air boss 144 and the walls forming the air chamber and inner chamber. The gap 91 has a narrow portion 92 of relatively small radial extent. The gap 91 extends axially a relatively short distance over where the narrow portion 92 exists. The gap 91 has a small radial extent over the narrow portion 92 between an outer wider portion 93 where the gap opens to have an enlarged radial extent outwardly from the boss 144 and to the inner end of the boss 144. The dimensions of the narrow portion 92 are selected having regard to the viscosity of the fluid in the bottle such that the resistance of flow of the fluid, typically a liquid within the bottle, through the narrow portion 92 of the gap is sufficiently great that even when the contents of the bottle are under the same pressure as atmospheric pressure, the fluid will not flow through the narrow portion 92 of the gap and thus fluid will not flow under gravity through the gap 91 and out the air passage 52. The gap 91 and its narrow portion 92, however, are selected such that when there is a sufficiently large vacuum created within the bottle, that is, when the pressure differential across the gap 91 is sufficiently great that air will flow from the air compartment 19 through the gap 91 into the air chamber 18 and, hence, into the bottle. As shown in FIG. 30, the boss 144 has a uniform cross-sectional shape and the gap 91 and its narrow portion 92 are controlled by the relative shape of the boss 144, the relative shape of the side wall forming the air chamber 19 and the inner chamber 18 and the relative axial location of the boss 144 relative to the side wall of the air chamber 19 and the inner chamber 18. In moving the boss 144 to the fully extended position as shown in FIG. 29, the boss 144 comes to enter the enlarged diameter outer portion 29 which provides a suitable gap 91 and narrow portion 92 of desired radial extent and axial extent to limit liquid flow outwardly and to permit air flow inwardly when a sufficient pressure differential exists.

Various other physical configurations of the boss 144 and the side wall 27 of the air chamber 19 and the inner chamber 18 may provide for a desired gap 91 as a function of the axial location of the piston 14.

Figure 5:
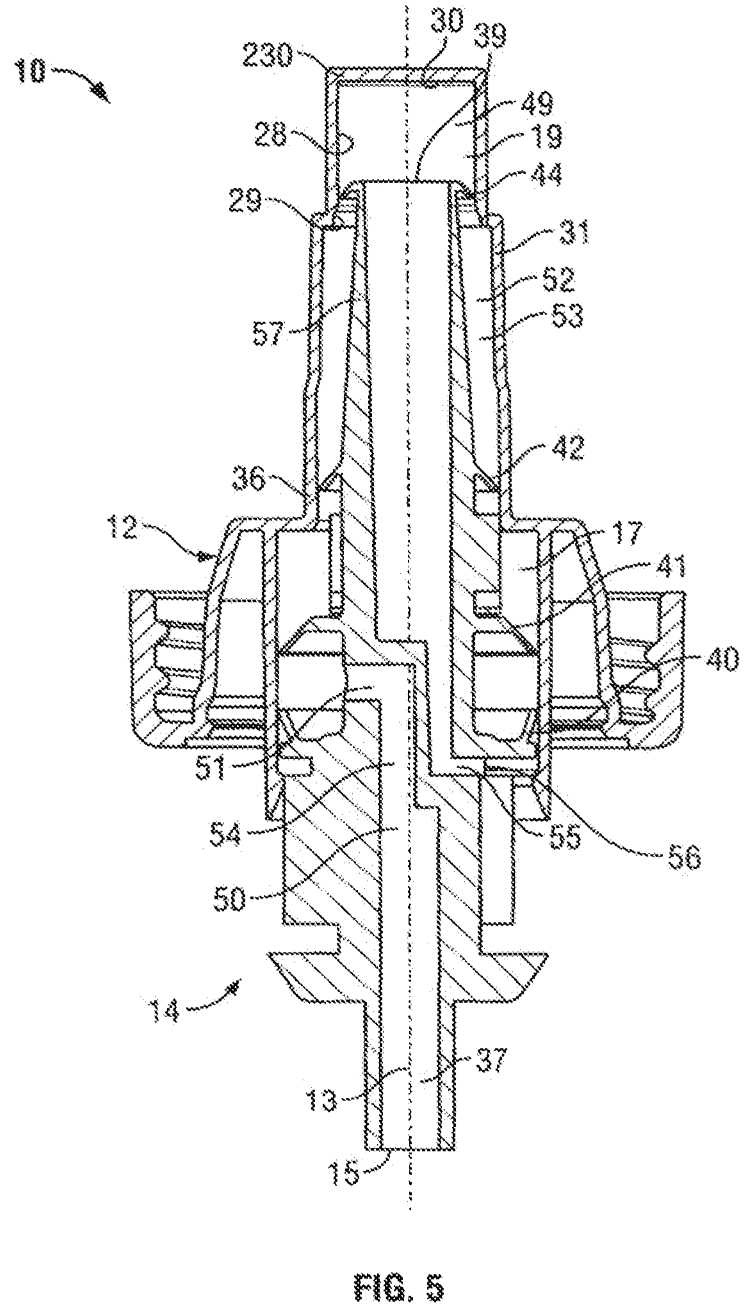
FIG. 5 is a cross-sectional front view of the piston pump of FIG. 4 with the piston-forming element in an intermediate position between the fully retracted position and a fully extended position.
Figure 6:
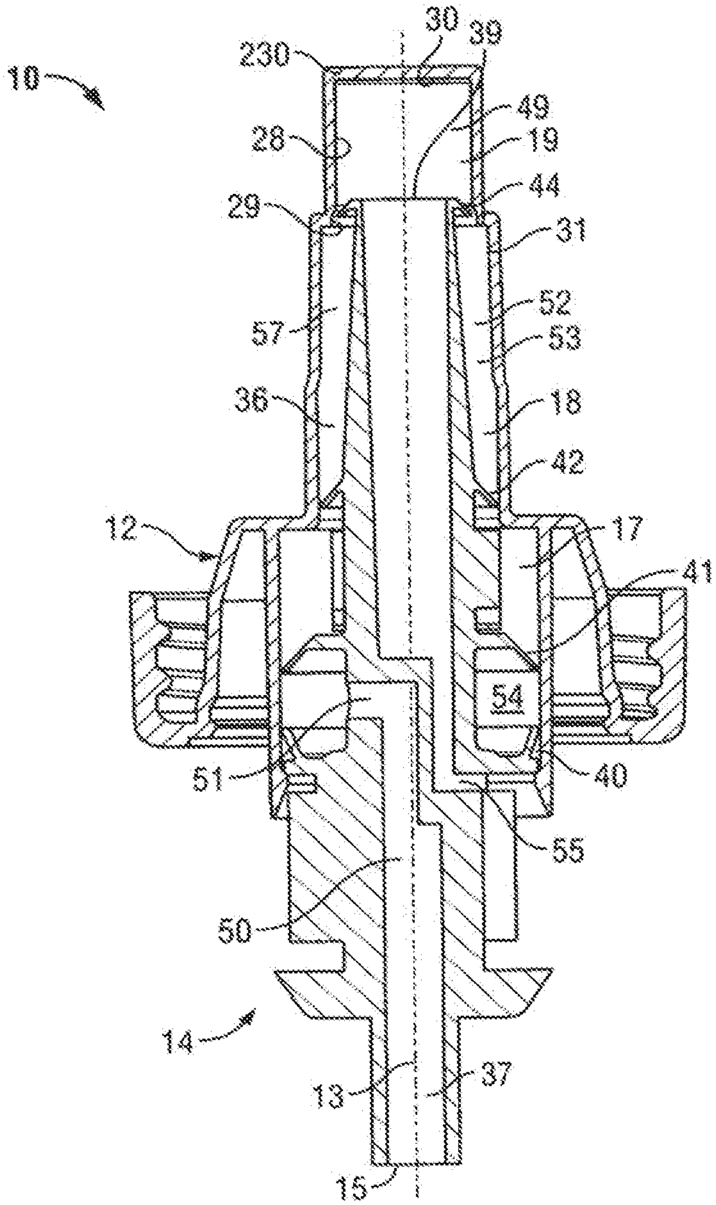
FIG. 6 is a cross-sectional front view of the pump of FIG. 4 with the piston-forming element in the fully extended position.

In the embodiment of FIGS. 27 to 30, as was the case with the embodiment of FIGS. 4 to 6, the configuration of the piston-forming element 14 is selected so as to permit the piston-forming element 14 to be injection molded as a unitary element as from plastic material. Similarly, the piston chamber-forming member 12 of FIGS. 27 to 30 is configured so as to permit the piston chamber-forming member 12 to be injection molded as a unitary element as from plastic material. Thus, the advantageous arrangement of the seventh embodiment as illustrated in FIGS. 27 to 30 also provides a piston pump with advantageous vacuum relief properties which can be injection molded from plastic and comprises merely two separate elements 12 and 14.

Figure 31:
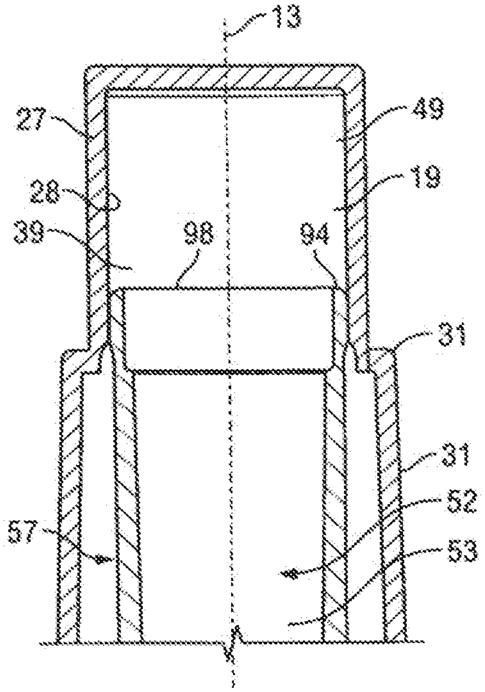
FIG. 31 is an enlarged view similar to FIG. 30 showing the innermost portion of a piston pump in accordance with a tenth embodiment of the present invention in a fully withdrawn position.
Figure 32:
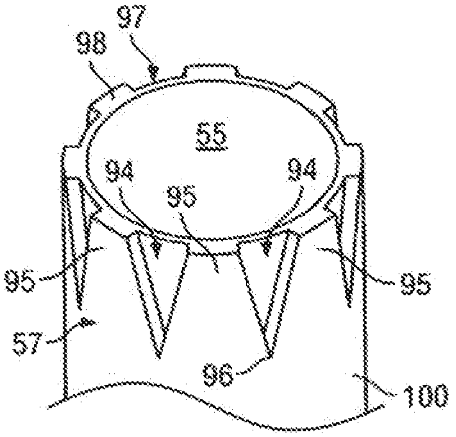
FIG. 32 is a perspective view of the innermost end of a piston element shown in FIG. 31.

Reference is made to the tenth embodiment of FIGS. 31 to 32 which illustrate an arrangement in which the boss 144 of FIGS. 27 to 30 is removed and the inner end of the tubular member 57 is generally cylindrical, however, is provided with radially inward extending and axially extending flutes 94 as best seen, for example, in the enlarged pictorial view of the upper end of the tubular member 57 shown in FIG. 32. The flutes 94 have a blind outer end 96 and increase in circumferential extent and cross-sectional area axially inwardly to the inner ends 97 of the flutes 94 which open axially through an inner end 98 of the tubular ember 57. The tubular member 57 has an outer surface 99 and portions 95 which are between the flutes 94. In a retracted position (not shown), portions 100 of the outer surface of hollow tubular member 57 axially outwardly of the flutes 94 are in close engagement with the inner wall 28 to assist in substantially forming a seal preventing liquid flow therepast.

FIG. 31 shows a configuration in which the piston is in a fully withdrawn position in which it can be seen that the portions 95 between the flutes 94 are in engagement with the enlarged inner portion 28 yet with the flutes 94 providing axially extending gaps having a radial dimension appropriate for restricting liquid flow outwardly yet permitting air flow inwardly when a sufficient pressure differential exists.

While the flutes 94 are shown of the piston element, similar flutes could be provided on the inside surface of the wall of the chamber 19 of the piston chamber-forming element 12. The flutes, whether formed on the piston 14 and/or on the piston chamber-forming member 12, can provide such desired advantageous gaps when the piston is in the desired orientation between a withdrawn and extended position. Such a configuration assists in facilitating the manufacture of the pump as with the piston 14 being a single element and the piston chamber-forming member 12 being a single element. The flutes 94 are shown to taper to increase in cross-sectional area axially. This is preferred but not necessary. Flutes of constant cross-sectional area may be used.

Reference is made to FIGS. 33 to 40 which show an eleventh embodiment of a piston pump 10 in accordance with the present invention and adapted to simultaneously dispense liquid mixed with air preferably producing foam. The eleventh embodiment has close similarities to the other embodiments and similar reference numerals are used to refer to similar elements. The eleventh embodiment has, for example, close similarities to the first embodiment of FIGS. 1 to 3 in respect of the primary liquid pump 101 and a secondary or inner air pump 102. The eleventh embodiment incorporates an outer air pump 103 having similarities to the outer air pump 103 in the fifth embodiment of FIGS. 13 to 15.

A new feature of the eleventh embodiment of FIGS. 33 to 40 is that the piston chamber-forming member 12 includes a center post member 110 coaxial about the axis 13. The air chamber end wall 230 which closes the inner end 30 of the inner air chamber 19 is annular and joins an axially inner end of an outer tubular member 108 and an axially inner end of the center post member 110. The center post member 110 includes a circumferential post side 111 which extends from the inner end 30 along an axial extent of the center post member to where the center post member 110 is closed by the outer end 113 which merges with the post side 111. The post side III has a radially outwardly directed post wall 114 which in the preferred embodiment is circular in any cross-section normal to the axis 13. As seen, the post side 111 is frustoconical and tapers from the inner end 30 to the outer end 113.

The outer tubular member 108 extends axially outwardly from the end wall 230 to the open outer end 20. The piston chamber-forming member 12 defines a master chamber therein within the outer tubular member 108 open radially outwardly at the open outer end 20. As can be seen, the master chamber defined within the outer tubular member 108 comprises the inner air chamber 19, the liquid inner chamber 18, the liquid outer chamber 17 and the outer air chamber 60. The outer tubular member 108 has a radially inwardly directed circumferential chamber wall over an axial length of the outer tubular member which chamber includes the walls 27, 26, 25 and 61 of the inner air chamber 19, the inner chamber 18, the outer chamber 17, and the outer air chamber 60. The master chamber thus comprises a series of coaxial adjacent chambers each joined by an annular shoulder between adjacent chambers, with each innermore chamber opening outwardly into the next outward chamber and with each innermore chamber having a diameter less than the next outward chamber. The master chamber includes an annular inner chamber portion between the outer tubular member 108 and the center post member 110 along the axial extent of the center post member 110.

The piston-forming element 14 comprises the hollow central axially extending piston stem 36 extending along the axis 13 from a discharge outlet 15 at the axial outer end 38 of the stem of the piston-forming element 14 through to the inner opening 39 at an inner end 203 of the stem 36 of the piston-forming element 14. The central passageway 37 is defined within a radially inwardly directed passageway wall 122 of the stem 36. The central passageway 37 is shown as including an inner portion 116, an intermediate portion 118 and an outer portion 120 of successively reduced diameter. A shoulder 117 between the inner portion 116 and the intermediate portion 118 has a foam inducing screen 64 secured thereto and spanning across the passageway 37. Similarly, a shoulder 119 between the intermediate portion 118 and the outer portion 120 carries a foam inducing screen 64*a* secured thereto across the passageway 37.

The center post member 110 and the center passageway 37 through the stem 36 are complementary sized such that the center post member 110 extends coaxially through the inner portion 116 of the passageway 37. The passageway wall 122 is spaced from the post wall 114 so as to permit axial flow of fluid therebetween in an axially extending annular flow space 124 between the post wall 114 of the center post member 110 and the passageway wall 122 about the passageway 37 of the stem 36.

The stem 36 of the piston-forming element 14 is coaxially slidably received in the master chamber of the outer tubular member 108 of the piston-chamber forming member 12 with the center post member 110 extending axially into the central passageway 37 of the stem 36 through the axial inner end 203 of the stem 36 and with the various axially spaced annular members comprising the discs 62, 40, 41, 42 and 44, extending radially outwardly from the stem 36 towards the chamber wall.

Figure 33:
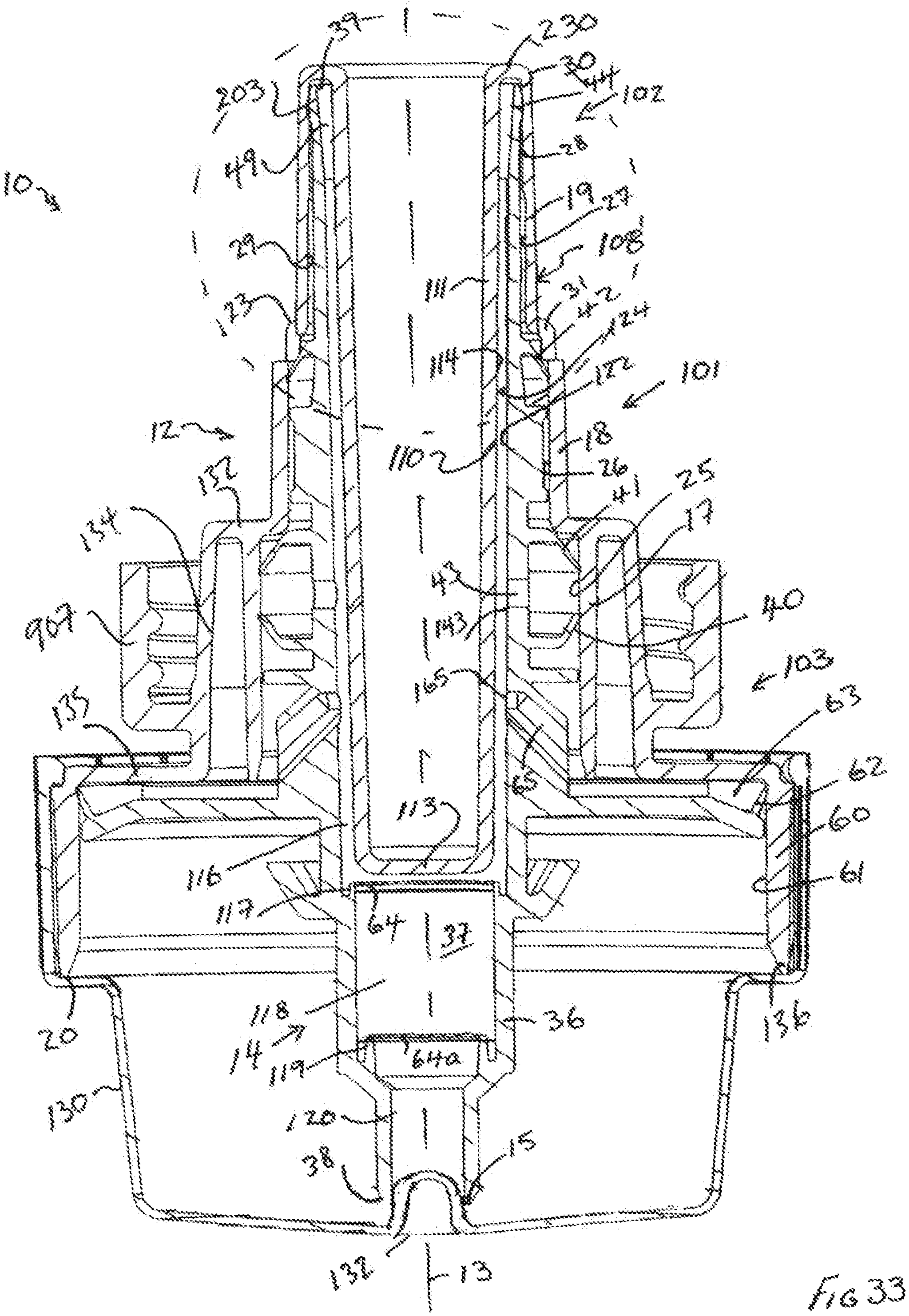
FIG. 33 is a cross-sectional front view of a piston pump and a closure cap in accordance with an eleventh embodiment of the present invention with the piston-forming element in a fully retracted position.
Figure 34:
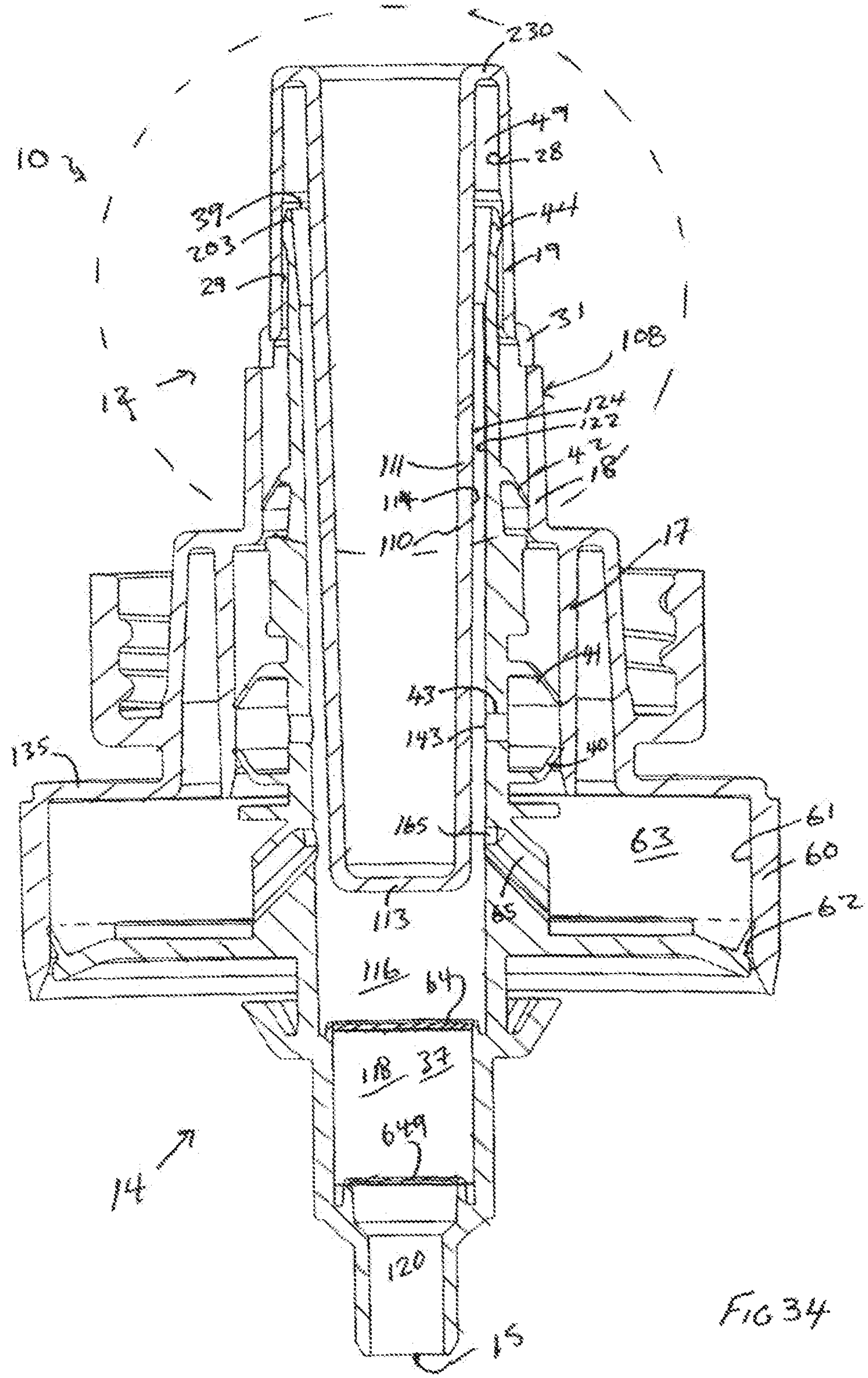
FIG. 34 is a cross-sectional front view of the pump of FIG. 33 with the piston-forming element in the fully extended position.

As seen in FIGS. 33 and 34, the foam inducing screens 64 and 64*a* are provided in the central passageway 37 axially inwardly of the discharge outlet 15 and axially outwardly of the closed outer end 113 of the center post member 110 when the piston-forming element 14 is in any of the positions between the extended position and the retracted position.

The channel 65 extends radially from a radially inwardly directed outlet 165 in the passageway wall 122 of the stem 36 through the passageway wall 122 of the stem 36 to connect the outer air compartment 63 with the flow space 124 between the center post member 110 and the stem 36.

In the eleventh embodiment in a retraction stroke, in movement from the extended position of FIG. 34 to the retracted position of FIG. 33, the stepped liquid pump 101 discharges liquid through the duct 43 into the annular flow space 124 simultaneously with the outer air pump 103 discharging air and/or liquid from the outer air compartment 63 radially through the channel 65 into the annular flow space 124. The liquid and air discharged into the annular flow space 124 passes through the annular flow space 124 axially outwardly towards the discharge outlet 15 and, in so doing, air and liquid are intermixed and simultaneously delivered to the foam inducing screen 64, passed through the foam inducing screens 64 and 64*a* producing foam which is discharged out the discharge outlet 15.

The provision of the center post member 110 within the inner portion 116 of the passageway 37 provides a restriction to axial flow within the passageway 37 proximate a radially inwardly directed outlet 143 of the duct 43 and/or the radially inwardly directed outlet 165 of the channel 65. That is, the cross-sectional area through which fluid discharged from the channel 65 may flow axially is restricted to the cross-sectional area of the annular flow space 124 normal to the axis 13. This restriction of the area for flow of the air and liquid discharged from the duct 43 and/or the channel 65 provides for advantageous intermixing of the air and liquid flowing from the duct 43 and/or the channel 65 and enhances the mixing of the air and fluid to engage with the foam inducing screen 64. Such a restriction and arrangement has been found advantageous to provide for the generation of foam. More particularly, this arrangement has been found to provide for foam being discharged which is of an increased consistency throughout a retraction stroke. For example, in tests of prototypes having a configuration and proportions similar to that of FIG. 11, however, in which the center post member 110 is not provided but rather the air chamber end wall 230 extends radially across the inner end 30 of the air chamber 19, during a retraction stroke, the consistency of the foam varied considerably from the beginning of the retraction stroke to the end of the retraction stroke with poor quality foam and higher liquid content during the initial portion of the retraction stroke and lesser liquid content and higher foaming during the later portion of the retraction stroke.

In accordance with the present invention, providing the center post member 110 to be coaxially received within the passageway 37 so as to provide the restriction in the area for cross-sectional axial flow of fluid being discharged from at least the channel 65 is, in accordance with the invention, advantageous to increase the velocity of liquid and air passing through the flow space 124 preferably to better mix and comingle air and liquid in the flow space 124 at least opposite of the outlet 165 of the channel 65 or downstream, that is, axially outwardly of the outlet 65 and before the foam inducing screen 64 during at least portions of the retraction stroke.

The flow space 124 provides about the outlet 165 of the channel 65 the restriction to flow axially through the flow space 124 which increases the velocity of fluid flowing axially outwardly through the flow space 124. Preferably, this assists in increasing the mixing of air with liquid in this restriction of the flow space 124.

As can be seen in FIG. 34 representing the piston-foaming element 14 in a fully extended position, even in the fully extended position, the center post member 110 extends into the passageway 37 axially outwardly past the outlet 165 of the channel 65 to provide the restriction to flow of air and/or liquid being discharged from the channel 65 in a retraction stroke.

Referring to FIG. 33, the piston pump 10 is formed from two principal elements being a piston chamber-forming member 12 and a piston-forming element 14, each of which is preferably illustrated in FIG. 33 configured so as to be manufactured by injection molding as a unitary element. The piston-forming element 14 also has as two additional components in the first foam inducing screen 64 and the second foam inducing screen 64*a* which may be preferably formed as from a plastic or metal mesh screen and secured to the piston-forming element 14 as in a separate manufacturing process after the piston-forming element 14, other than the screens 64 and 64*a*, is injection molded as a unitary element. For example, when made of metal, each of the screens 64 and 64*a* may be heat welded and placed on a respective shoulder 117 and 119 within the piston-forming element 14.

FIG. 33 also shows an optional removable cap 130 secured in a snap-fit onto the piston chamber-forming member 12, closing an outer end of the piston chamber-forming member 12 and retaining the piston-forming element 14 therein in a fully retracted position as shown in FIG. 33, preferably, with an axially inwardly extending plug 132 of the cap 130 engaged within the discharge outlet 15 of the piston-forming element 14 blocking flow through the discharge outlet 15 and holding the piston-forming element 14 in a fully retracted position against axial movement unless the cap 130 is removed. In use of the piston pump 10 of FIGS. 33 to 40, the cap 130 is applied for storage purposes, and to use the piston pump 10 to dispense fluid, the cap 130 is removed and the piston-forming element 14 is movable between the fully retracted position shown in FIG. 33 and the fully extended position of FIG. 34 in a cycle of operation to dispense air and liquid as foam from the discharge outlet 15.

The piston chamber-forming member 12 in the eleventh embodiment of FIGS. 33 to 40 has close similarities to that of the first embodiment insofar as being coaxial about the common axis 13 and with an outer tubular member 108 defining coaxial cylindrical chambers of different diameters including the inner air chamber 19, the liquid inner chamber 18 and the liquid outer chamber 17. In addition, outwardly of the liquid outer chamber 17 in a somewhat similar manner to that illustrated in the fourth, fifth, sixth and seventh embodiments, the outer air chamber 60 is defined within the outer tubular member 108 of the piston chamber-forming member 12 axially outwardly of the outer chamber 17. A transfer port 31 is provided through the wall 27 of the inner air chamber 19 proximate an inner end 23 of the inner chamber 18. The four chambers 60, 17, 18 and 19 are formed by walls 61, 25, 26 and 27, respectively. The inner air chamber 19 is closed by the end wall 230 which carries the center post member 110 which extends coaxially inwardly centrally through the inner air chamber 19, the inner chamber 18 and the inner chamber 17 and into the outer air chamber 60. The piston chamber-forming member 12 carries as depending from the outer tubular member 108, a collar 907 for threadably engaging on the neck of a bottle. Other mechanisms for engaging with a bottle may be provided.

The diameter of the inner air chamber 19 is less than the diameter of the inner chamber 18. The diameter of the inner chamber 18 is less than the diameter of the outer chamber 17. The diameter of the outer chamber 17 is less than the diameter of the outer air chamber 60. Each of the chambers 60, 17, 18 and 19 are coaxial about the axis 13. Each of the chambers opens axially outwardly into the next successive chamber of an enlarged diameter. The wall 27 of the inner air chamber is connected to the wall 26 of the inner chamber 18 by a radially extending shoulder. The wall 26 of the inner chamber 18 is connected to the wall 25 of the outer chamber 17 by an annular shoulder 132. The annular shoulder 132 extends radially outwardly past the wall 25 to an axially extending frusto-conical support wall 134 which extends axially to an annular shoulder 135 from which the wall 61 of the outer air chamber 60 extends axially to a distal outer end 136. The threaded collar 907 is shown as carried on the support wall 134 axially inwardly from the shoulder 135 such that the outer air chamber 60 may be provided external to a bottle upon which the collar 907 is engaged. This is not necessary and the collar 907 could, for example, be provided to extend radially outwardly from the wall 61 of the outer air chamber 60. In FIG. 33, the cap 130 engages the wall 61 of the outer air chamber 60 proximate the shoulder 135 in a snap-fit with the cap 130 enclosing the outer end 136.

The piston-forming element 14 has very close similarities to features of the piston-forming element 14 of the first embodiment of FIGS. 1 to 3. The piston-forming element 14 has a hollow piston stem 36 extending along the axis 13 with a central passageway 37 from the discharge outlet 15 at the outer end 38 to the inner opening 39 at an inner end 203.

The wall 27 of the air chamber 19 has an inner portion 28 and an outer portion 29 with the diameter of the outer portion 29 being greater than the diameter of the inner portion 28. The air vent disc 44 in the eleventh embodiment is provided as a radially outwardly directed bead proximate its inner end which extends radially outwardly farther than adjacent portions of the stem 36 for engagement with the wall 27 of the air chamber to prevent air flow axially inwardly therepast from the air chamber 19 into the bottle via the transfer port 31 when a sufficient pressure differential exists across the air vent disc 44 due to a vacuum within the bottle. Operation is the same as in the first embodiment of FIGS. 1 to 3 in which there is an increased ability for deflection of the air vent disc 44 when the air vent disc 44 is within the enlarged diameter outer portion 29 of the inner air chamber 19 than in the inner portion 28.

As seen in FIGS. 33 and 34, the piston-forming element 14 carries within the outer chamber 17 a sealing disc 40 and an outer disc 41 axially inward from the sealing disc 40. Between the sealing disc 40 and the outer disc 41, the duct 43 provides communication radially through the stem 36 between the passageway 37 and the outer chamber 17. The piston stem 36 carries within the inner chamber 18 an inner disc 42. In the eleventh embodiment of FIGS. 34 to 40, the interaction of the chambers 17 and 18 and the discs 41 and 42 are identical to that in respect of the first embodiment so as to provide as in the first embodiment a stepped fluid pump 101.

Axially outwardly of the sealing disc 40, the piston stem 36 carries an air seal disc 62. The piston stem 36 carries in between the sealing disc 40 and the air seal disc 62 the channel 65 which provides communication through the stem 36 preferably angled upwardly as in the manner described with reference to the fifth embodiment of FIGS. 13 to 15. An outer air chamber 63 is defined within the outer air chamber 60 and the outer chamber 17 in between the air seal disc 62 and the sealing disc 40. The channel 65 provides communication through the stem 36 between the passageway 37 and the outer air compartment 63. The air seal disc 62 together with the outer air chamber 60 form the outer air pump 103 which is operative to draw air into the air chamber 60 via the discharge outlet 15, the passageway 37 and the channel 65 and to discharge air and liquid from within the outer air compartment 63 outwardly via the channel 65, the passageway 37 and the discharge outlet 15.

The outer air pump 103 is in phase with the liquid pump 101 in a sense that during a withdrawal stroke, the outer air pump 103 draws atmospheric in and the liquid pump 101 draws liquid in from the bottle and, in a retraction stroke, the outer air pump 103 discharges air and fluid out the channel 65 into the passageway 37 and the liquid pump 101 discharges fluid into the passageway 37. In a retraction stroke, the liquid discharged by the liquid pump 101 out the duct 43 and the air and/or liquid and air discharged by the outer air pump 103 through the channel 65 are simultaneously discharged via the flow space 124 through the central passageway 37 and through the foam inducing screens 64 and **64*a* to discharge a mixture of air and liquid as foam out the discharge outlet 15**.

Figure 35:
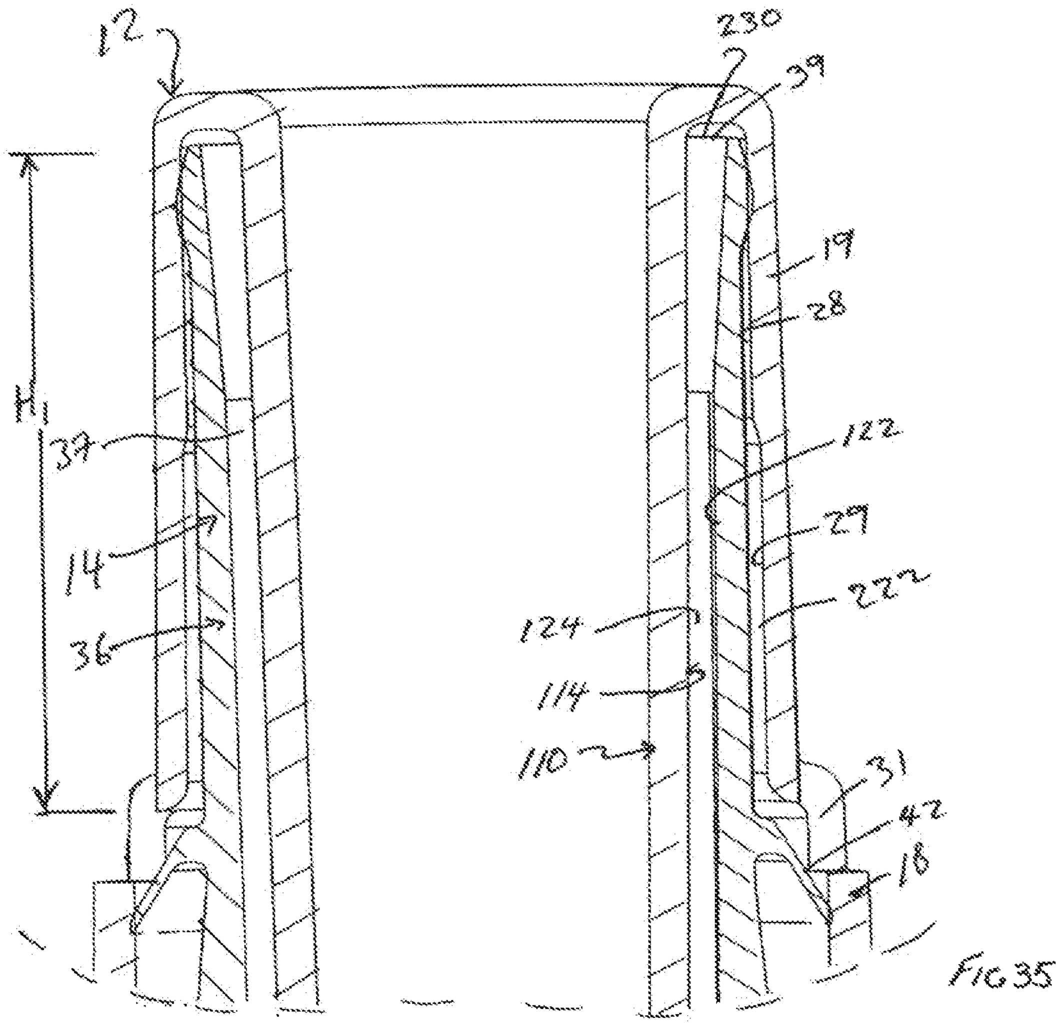
FIG. 35 is an enlarged view of FIG. 33 shown within the broken line circle shown on FIG. 33.
Figure 36:
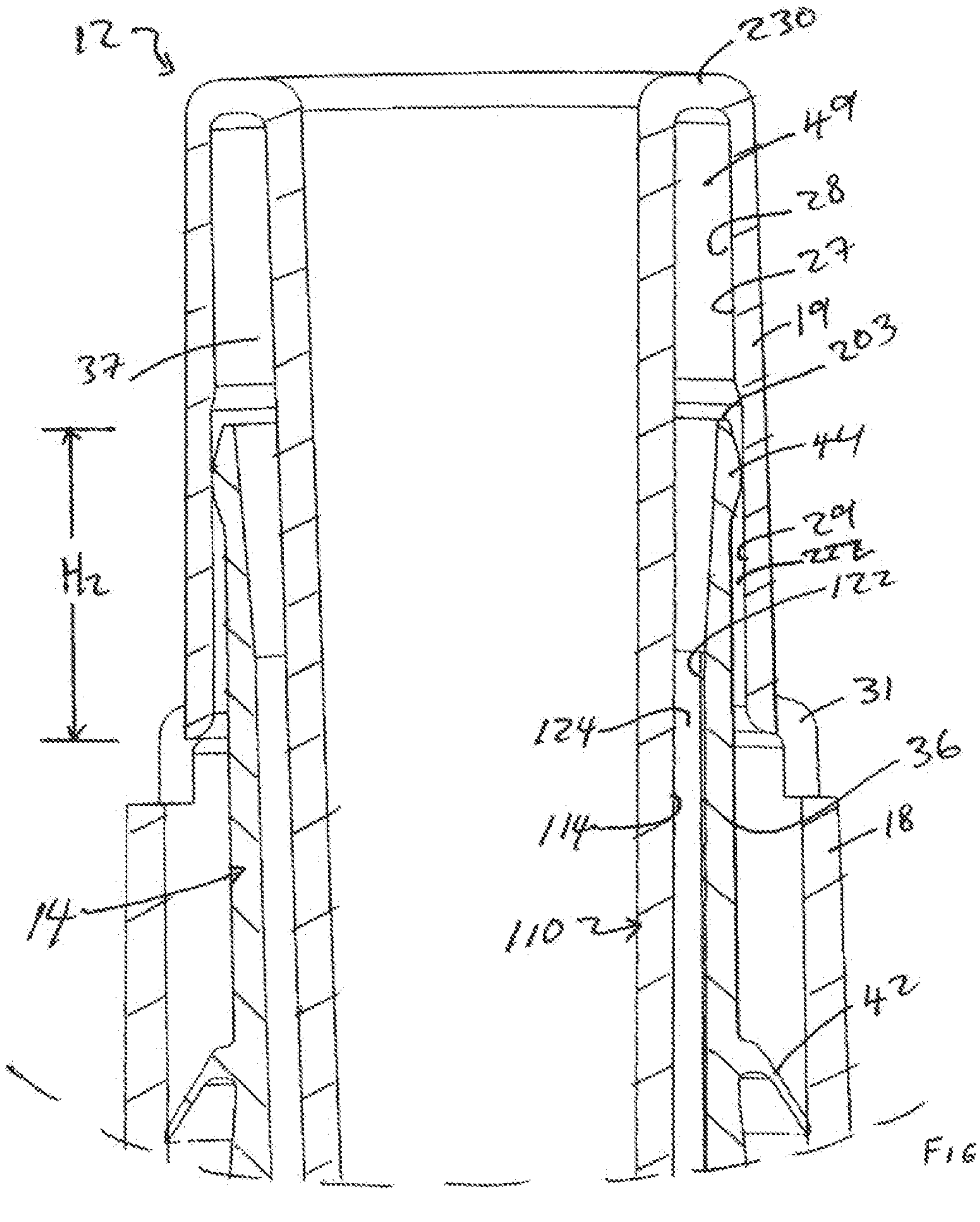
FIG. 36 is an enlarged view of FIG. 34 shown within the broken line circle shown on FIG. 34.

In the eleventh embodiment of FIGS. 33 to 40, as in the first embodiment, within the air chamber 19 inwardly of the vent air disc 44, an air compartment 49 is defined. The air chamber 19 on the axially inner side of the air vent disc 44 is open to the atmosphere via the passageway 37 through the piston-forming element 14 to the discharge outlet 15 with axial flow permitted through the inner portion 116 of the passageway 37 through the annular flow space 124 radially outwardly of the center post member 110. The air vent disc 44 has an elastically deformable edge portion carrying the bead which is biased into the wall 27 of the air chamber 19. As best seen in the enlarged view of FIGS. 35 and 36, the air chamber 19 is a stepped chamber with the axially inner portion 28 of a diameter less than a diameter of the axially outer portion 29. While the air vent disc 44 is in the smaller diameter portion 28, as seen in FIG. 35, a pressure differential between the pressure in the bottle and the pressure in the air compartment 49 which is required to deflect the air vent disc 44 for air flow axially outwardly therepast is greater than a pressure differential required between the pressure in the bottle and the pressure in the air compartment 49 when the air vent disc 44 is in the larger diameter piston portion 29 as seen in FIG. 36.

Figure 37:
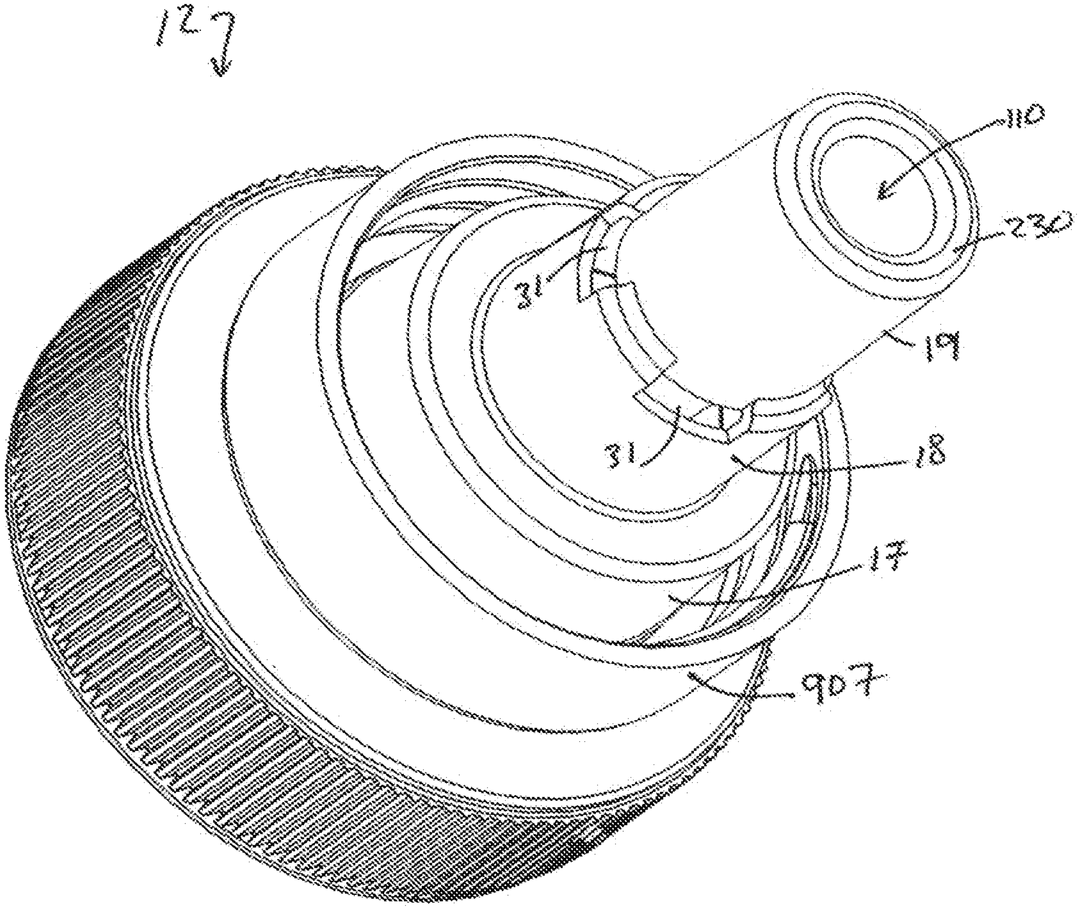
FIG. 37 is a top perspective view of the innermost end of a piston chamber-forming body of the pump shown in FIG. 33.
Figure 38:
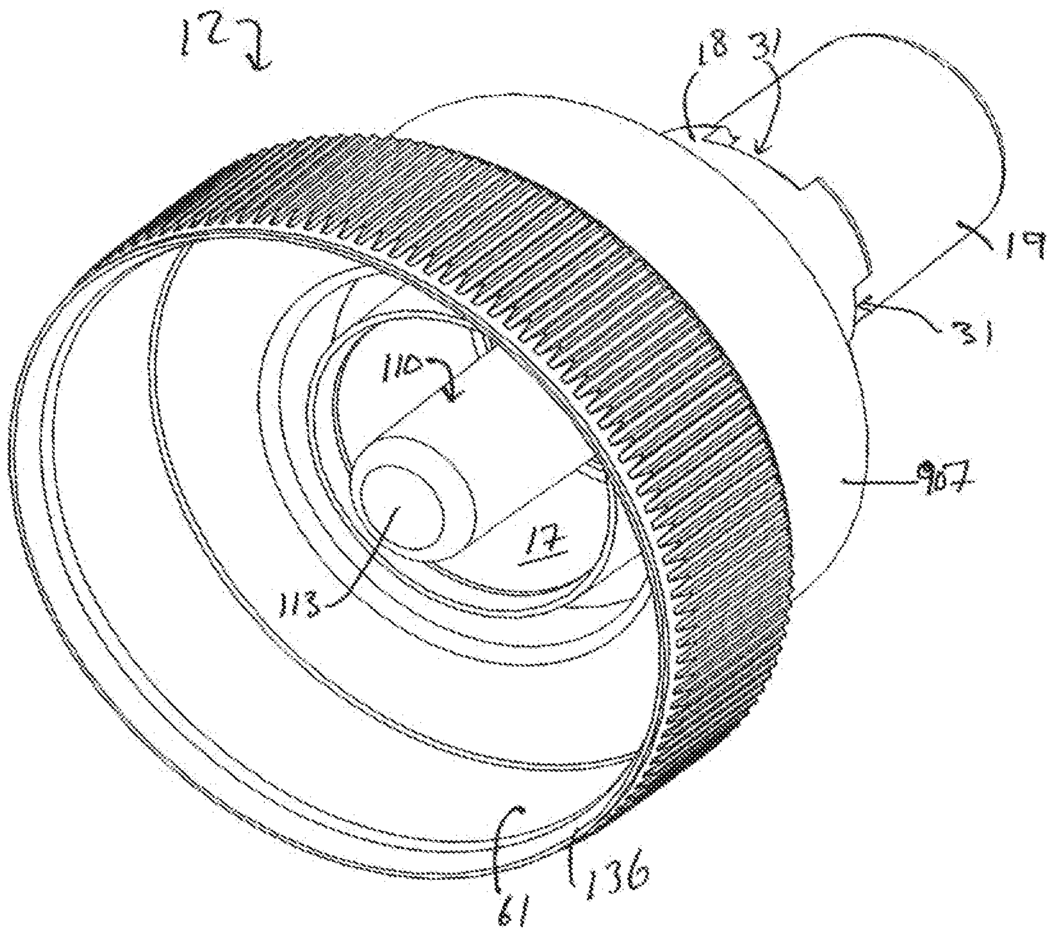
FIG. 38 is a bottom perspective view of the piston chamber-forming body shown in FIG. 37.

Reference is made to FIGS. 37 and 38 which show top and bottom pictorial views of the piston chamber-forming member 12 of the eleventh embodiment. A plurality of transfer ports 31 are provided at circumferential locations about the piston chamber-forming member 12. The piston chamber-forming member 12 is adapted to be molded by injection molding as a unitary element from suitable mold parts in a manner as would be appreciated by persons skilled in the art. In this regard the manufacture of the piston chamber-forming member 12 as a unitary element by injection molding is facilitated by the features of: the chambers 19, 18, 17 and 60 being coaxial of increasing diameter axially outwardly and each opening axially outwardly into the next adjacent chamber, and the post member being frusto-conical tapering axially outwardly.

Figure 39:
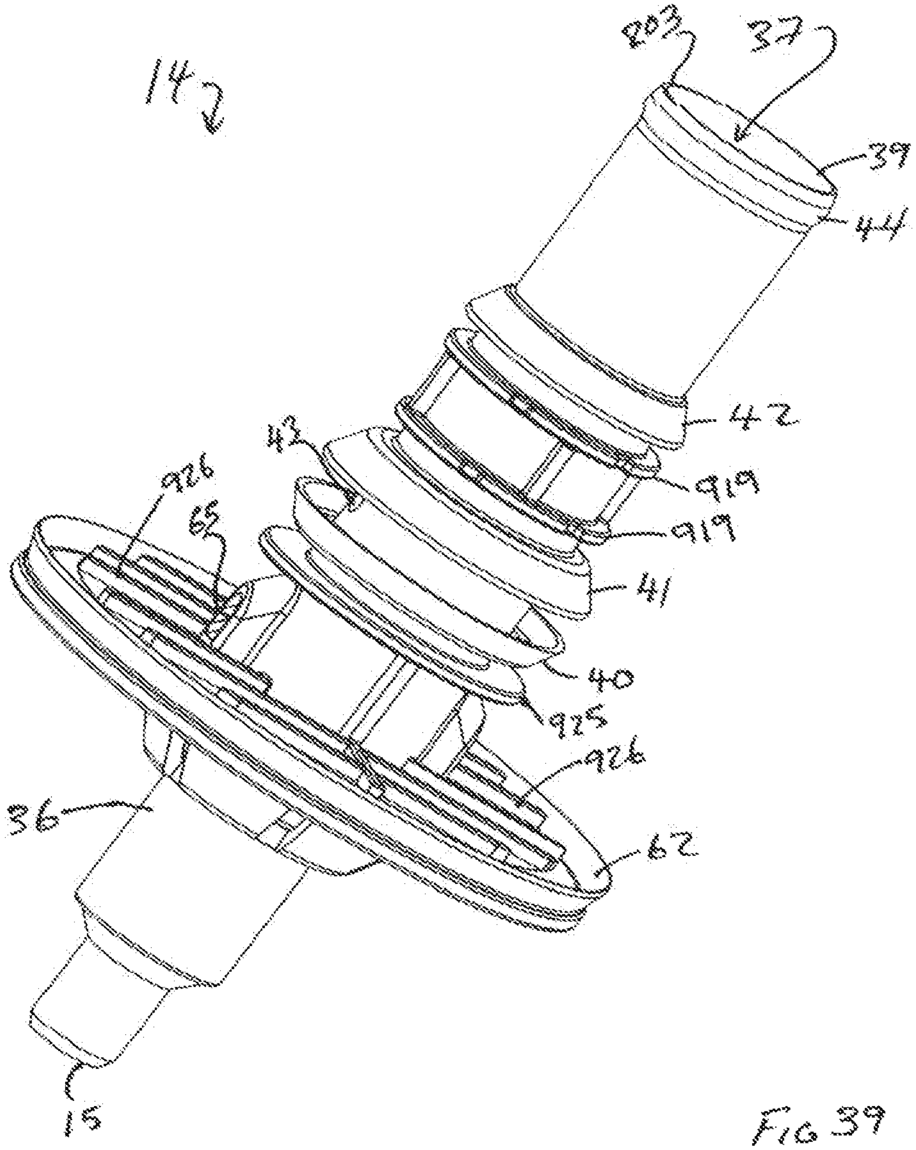
FIG. 39 is a top perspective view of the innermost end of a piston-forming element of the pump shown in FIG. 33.
Figure 40:
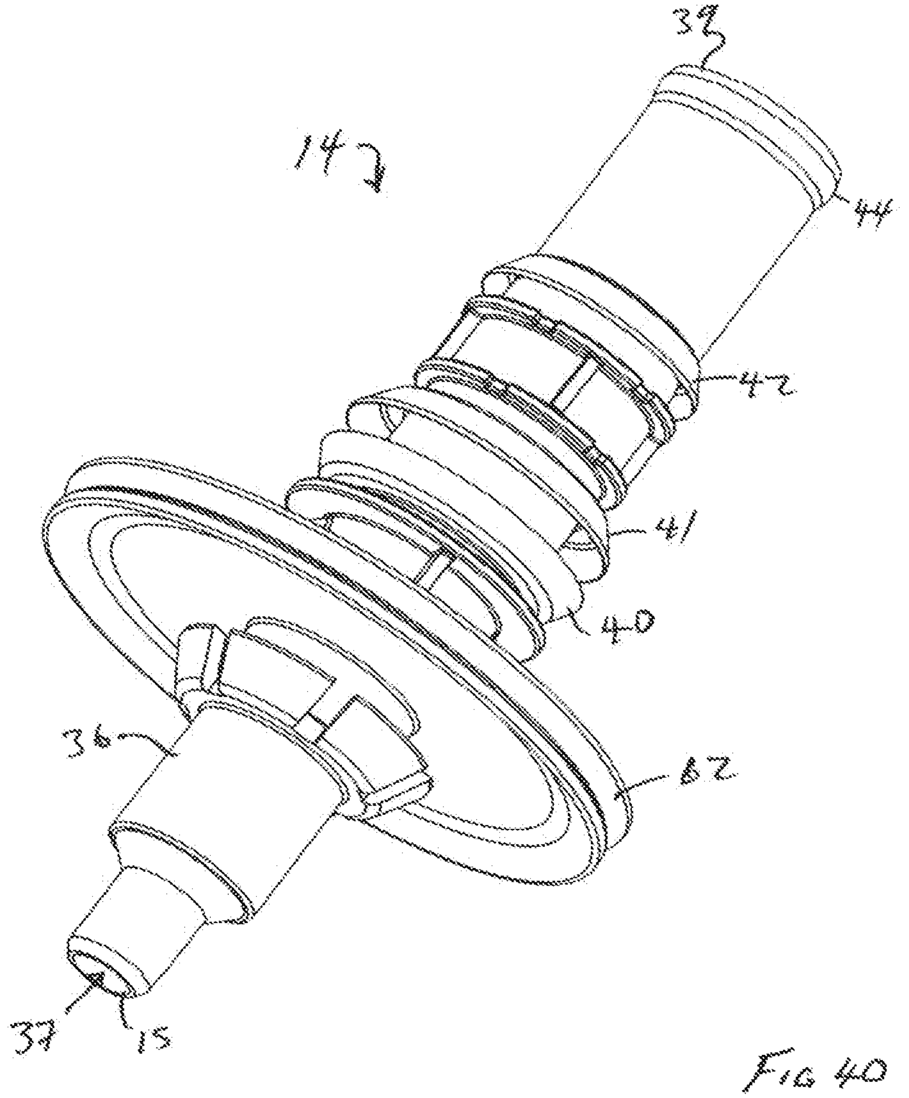
FIG. 40 is a bottom perspective view of the piston-forming element shown in FIG. 39.

Reference is made to FIGS. 39 and 40 showing top and bottom perspective views of the piston-forming element 14 of the eleventh embodiment. Optional locating members are shown including two locating discs 919 and a locating discs 925 which have axially extending slots through their radially outward edges to permit fluid flow axially therepast. A plurality of reinforcing ribs 926 are shown as provided on the axially inwardly directed surface of the air seal disc 62. The piston-forming element 14 has features selected so as to permit the piston-forming element to be formed by injection molding as a unitary element from suitably selected mold portions as will be apparent to a person skilled in the art. In this regard, the manufacture of the piston-forming element 14 as a unitary element by injection molding is facilitated by the features of: the portions 120, 118 and 116 of the passageway 37 being coaxial of increasing diameter axially inwardly and each opening axially outwardly into the next adjacent portion.

In the eleventh embodiment, the stem 36 of the piston-forming element 14 is coaxially slidably received in the master chamber of the outer tubular member 108 of the piston chamber-forming member 12 with the center post member 110 extending axially into the central passageway 37 of the stem 36 through the axial inner end 203 of the stem. The stem 36 may be characterized as having a plurality of axially spaced annular members which extend radially outwardly from the stem 36. These axially spaced members comprise the various discs including the discs 40, 41, 42, 44 and 62. With the stem 36 of the piston-forming element 14 received in the master chamber of the outer tubular member 108 of the piston-forming member 12 between the outer tubular member 108 and the center post member 110, the annular members comprising the various discs on the stem extend radially outwardly from the stem towards the chamber wall of the outer tubular member 108 comprising the walls 61, 25, 26 and 27 of the four chambers 60, 17, 18 and 19. The interaction of these annular members on the stem 36 with axially spaced portions of the chamber wall of different diameters provide pumping actions whereby in a cycle of operation; liquid is drawn from the bottle for discharge into the flow space 124; air is drawn from the atmosphere from the discharge outlet 15 via the passageway 37, the flow space 124 and the channel 65; and air is discharged via the channel 65 and into the flow space 124 and through the passageway 37 to out the discharge outlet 15. In a cycle of operation, the interaction of the annular members on the stem 36 cooperating with axially spaced portions of the chamber wall provide both a liquid pump 101 and an air pump 103 operative to simultaneously discharge liquid and air axially outwardly past or through an outlet 165 of the channel 65 through the flow space 122 toward the discharge outlet 15.

In the eleventh embodiment as seen, for example, in FIGS. 33 and 34, the center post member 110 has its wall 112 formed to be frustoconical and, similarly, the passageway wall 122 of the inner portion 116 of the passageway 37 is shown as frustoconical so as to provide an almost constant radial extent of the annular space 124 therebetween. This is not necessary and the annular space 124 may be provided to restrict the area for flow merely proximate the outlet 165 of the channel 65 or merely outwardly of the outlet 143 of the duct 43 or outwardly of both the outlet 143 of the duct 43 and the outlet 165 of the channel 65. The annular space 124 need not be of consistent dimension and may be provided to provide restrictions where restriction will best provide for increasing the velocity of combined air and liquid flow.

Reference is made to FIGS. 35 and 36 on which the vertical height between the upper end of the transfer port 31 and the inner opening 39 at the inner end 203 of the piston-forming element 14 is indicated by a height H.sub.1 when the piston-forming element 14 is in the retracted position on FIG. 35 and as H.sub.2 when the piston-forming element is in the extended position of FIG. 36. In order for vacuum relief, when a vacuum is created within a container to which the pump is connected, the vacuum must be sufficiently great that air will flow from within the air compartment 49 from the inner end 203 of the stem 36 through an annular space 222 between the piston stem 36 and the inwardly directed wall 27 of the air chamber 19 to the transfer port 31. Two mechanisms resist such air flow for vacuum relief so as to prevent air flow freely through the passageway 37 and the annular space 222 via the transfer port 31 into the container and liquid flow under gravity from the container through the transfer port 31, the annular space 222 and the passageway 37 to out the discharge outlet 15. The first mechanism is the engagement and/or biasing of the air vent disc 44 into the wall 27. The second mechanism is the requirement of displacing liquid within the annular space 222 between the wall 27 and the stem 36 from the inner end 203 of the stem 36 downwardly to the transfer port 31 so that air is open to the transfer port 31 and may flow upwardly into the liquid in the bottle. For example, in a hypothetical situation that the air vent disc 44 has, for example, lost its resiliency and, rather than be in engagement with the outer portion 29 of the wall 27 as seen in FIG. 36, the air vent disc 44 is spaced radially inwardly from the wall 27, then the first mechanism would not resist air flow for vacuum relief. However, in this hypothetical, there would still not be any transfer of air from the air compartment 49 into the container unless the pressure differential between the air compartment 49 and the container is sufficient to displace the liquid downwardly, the height H2 as seen in FIG. 36 towards overcoming the inherent hydraulic pressure developed by a height of liquid in the container above the transfer port 31 as seen in FIG. 36. In the preferred eleventh embodiment, the air chamber 19 has a longitudinal length such that in the retracted position, the inner end 203 of the piston stem 36 is spaced axially inwardly from the transfer port 31 so as to increase the vacuum required to overcome this second mechanism of hydraulic displacement in order for air venting. For example, in contrast in the first embodiment of FIG. 3, in the fully extended position, the inner end of the stem 36 is only marginally above the height of the transfer port 31. However, in the eleventh embodiment in the fully extended position, as seen in FIG. 36, the air vent disc 44 is at a height more significantly spaced above the height of the air transfer port 31. This height, notably H.sub.2, can be selected having regard to various factors such as the nature of the air disc 44, the nature of the fluid including the viscosity of the fluid, and the surface tension of the fluid and its affinity for the materials of the piston-forming element 14 and the piston chamber-forming member 12 as can affect resistance to the liquid within the annular space 222 between the stem 36 and the wall 27 being displaced by a pressure differential against the hydraulic forces developed within the container.

In accordance with the eleventh embodiment, in an arrangement in which the piston pump 10 is oriented with the discharge outlet 15 directed downwardly as, for example, seen in FIGS. 33 and 34, then the height at which the transfer port 31 is disposed within the neck of the bottle, is not affected by increasing the axial length of the inner air chamber 19 inwardly of the transfer port 31 as can be advantageous towards increasing the second mechanism of hydraulic resistance to liquid flow through the annular space 222. The axial distance of the transfer port 31 from the collar 907 determines the level of a residual amount of liquid within a container that cannot be discharged from the container when the pump 10 is in the orientation as shown in FIGS. 33 and 34. Providing an increased length to the inner air chamber 19 can assist in avoiding situations should the air vent disc 44 cease to engage the wall 27 in which the increased axial extent of the inner air chamber 19 will provide an advantageously increased height H.sub.2 towards, in any event, reducing undesired transfer of air and/or liquid between the transfer port 31 and the opening 39 of the stem unless there is sufficiently high vacuum pressure differential therebetween.

Figure 41:
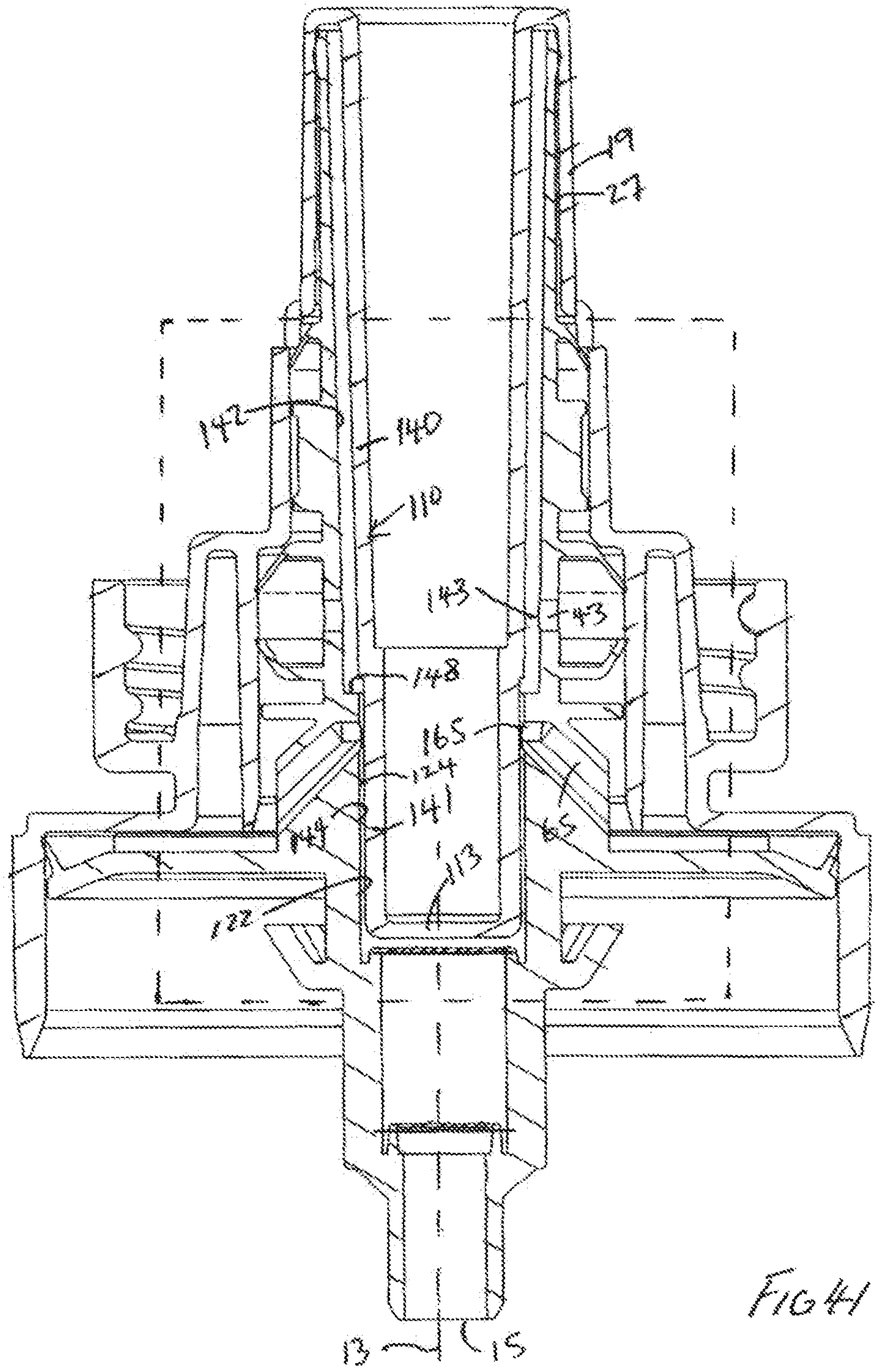
FIG. 41 is a cross-sectional front view of a piston pump in accordance with a twelfth embodiment of a piston pump in accordance with the present invention with the piston-forming element in a fully retracted position.
Figure 42:
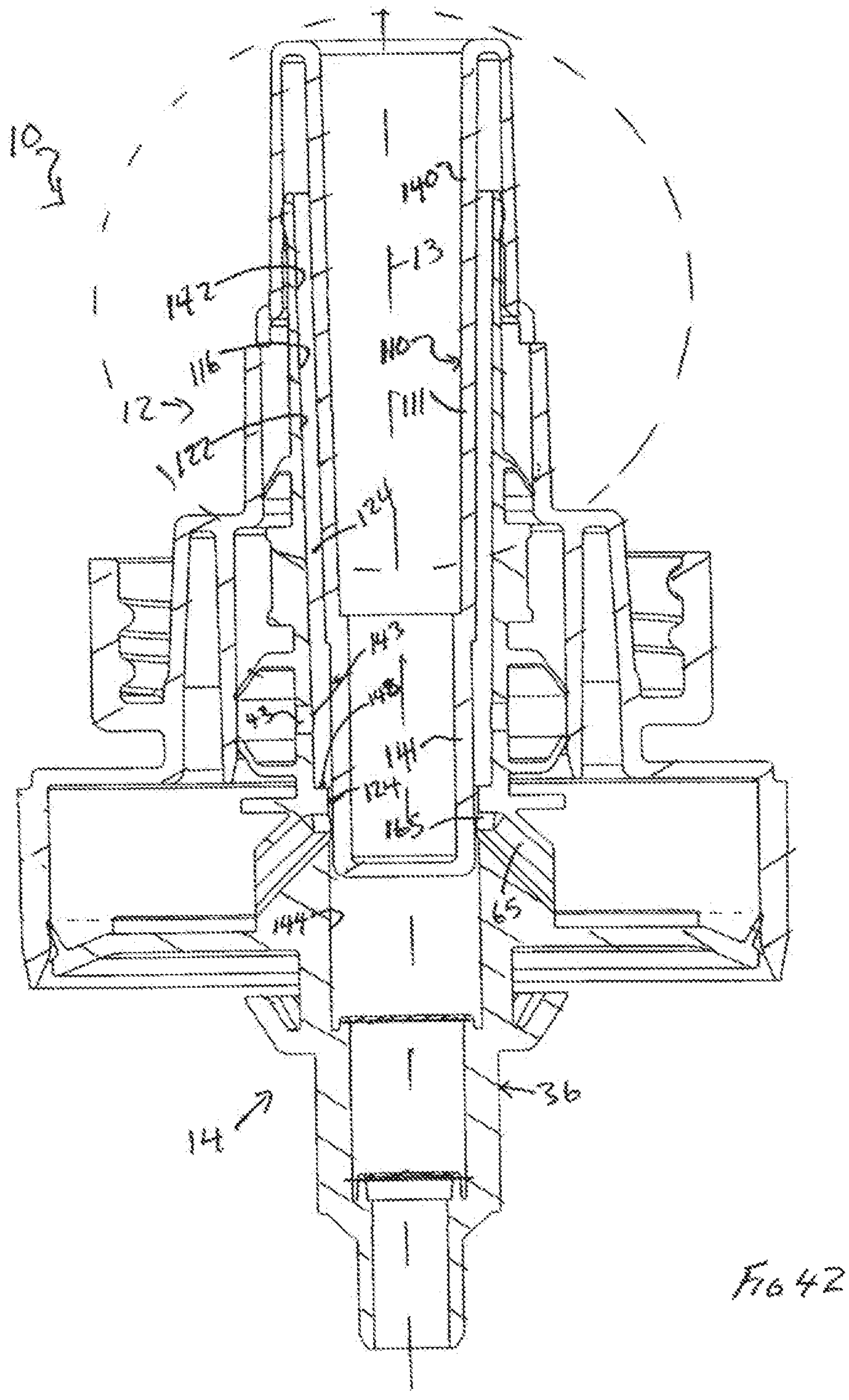
FIG. 42 is a cross-sectional front view of the pump of FIG. 41 with the piston-forming element in the fully extended position.
Figure 43:
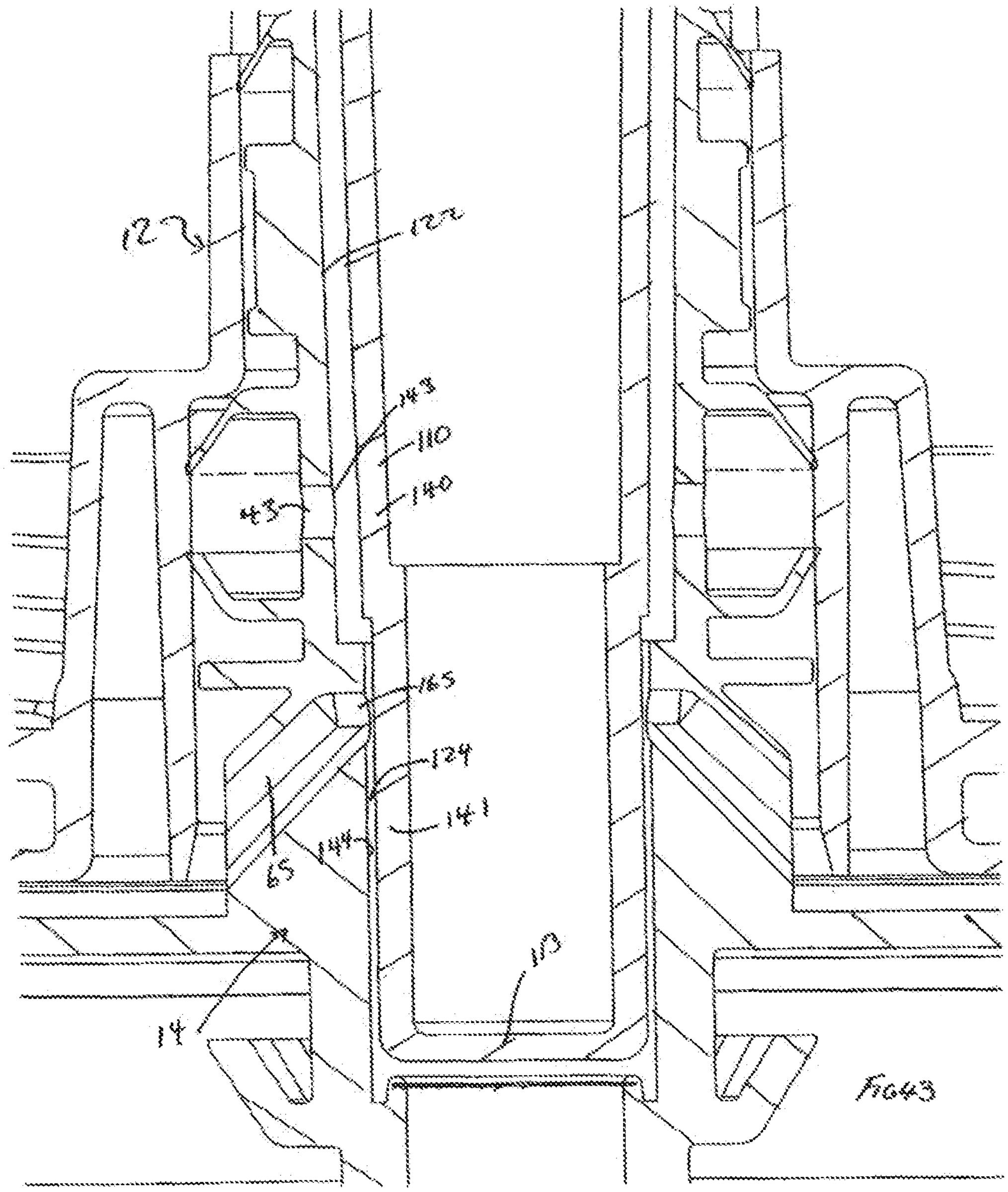
FIG. 43 is an enlarged view of FIG. 41 shown within the broken line rectangle shown on FIG. 41.

Reference is made to FIGS. 41 to 43 which illustrate a twelfth embodiment of a pump 10 in accordance with the present invention which is identical to the eleventh embodiment of the pump of FIGS. 33 to 40 but for three exceptions. A first exception is that the center post 110 has its post side 111 formed to be stepped with an inner portion 140 being frustoconical tapering outwardly and the outer portion 141 being of a reduced diameter compared to the inner portion 140 and with the outer portion 141 being substantially cylindrical and of constant diameter about the center axis 13.

A second exception is that the inner portion 116 of the passageway wall 122 is also stepped with an inner section 142 shown as frustoconical, ending at a shoulder 148 and opening into an outer section 144 with the shoulder 148 located on the stem 36 axially between the outlet 143 of the duct 43 and the outlet 165 of the channel 65. As can be seen in FIGS. 41 and 42 showing retracted and extended positions, respectively, the outer portion 141 of the center post member 110 is always radially inwardly of the outlet 165 of the channel 65. As well, the outer portion 141 is of a diameter relative to the diameter of the outer section 144 such that the annular space 124 therebetween is relatively small as best seen in FIG. 43 so as to provide a restriction to flow, that is, a restricted cross-sectional area for axial flow through the annular space 124 between the passageway wall 122 and the center post member 110. The cross-sectional area of the annular flow space 124, through which the liquid and air discharged from the outlet 165 of the channel 65 may flow, can be accurately controlled by selection of the shape and diameter of the outer portion 141 of the center post member 110 relative to the shape and diameter of the outer section 144 of the passageway 37. The cross-sectional area of the flow space 124 can be selected having regard to the features including nature of the fluid to be dispensed including its viscosity and the nature of the pump including the relative volumes of liquid and/or air to be passed through in a typical retraction stroke. With knowledge of, or by approximating, the speed and length of travel of the piston-forming element 14 in a retraction stroke, the restricted cross-sectional area of the flow space 124 axially outwardly of the outlet 165 of the channel 65 may be selected towards providing for relatively high velocity flow of air and/or liquid therethrough, preferably, turbulent flow which will aid comingling and mixing of air and liquid passing therethrough.

Figure 44:
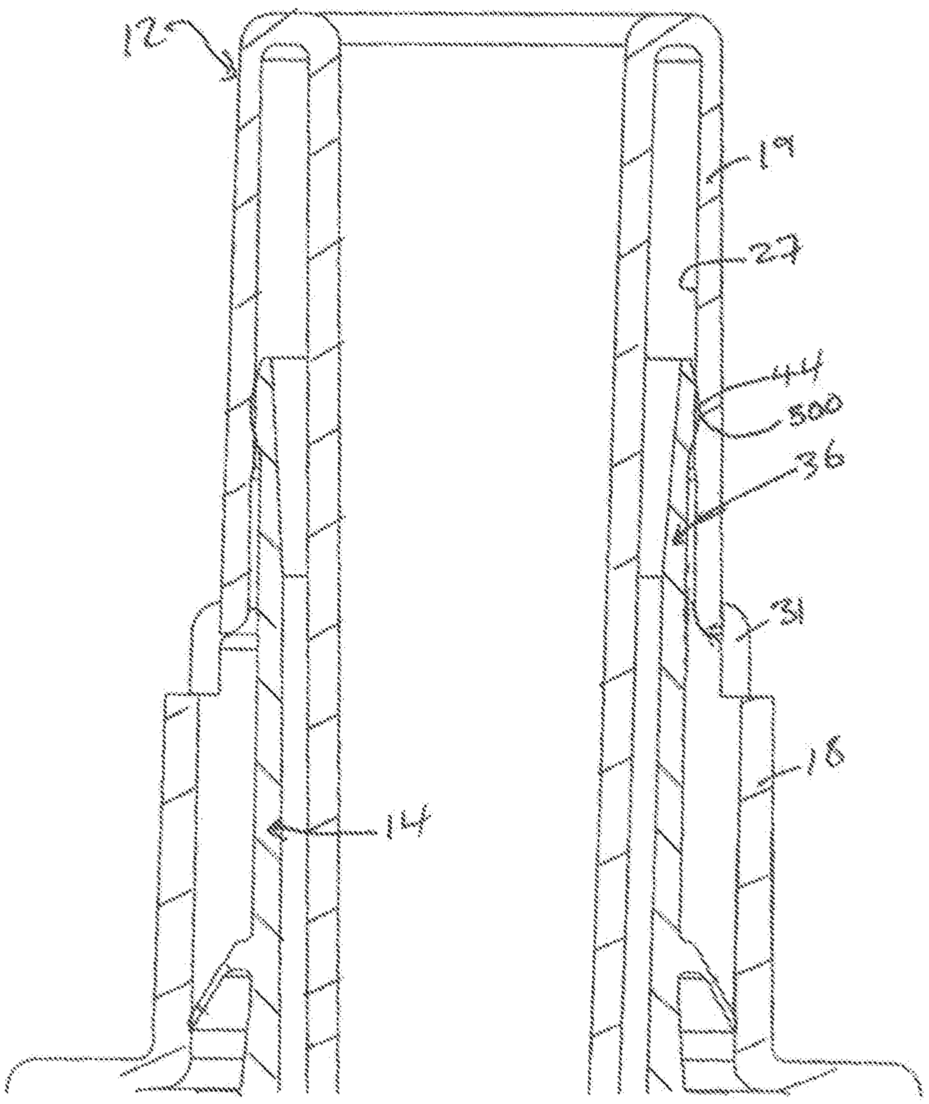
FIG. 44 is an enlarged view of FIG. 41 shown within the broken line circle shown on FIG. 42.

A third exception by which the twelfth embodiment differs from the eleventh embodiment is the configuration of the wall 27 of the air chamber 19. FIG. 44 is an enlarged view of FIG. 41 showing the piston-forming element 14 in a fully extended position relative to the piston chamber-forming member 12. As can be seen, the wall 27 of the air chamber 19 which is engaged by a bead 500 of the air vent disc 44 is effectively of a constant diameter and thus the wall 27 of the air chamber does not have portions that are engaged by the air vent disc 44 that are of different diameters contrary to the case with the first embodiment of FIGS. 1 to 3 in which the wall 27 of the air chamber 19 had an inner portion 28 and an outer portion 29 of different diameters. The configuration of the wall 27 of the air chamber 19 in the twelfth embodiment as shown in FIGS. 41 to 44 is arranged to effectively prevent the venting of atmospheric air past the air vent disc 44 into the bottle. The pump 10 of the twelfth embodiment is particularly adapted for use in dispensing fluid from a collapsible container in which, as fluid is dispensed from the container, the container collapses upon itself. Such a container may, for example, comprise a bag formed from a flexible plastic sheet. The pump 10 in accordance with the twelfth embodiment may also be used with a non-collapsible container in which a separate mechanism from the pump 10 may be provided to permit air flow into the container to prevent a vacuum being created in the container. The extent to which the air vent disc 44 may be biased into the wall 27 of the air chamber, the inherent resiliency of the air vent disc 44 and/or the wall 27 of the inner air chamber 19 will determine to some extent whether or not the pump of the twelfth embodiment may function to prevent or permit air flow past the air vent disc 44 into the container to relieve vacuum conditions which may arise therein. Preferably, the air vent disc 44 and the wall 27 are biased into each other to prevent air flow therepast into the container under vacuum conditions required to collapse a collapsible container coupled to the pump.

Figure 45:
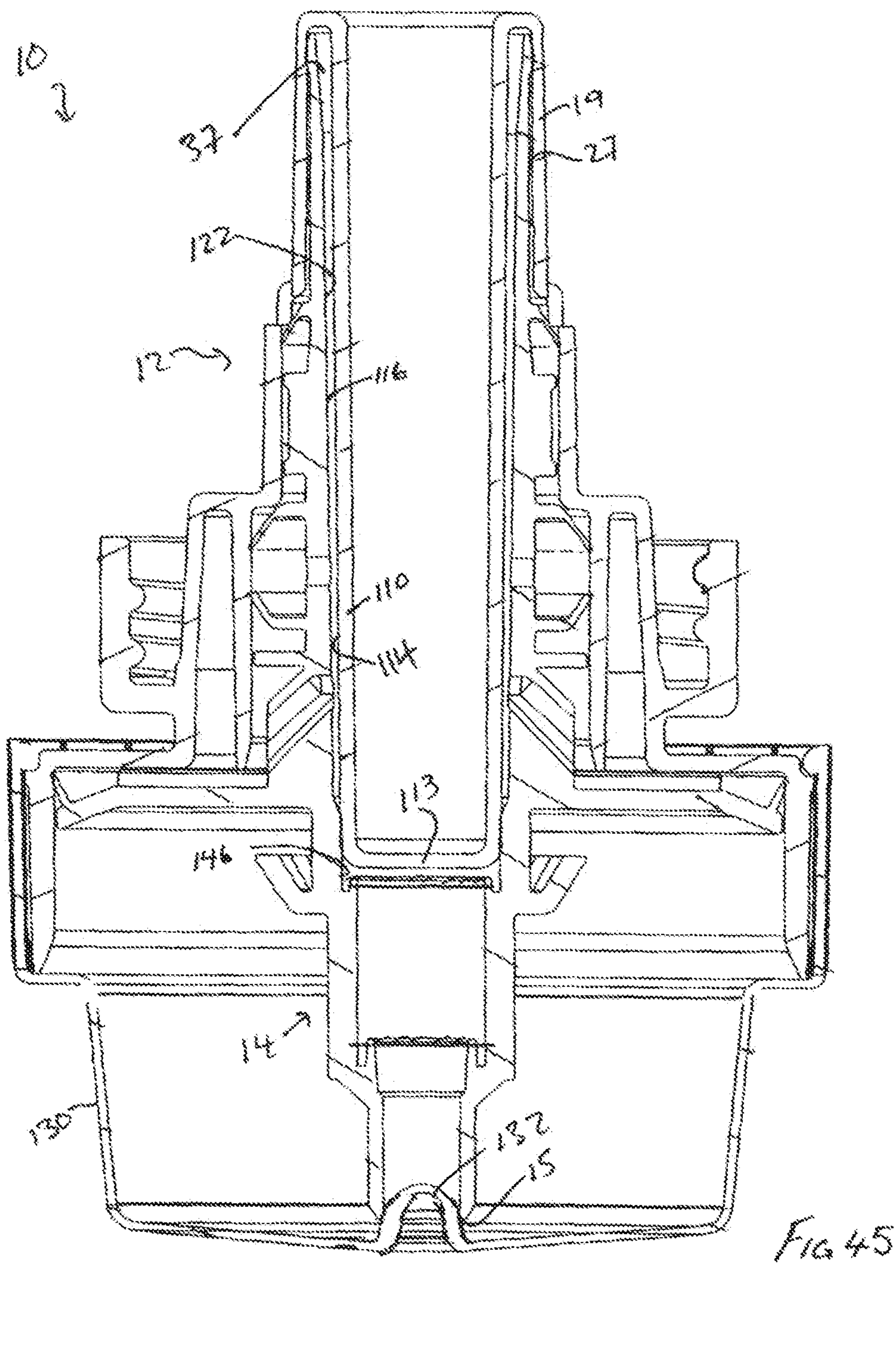
FIG. 45 is a cross-sectional front view of a piston pump and a closure cap in accordance with an thirteenth embodiment of the present invention with the piston-forming element in a fully retracted position.

Reference is made to FIG. 45 which illustrates a piston pump 10 and enclosure cap 130 in accordance with a thirteenth embodiment of the present invention which is identical to the pump shown in FIG. 33 of the eleventh embodiment of the present invention but for two exceptions. A first exception is that the wall 27 of the air chamber 19 is configured to be the same as in the twelfth embodiment shown in FIGS. 41 to 44 so as to substantially prevent air venting. A second exception is that axially outermost end portion 146 of the inner portion 116 of the passageway wall 122 is provided to be of a reduced diameter compared to the remainder of the passageway wall 122 axially inwardly therefrom such that when the piston-forming element 14 is in the fully extended position, this end portion 146 frictionally engages the post wall 114 of the center post member 110 to provide a fluid seal and prevent any flow of fluid whether air or liquid axially inwardly or outwardly therepast. Thus, in a fully extended position as shown in FIG. 45, the engagement of the center post member 110 in the reduced diameter end portion 146 in the passageway 37 blocks fluid flow into or out of a container. This arrangement can be advantageous to prevent undesired discharge of fluid from the container during shipping or storage or in an end position of any cycle of operation of the pump in which the fully extended position is reached. In use, the piston-forming element may preferably be moved in a cycle of operation to dispense fluid in an extension stroke to a position in which the center post 110 does not extend outwardly so far as to engage in the end portion 146. While the embodiment of FIG. 45 is shown with a removable cap 130 with a plug 132 as to seal the discharge outlet 15, the plug 132 is less necessary in the thirteenth embodiment of FIG. 45 to prevent fluid passage through the discharge outlet 15.

Figure 46:
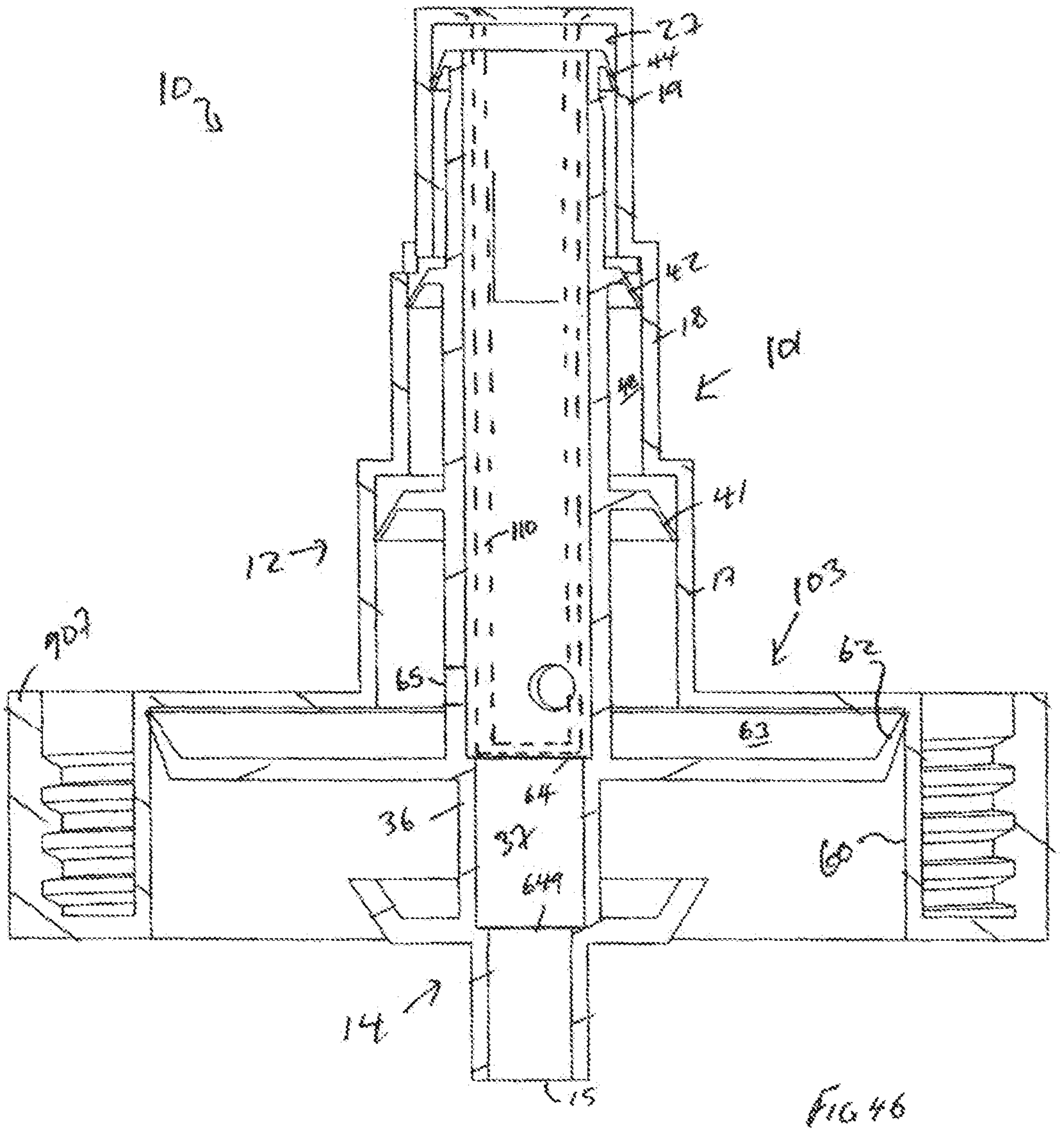
FIG. 46 is a cross-sectional front view of a piston pump in accordance with a fourteenth embodiment of a piston pump in accordance with the present invention with the piston-forming element in a fully retracted position.
Figure 47:
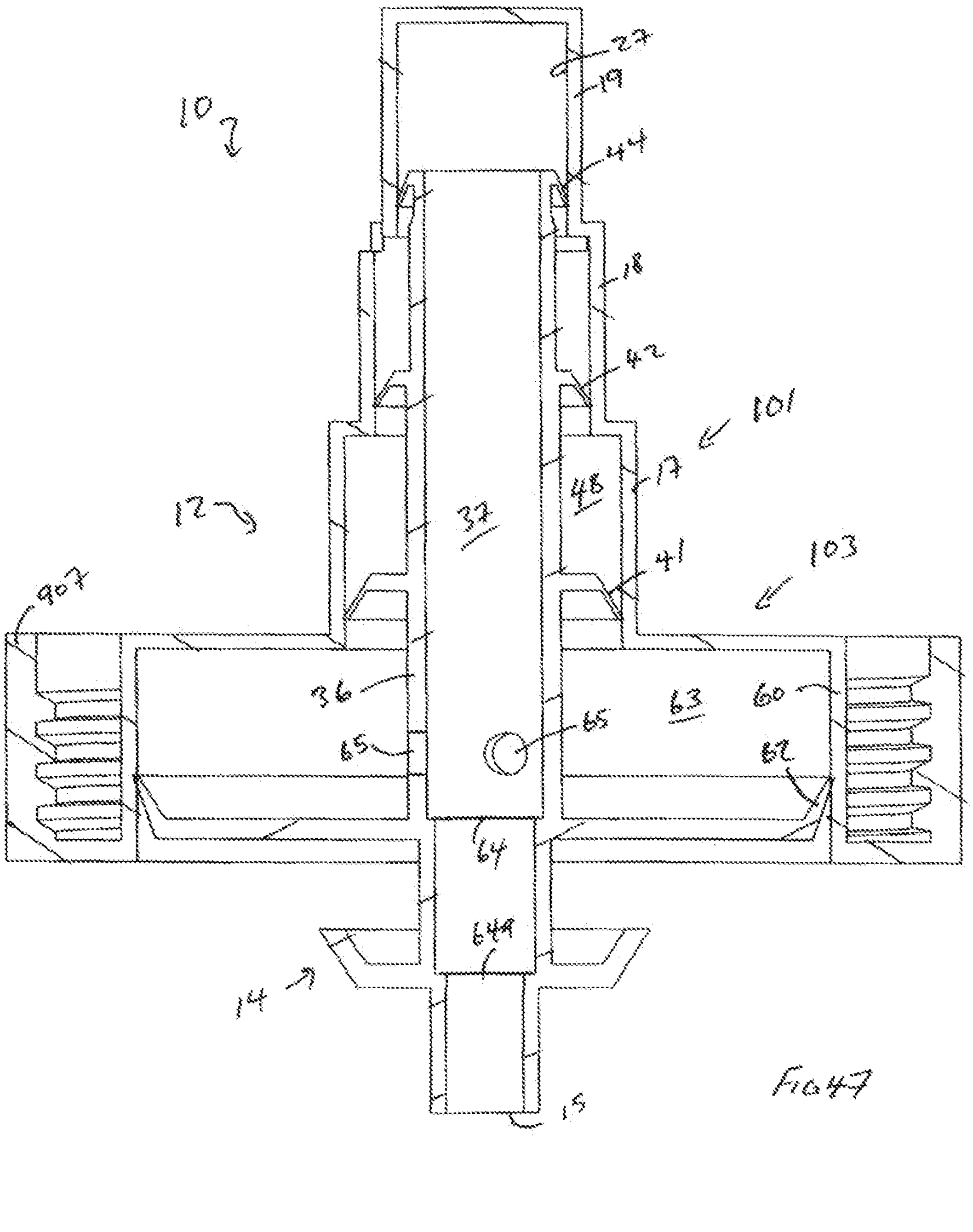
FIG. 47 is a cross-sectional front view of the pump of FIG. 46 with the piston-forming element in the fully extended position.

Reference is made to FIGS. 46 and 47 which illustrate a fourteenth embodiment of a piston pump 10 in accordance with the present invention. The fourteenth embodiment of FIGS. 46 and 47 has some similarities to the eleventh embodiment of FIGS. 33 to 40. One difference is that the inner air disc 44 does not have a bead but rather has a configuration as shown in the first embodiment of FIGS. 1 to 3, however, the wall 27 of the air chamber 19 in FIGS. 46 and 47 is shown as cylindrical and, to assist in air venting, the air vent disc 44 needs to deflect radially away from the wall 27 of the air chamber 19. In FIGS. 46 and 47, the outer air chamber 60 is radially inwardly of the threaded collar 907. The channel 65 is shown as extending but radially through the stem 36 into the passageway 37. The fourteenth embodiment of FIGS. 46 and 47 has a liquid pump with similarities in operation and function to the fourth embodiment of FIGS. 11 and 12 with the exception that whereas in the fourth embodiment of FIGS. 11 and 12, a stepped liquid pump 101 is formed by the disc 42 being of greater diameter than the disc 41, in the fourteenth embodiment of FIGS. 46 and 47, the liquid pump 101 is formed as a stepped liquid pump with the disc 42 being of a smaller diameter than the disc 41. Whereas in the fourth embodiment of FIGS. 11 and 12, where the liquid pump 101 is out of phase with the outer air pump 103, in the fourteenth embodiment of FIGS. 46 and 47, the liquid pump 101 is in phase with the outer air pump 103. For example, in the fourteenth embodiment of FIGS. 46 and 47, in a retraction stroke, liquid is discharged from the liquid compartment 48 of the stepped liquid pump 101 axially outwardly past the disc 41, deflecting the disc 41 to pass fluid into the outer air compartment 63 simultaneously with air and/or liquid being discharged from the outer air compartment 63 by the inner air pump 103 through the channels 65 into the central passageway 37 and, hence, through the foam inducing screens 64 and 64*a* and out the discharge outlet 15.

In FIG. 46, there is shown in dashed lines an optional center post member 110 which may be provided so as to assist in providing a restriction to flow in the central passageway 37 axially outwardly of the channel 65 when the piston-forming element 14 is between an intermediate position between the extended position and the retracted position and from such an intermediate position to the fully retracted position shown in FIG. 46. It is to be appreciated that the provision of the center post member 110 can enhance the operation of the pump 10 albeit the embodiment of FIGS. 46 and 47 is functional without the center post member.

Figure 48:
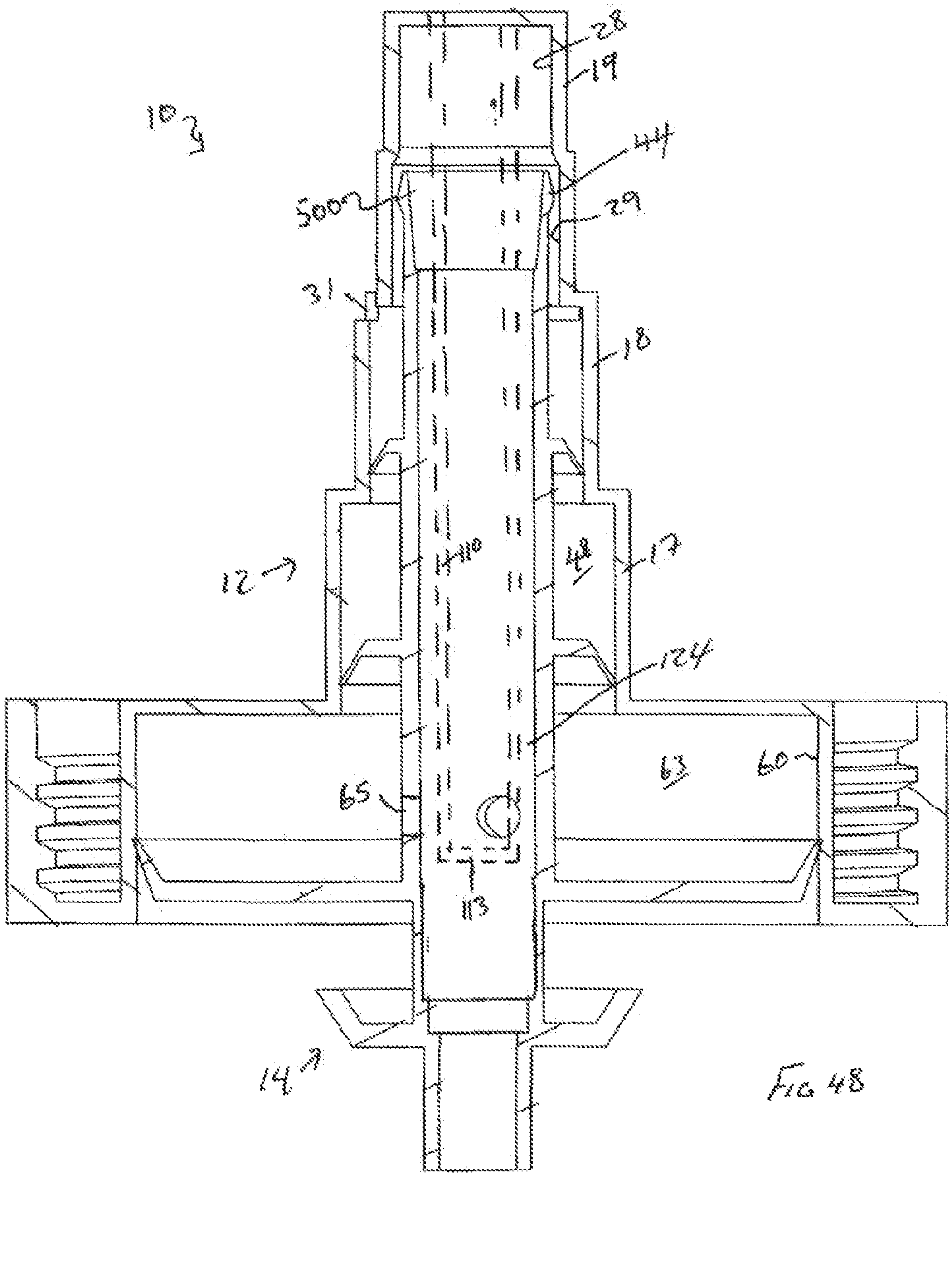
FIG. 48 is a cross-sectional front view of a piston pump in accordance with a fifteenth embodiment of a piston pump in accordance with the present invention with the piston-forming element in a fully extended position.
Figure 49:
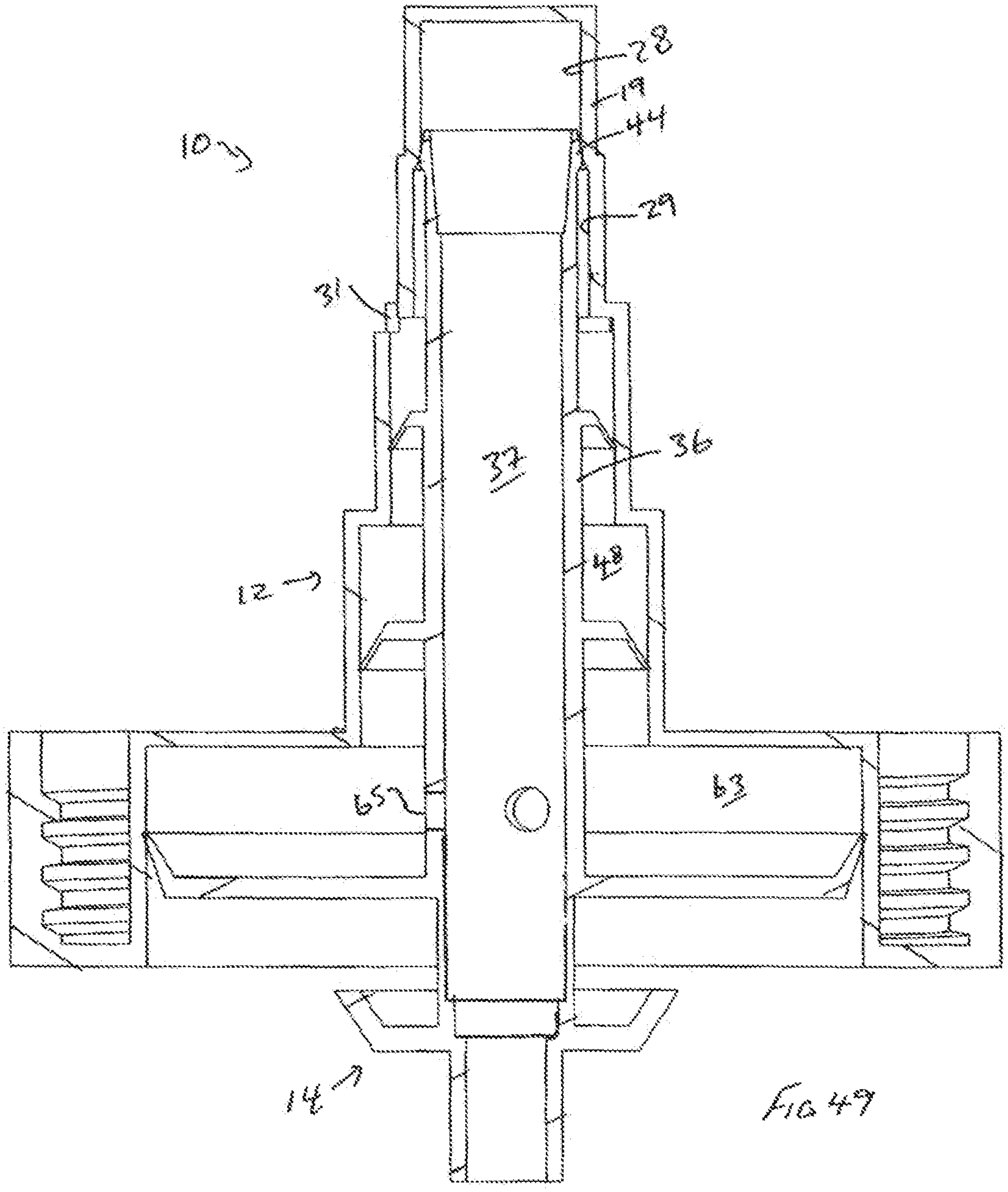
FIG. 49 is a cross-sectional front view of the pump of FIG. 46 with the piston-forming element in an intermediate position.
Figure 50:
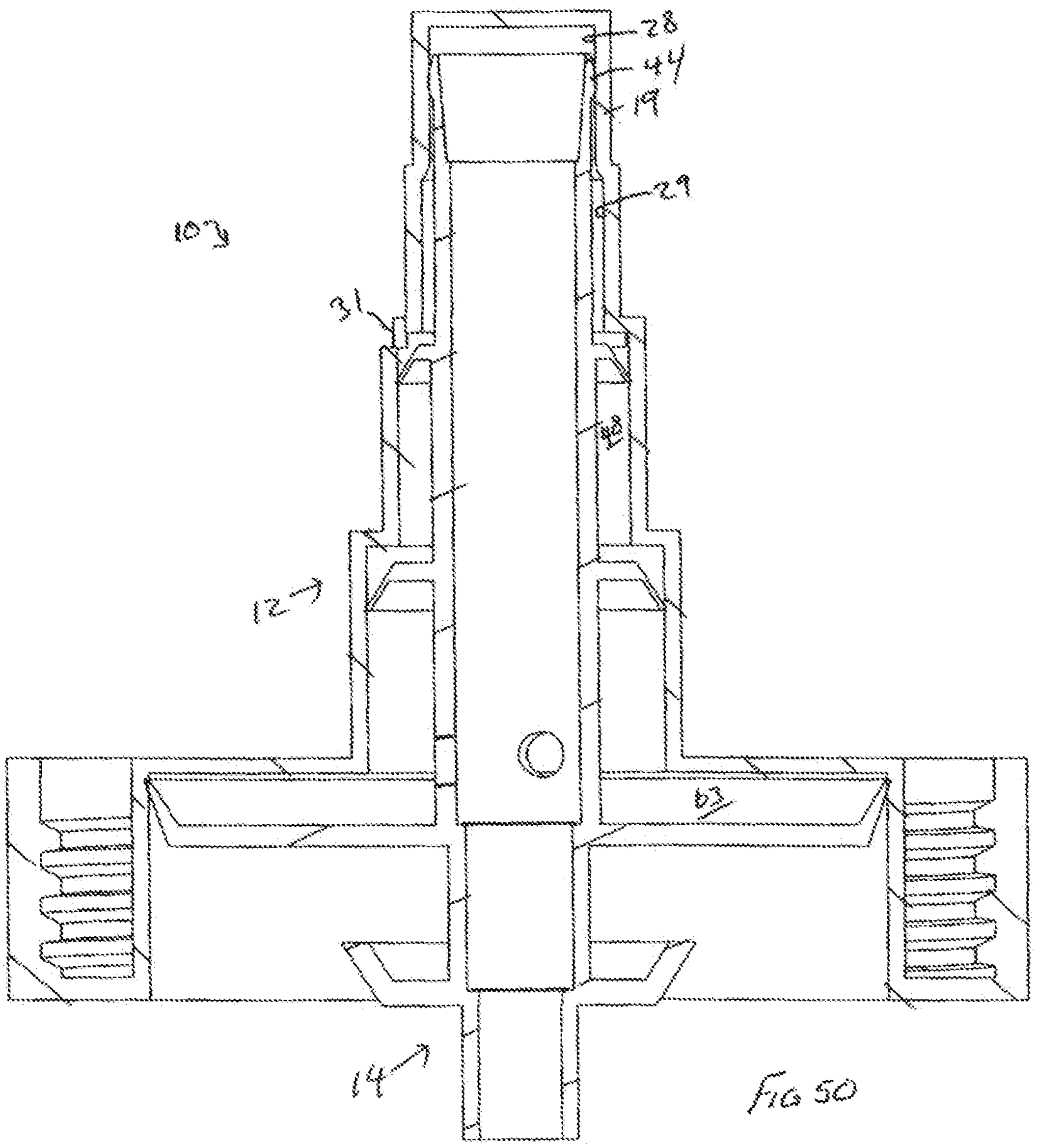
FIG. 50 is a cross-sectional front view of the pump of FIG. 48 with the piston-forming element in the fully retracted position.

Reference is made to FIGS. 48 to 50 which illustrate a fifteenth embodiment of the invention in accordance with the present invention in extended, intermediate and retracted conditions. The fifteenth embodiment has an operation very similar to the operation of the fourteenth embodiment of FIGS. 46 and 47 but for three exceptions. A first exception is that the air vent disc 44 has been modified from being a radially outwardly extending disc which extends to a distal end as in the case of FIG. 47 to comprising an annular bead 500 which extends radially outwardly from the stem 36. A second exception is that the air chamber 19 has been modified to provide an inner portion 28 and an outer portion 29 with the diameter of the outer portion 29 being greater than the diameter of the inner portion 28. The relative sizing of the inner portion 28, the outer portion 29 and the air vent disc 44 has been selected such that when the air vent disc 44 is within the inner portion 28, the bead of the air vent disc 44 engages the inner portion 28 to form a seal therewith. When the bead of the air vent disc 44 is within the outer portion 28, then the bead does not engage the outer portion 29 as can facilitate air venting into the bottle. The third exception is that the screen disc 64 has been moved axially outwardly to be closer to the outer foam inducing screen 64*a* and an optional center post member 110 shown in dashed lines on FIG. 48 is of increased length such that, as seen in FIG. 48 even in the fully extended position, the center post member 110 axially overlies the channel 65 to provide a restriction in the flow space 124 with a restricted cross-sectional area for flow of air and liquid from the outer air compartment 63 through the passageway 37.

Figure 51:
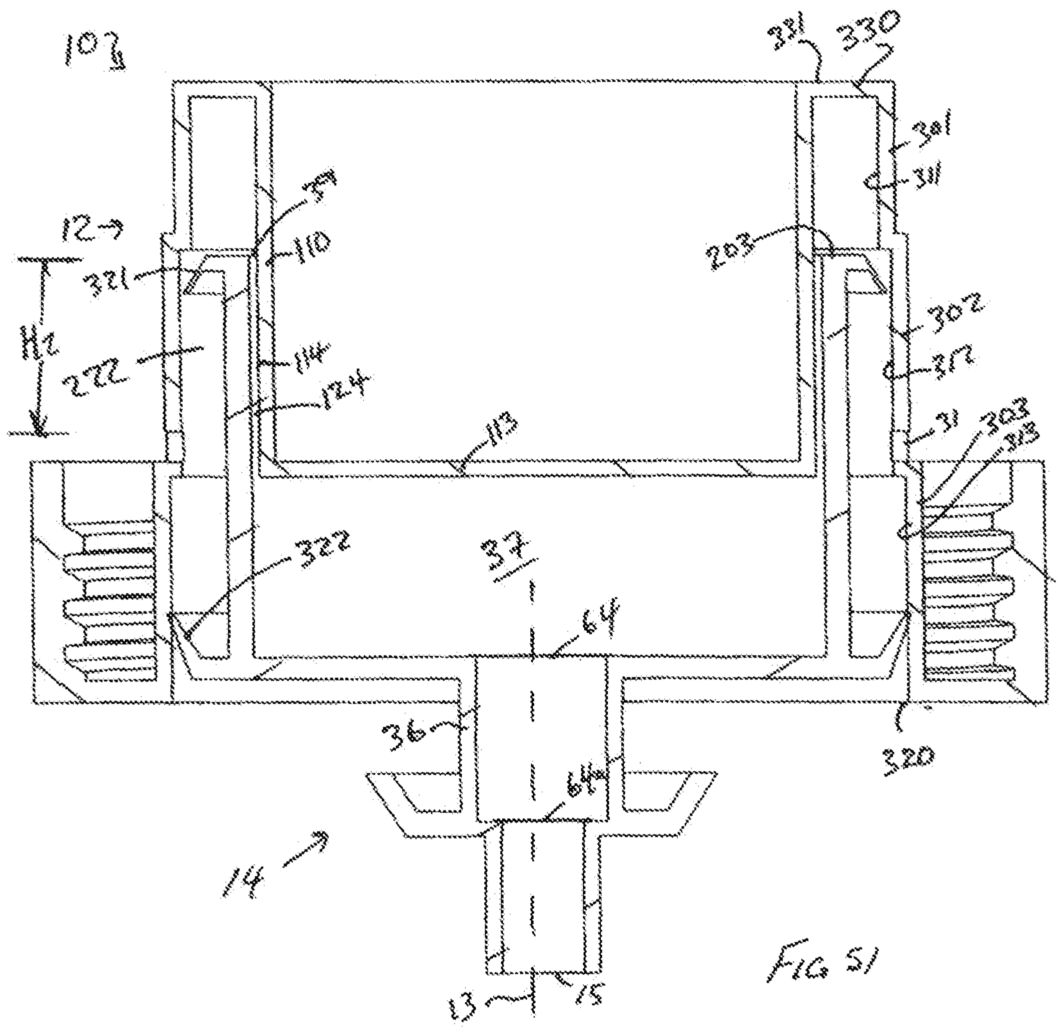
FIG. 51 is a cross-sectional front view of a piston pump in accordance with a sixteenth embodiment of a piston pump in accordance with the present invention with the piston-forming element in a fully extended position.
Figure 52:
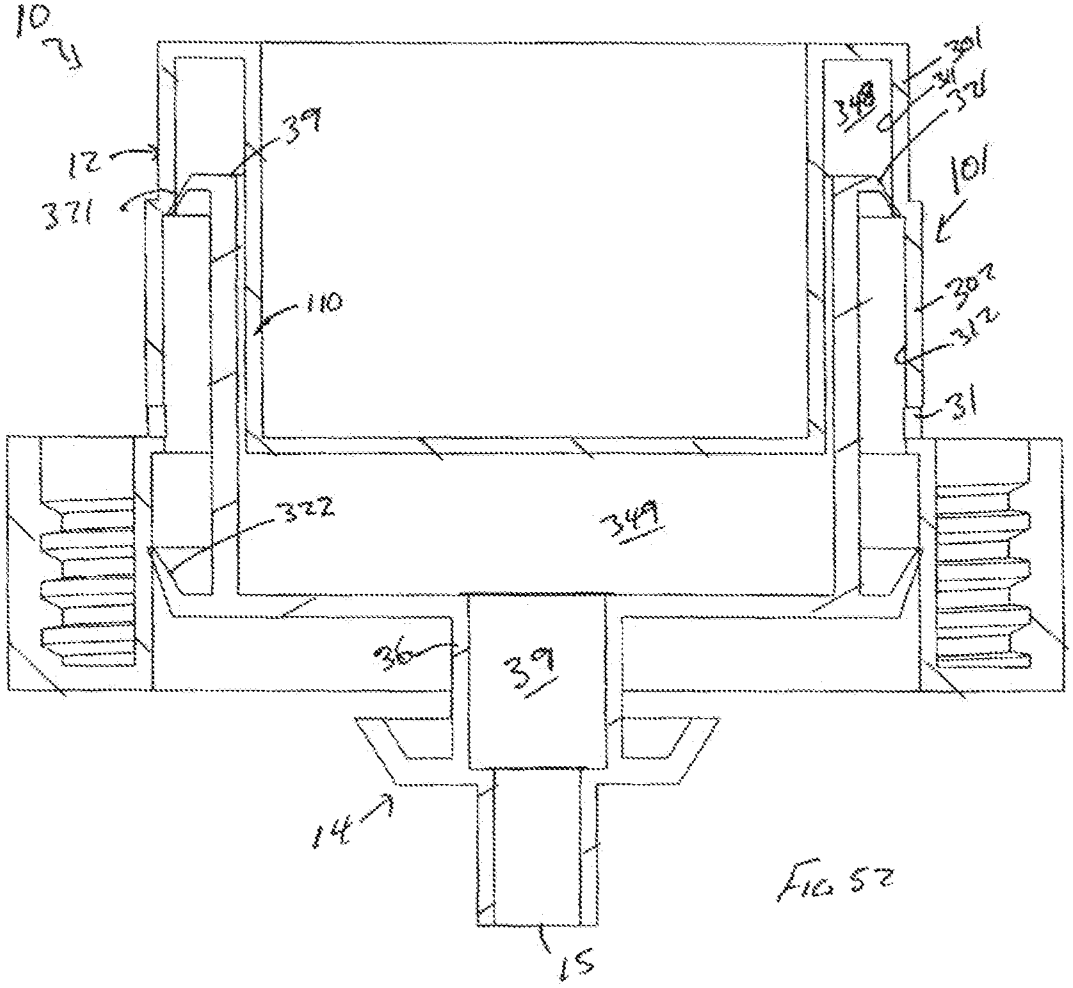
FIG. 52 is a cross-sectional front view of the pump of FIG. 51 with the piston-forming element in an intermediate position.
Figure 53:
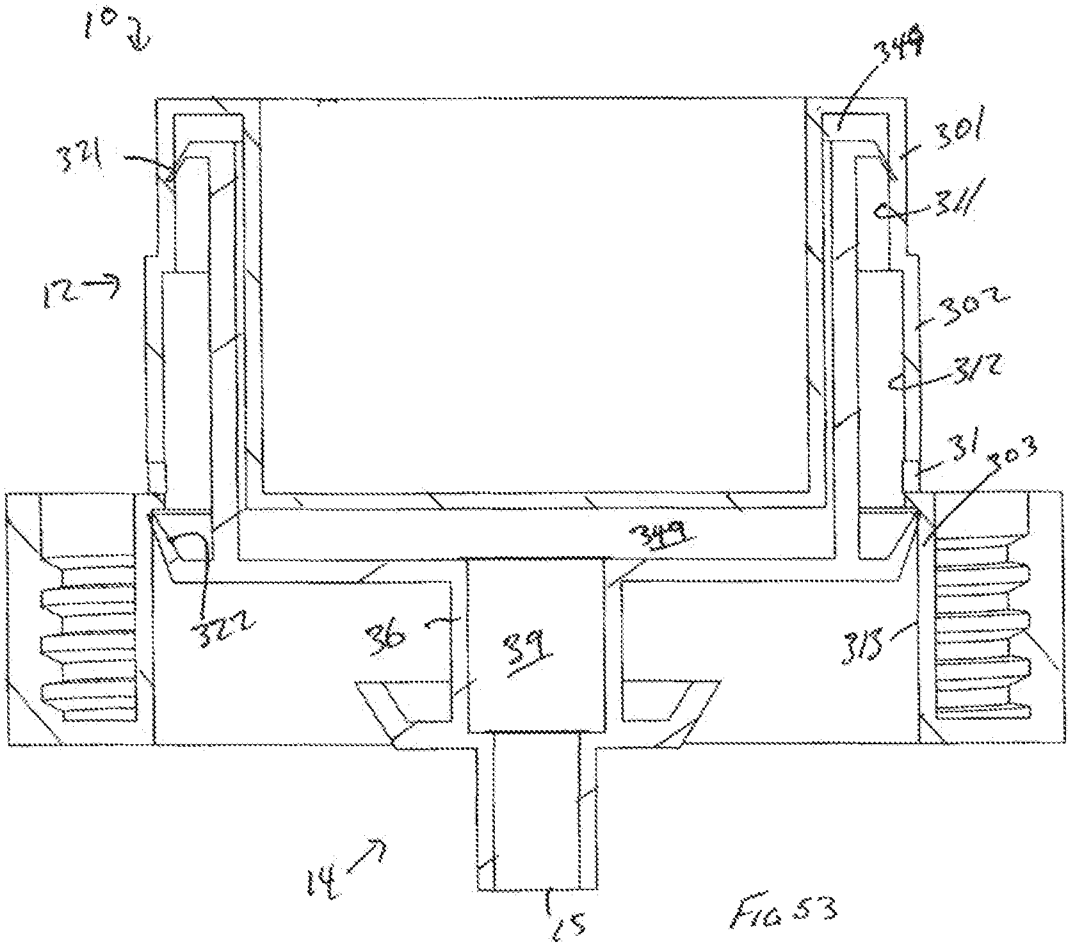
FIG. 53 is a cross-sectional front view of the pump of FIG. 51 with the piston-forming element in the fully retracted position.

Reference is made to FIGS. 51 to 53 which illustrate a sixteenth embodiment of a piston pump 10 in accordance with the present invention. The piston pump 10 comprises a piston chamber-forming member 12 and the piston-forming element 14 disposed about a common central axis and coaxially slidable for reciprocal sliding motion inwardly and outwardly between an extended position shown in FIG. 51, an intermediate position shown in FIG. 52 and a retracted position shown in FIG. 53. The piston chamber-forming member 12 defines coaxial cylindrical chambers of different diameters increasing in diameter from an inner end 330 to an open outer end 320. There is provided a first innermost chamber 301, a second intermediate chamber 302, a third sealing outer chamber 303 each having a diameter larger than the diameter of the chamber axially inwardly therein and each having an outer end opening into the next adjacent outer placed chamber. A shoulder joins each of the adjacent chambers. Each of the chambers 301, 302, and 303 have a radially inwardly directed wall 311, 312, and 313, respectively. A transfer port 31 is provided through the wall 312 proximate the shoulder joining the intermediate chamber 302 with the third chamber 303. The first chamber 301 is shown as being closed at its inner end 330 by an annular inner end wall 331 supporting an axially inwardly extending center post member 110 having a generally cylindrical post wall 114 closed at an outer end 113. An annular flow space 124 is defined between the post member 110 and the stem 36 within the passageway 37.

The piston-forming element 14 comprises a central hollow piston stem 36 extending along the axis 13. The piston stem 36 has a central passageway 37 from a discharge outlet 15 at an outer end of the piston-forming element through to an inner opening 39 at an inner end 203 of the piston-forming element 14. A pair of foam inducing screens 64 and 64*a* are disposed in the central passageway 37 spaced inwardly from the discharge outlet 15. The annular flow space 124 is defined between the post member 110 and the stem 36 within the passageway 37. The piston-forming element 14 carries a series of annular members which extend radially outwardly from the piston stem 36. As annular members, the piston stem 36 carries two outwardly extending discs, namely, a first disc 321 proximate the inner end 203 of the piston-forming element 14 and an outer disc 322. The outer disc 322 engages the wall 313 of the outer chamber 303 to form a seal therewith preventing fluid flow axially outwardly therepast but also it is preferably axially inwardly therepast. The inner disc 321 is sized such that between the intermediate position of FIG. 52 and the retracted position of FIG. 53, the inner disc 321 engages with the wall 311 of the inner chamber 301 to form a seal therewith preventing fluid flow axially outwardly therepast and preferably axially inwardly therepast. The inner disc 321 is sized such that between the extended position of FIG. 51 and positions outward of the intermediate position of FIG. 52, the inner disc 321 is spaced radially inwardly from the wall 312 of the intermediate chamber 302 to permit flow axially inwardly and outwardly therepast.

Operation of the sixteenth embodiment of FIGS. 51 to 53 is now described. In a retraction stroke, the piston-forming element 14 is moved from the extended position of FIG. 51 to the intermediate position of FIG. 52 and then to the retracted position of FIG. 53. While the piston-forming element 14 is in positions such as the extended position in which the inner disc 321 permits fluid flow axially therepast as by being within the second chamber 302 and spaced from the respective wall 312, there is provided communication between the interior of a bottle coupled to the pump from the transfer port 31 to the discharge outlet 15. Such communication is via an annular space 222 from the transfer port 31 radially outwardly of the stem 36 and radially inwardly of the walls 312 and 311 to the inner end 203 of the piston-forming element 14 and then through the flow space 124 to the central passageway 37 of the stem 36 to the discharge outlet 15. This communication permits air to pass as from the discharge outlet 15 into the bottle to relieve any vacuum which may be created within the bottle. However, liquid flow from the bottle to the discharge outlet 15 is prevented at least in a non-collapsible bottle in which a vacuum is created as liquid is dispensed by reason of the fact that the transfer port 31 is disposed at a height H.sub.2 below the upper end 203. The height H.sub.2 can be chosen to be a height so as to restrict fluid flow from the bottle and air flow into the bottle as has been discussed earlier with other embodiments.

In a retraction stroke, once the piston-forming element 14 is moved inwardly to the intermediate position shown in FIG. 52, a liquid pump 101 is formed with by inner disc 321 engaging the wall 311 of the inner chamber 301. In movement from the intermediate position of FIG. 52 to the retracted position of FIG. 53, fluid in a discharge compartment 349 defined inside the inner chamber 301 axially inwardly of the inner disc 321 and including the flow space 124 and the central passageway 37 is reduced in volume. Air and fluid within this discharge chamber 349 is compressed with movement between the intermediate position of FIG. 52 and the retracted position of FIG. 53 with liquid and air being simultaneously discharged through the foam inducing screens 64 and 64*a* and out the discharge outlet 15 as foam.

In a withdrawal stroke on moving from the retracted position of FIG. 53 to the intermediate position of FIG. 52, the volume within the discharge chamber 349 increases drawing air inwardly into the discharge chamber 349 via the discharge outlet 15. In a withdrawal stroke on moving from the retracted position of FIG. 53 to the intermediate position of FIG. 52, the volume within an annular liquid compartment 350 outwardly of the stem 36 between the discs 321 and 322 inside the chambers 301, 302 and 303 increases drawing liquid into this annular liquid compartment 350 from the container via the transfer port 31. In the withdrawal stroke in moving from the intermediate position of FIG. 52 to the extended position of FIG. 51, communication between the discharge outlet 15 and the transfer port 31 becomes open permitting air to flow from the discharge outlet 15 through the discharge chamber 39 to the transfer port 31 to relieve any vacuum which may have been developed in the bottle, however, it is to be appreciated that in moving from the intermediate position of FIG. 52 to the extended position of FIG. 51, the disclosure chamber 349 significantly increases in volume which tends to draw air inwardly from the discharge outlet 15 and, to some extent, to draw liquid and/or air axially inwardly past the inner disc 321 and axially outwardly through the flow space 124.

The seventeenth embodiment illustrated in FIGS. 51 to 53 is provided with the optional center post member 110 to reduce the dead volume of the discharge compartment 349 and thus serve to more quickly increase the pressure of the compressible air within the discharge compartment 349 as in a retraction stroke.

Figure 54:
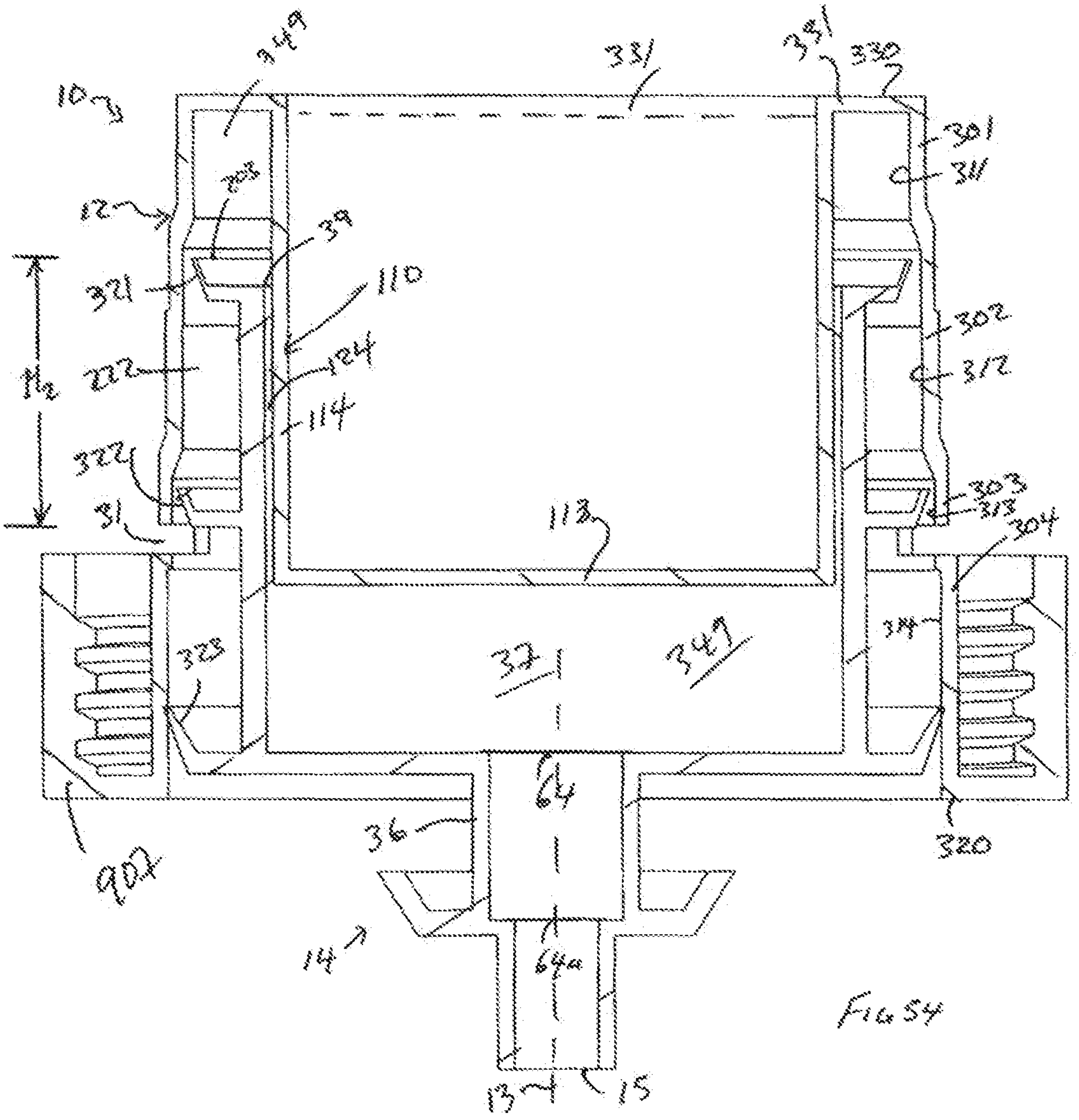
FIG. 54 is a cross-sectional front view of a piston pump in accordance with a seventeenth embodiment of a piston pump in accordance with the present invention with the piston-forming element in a fully extended position.
Figure 55:
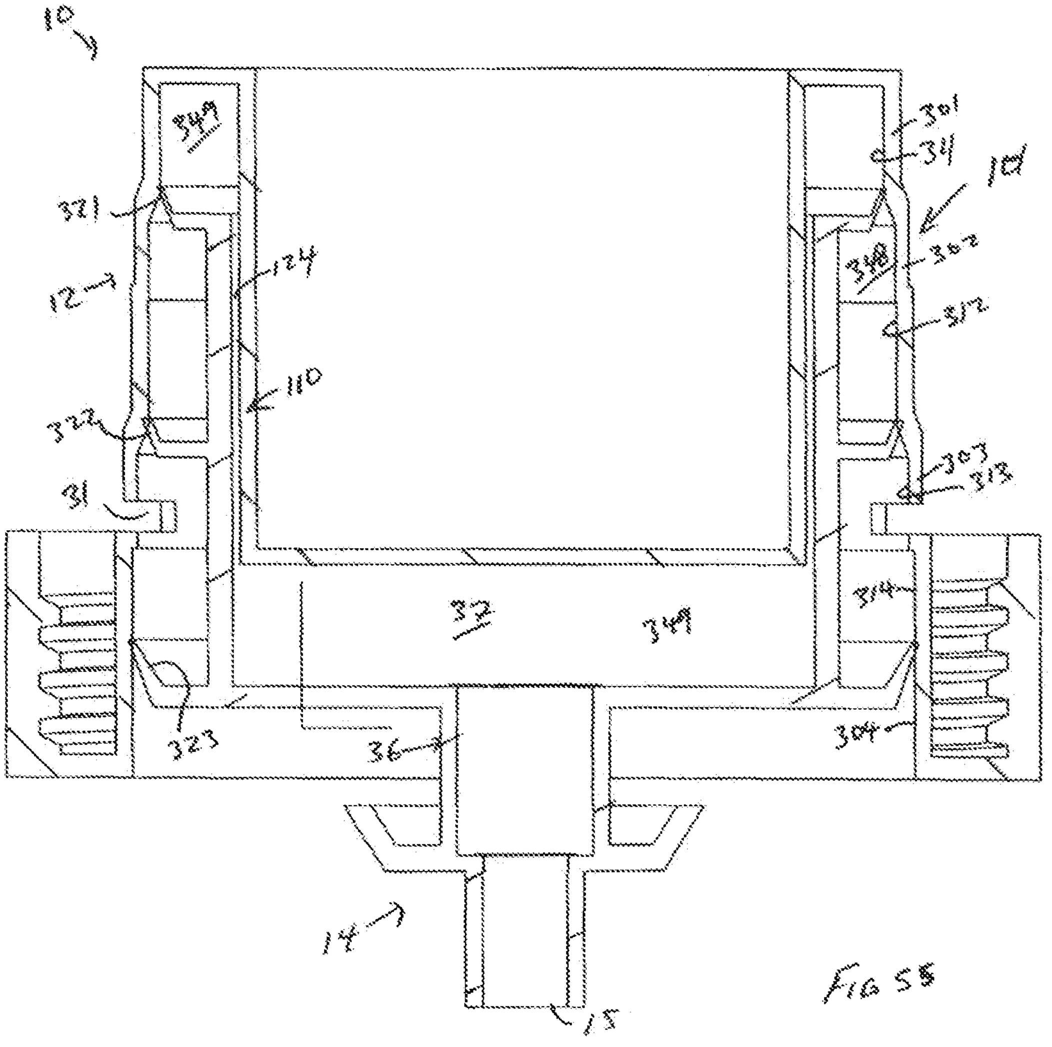
FIG. 55 is a cross-sectional front view of the pump of FIG. 54 with the piston-forming element in an intermediate position.
Figure 56:
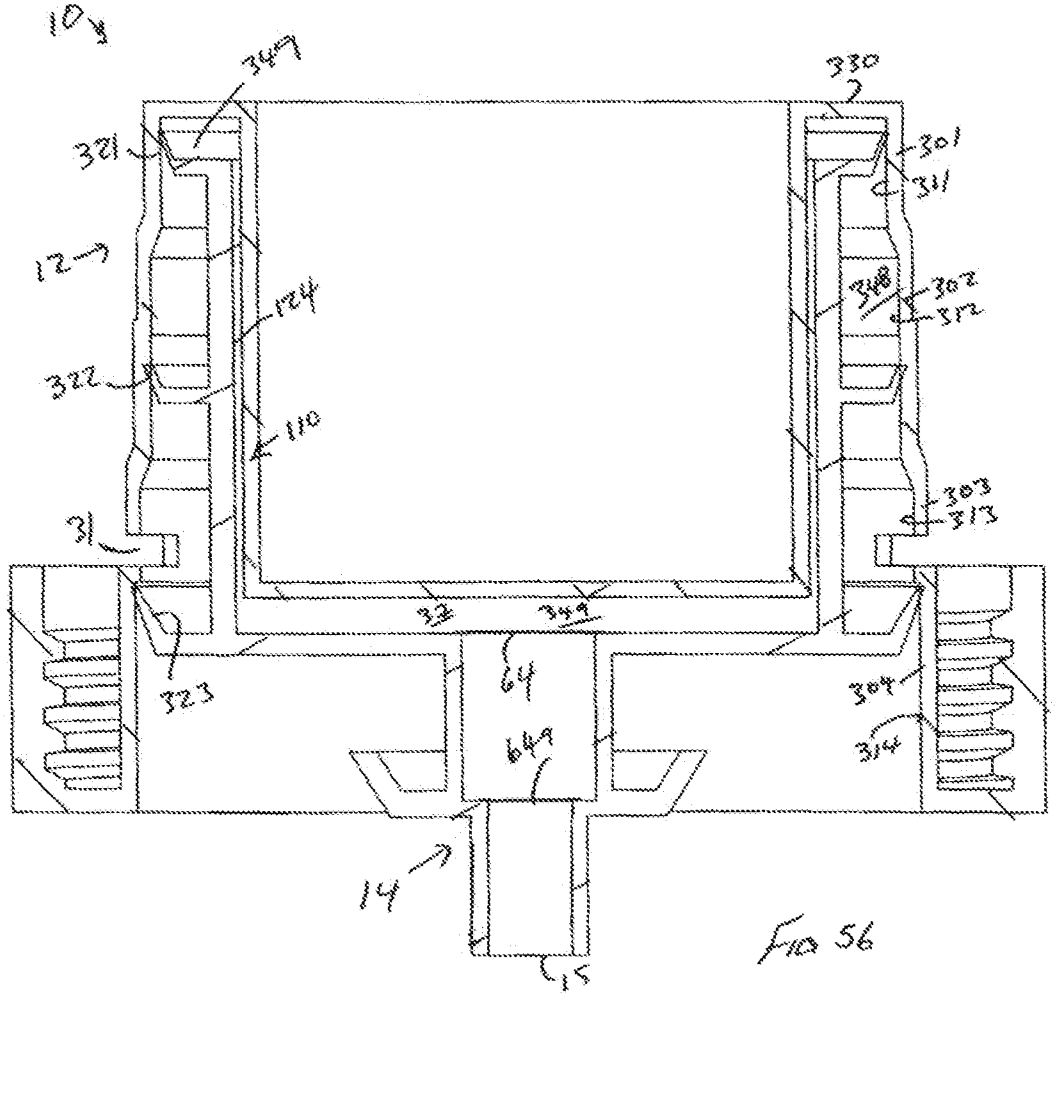
FIG. 56 is a cross-sectional front view of the pump of FIG. 54 with the piston-forming element in the fully retracted position.

Reference is made to FIGS. 54 to 56 which illustrate a seventeenth embodiment of a piston pump 10 in accordance with the present invention. The piston pump 10 comprises a piston chamber-forming member 12 and the piston-forming element 14 disposed about a common central axis and coaxially slidable for reciprocal sliding motion inwardly and outwardly between an extended position shown in FIG. 54, an intermediate position shown in FIG. 55 and a retracted position shown in FIG. 56. The piston chamber-forming member 12 defines coaxial cylindrical chambers of different diameters increasing in diameter from an inner end 330 to an open outer end 320. There is provided a first innermost chamber 301, a second inner intermediate chamber 302, a third outer intermediate chamber 303 and a sealing outermost chamber 304, each having a diameter larger than the diameter of the chamber axially inwardly therein and each having an outer end opening into the next adjacent outer placed chamber. An annular shoulder joins each of the adjacent chambers. Each of the chambers 301, 302, 303 and 304 have a radially inwardly directed wall 311, 312, 313 and 314, respectively. A transfer port 31 is provided through the wall 313 proximate the shoulder joining the fourth chamber 304 with the third chamber 303. The first chamber 301 is shown as being closed at its inner end 330 by an annular inner end wall 331 supporting an axially inwardly extending center post member 110 having a generally cylindrical post wall 114 closed at an outer end 113. An annular flow space 124 is defined between the post member 110 and the stem 36 within the passageway 37. However, the center post member 110 may be eliminated and replaced by a continuous end wall 331 shown in dashed lines on FIG. 54. The piston-forming element 14 comprises a central hollow piston stem 36 extending along the axis 13. The piston stem 36 has a central passageway 37 from a discharge outlet 15 at an outer end of the piston-forming element 14 through to an inner opening 39 at an inner end of the piston-forming element. A pair of foam inducing screens 64 and 64*a* are disposed in the central passageway 37 spaced inwardly from the discharge outlet 15. An annular flow space 124 is defined between the post member 110 and the stem 36 within the passageway 37. The piston-forming element 14 carries a series of annular members which extend radially outwardly from the piston stem 36. As annular members, the piston stem 36 carries three outwardly extending discs, namely, a first disc 321 proximate the inner end 203 of the piston-forming element 14, an intermediate disc 322 axially outwardly of the inner disc 321 and an outer disc 323 axially outwardly of the intermediate disc 322. The outer disc 323 engages the wall 314 of the fourth chamber 304 to form a seal therewith preventing fluid flow axially outwardly therepast but also preferably axially inwardly therepast. The intermediate disc 322 is sized such that between the intermediate position of FIG. 55 and the retracted position of FIG. 56, the intermediate disc 322 engages with the wall 312 of the second chamber 302 to form a seal therewith preventing fluid flow axially outwardly therepast and preferably axially inwardly therepast. The intermediate disc 322 is sized such that between the extended position of FIG. 54 and positions outward of the intermediate position, the intermediate disc 322 is spaced radially inwardly from the wall 313 of the third chamber 303 to permit flow axially inwardly and outwardly therepast.

The inner disc 321 is sized such that between the retracted position and the intermediate position, the inner disc 321 engages the wall 311 of the inner chamber 301 to prevent fluid flow axially outwardly therepast yet with the inner disc 321 being deflectable radially inwardly so as to permit fluid flow axially inwardly past the inner disc 321. The inner disc 321 is sized such that in positions between the extended position and a position axially outwardly of the intermediate position, the inner disc 321 lies within the second chamber 302 with the inner disc 321 spaced from the wall 312 of the second chamber permitting flow axially inwardly and outwardly therepast.

Operation of the seventeenth embodiment of FIGS. 54 to 56 is now described. In a retraction stroke, the piston-forming element 14 is moved from the extended position of FIG. 54 to the intermediate position of FIG. 55 and then to the retracted position of FIG. 56. While the piston-forming element 14 is in positions such as the extended position in which both the inner disc 321 and the intermediate disc 322 permit fluid flow axially therepast as by being within the second chamber 302 and the third chamber 303, respectively, so as to be spaced from the respective walls 312 and 313, there is provided communication between the interior of a bottle coupled to the pump from the transfer port 31 to the discharge outlet 15. Such communication is via an annular space 222 from the transfer port 31 radially outwardly of the stem 36 and radially inwardly of the walls 313, 312 and 311 to the inner end 203 of the piston-forming element 14 and then through the central passageway 37 of the stem 36 including the flow space 124 to the discharge outlet 15. This communication permits air to pass as from the discharge outlet 15 into the bottle to relieve any vacuum which may be created within the bottle. However, liquid flow from the bottle to the discharge outlet 15 is prevented at least in a non-collapsible bottle in which a vacuum is created as liquid is dispensed by reason of the fact that a transfer port 31 is disposed at a height H.sub.2 below the upper end 203. The height H.sub.2 can be chosen to be a height so as to restrict fluid flow from the bottle and air flow into the bottle as has been discussed earlier with other embodiments.

In a retraction stroke, once the piston-forming element 14 is moved inwardly to the intermediate position shown in FIG. 55, a stepped liquid pump 101 is formed with the intermediate disc 322 engaging the wall 312 of the second chamber 302 and the inner disc 321 engaging the wall 311 of the inner chamber 301. In movement from the intermediate position of FIG. 55 to the retracted position of FIG. 56, fluid in a liquid compartment 348 defined inside the inner chamber 301 and the outer chamber 302 between the inner disc 321 and the intermediate disc 322 is reduced in volume with an increase in pressure in the liquid compartment 348 deflecting the inner disc 321 to discharge fluid upwardly and axially inwardly past the inner disc 321 and into a discharge chamber 349 formed within the inner chamber 301 axially inwardly of the inner disc 321 including the flow space 124 and the central passageway 37. Air and fluid within this discharge chamber 349 is compressed with movement between the intermediate position of FIG. 55 and the retracted position of FIG. 56 with liquid and air being simultaneously discharged through the foam inducing screens 64 and 64*a* and out the discharge outlet 15 as foam.

In a withdrawal stroke on moving from the retracted position of FIG. 56 to the intermediate position of FIG. 55, the volume within the liquid compartment 348 increases drawing liquid past the intermediate disc 322 into the liquid compartment 348 from the bottle via the transfer port 31 and, at the same time, the volume of the discharge chamber 349 increases drawing air inwardly into the discharge chamber 349 via the discharge outlet 15. In the withdrawal stroke in moving from the intermediate position of FIG. 55 to the extended position of FIG. 54, communication between the discharge outlet 15 and the transfer port 31 becomes open permitting air to flow from the discharge outlet 15 through the discharge chamber 349 to the transfer port 31 to relieve any vacuum which may have been developed in the bottle, however, it is to be appreciated that in moving from the intermediate position of FIG. 55 to the extended position of FIG. 54, the disclosure chamber 349 significantly increases in volume which tends to draw air inwardly from the discharge outlet 15 and, to some extent, to draw liquid and/or air axially inwardly past the inner disc 321 and axially outwardly through the floe space 124.

In the seventeenth embodiment of FIGS. 54 to 56, each of the inner disc 321 and the intermediate disc 322 are shown as discs which extend axially inwardly and radially outwardly to a distal end. Each of these discs when engaged with the respective wall 311 of the first chamber 301 or the wall 312 of the second chamber 302 prevent air or liquid flow axially outwardly therepast in the yet are deflectable to permit fluid flow axially inwardly as is desired for operation of the stepped liquid pump 101 which is adapted to pump fluid axially inwardly through the annular space between the stem 35 and the walls 311, 312 and 313 of the piston chamber-forming member 12.

The seventeenth embodiment illustrated in FIGS. 54 to 56 is preferably provided with the optional center post member 110 to reduce the dead volume of the discharge chamber 349 and thus serve to more quickly increase the pressure of the compressible air within the discharge chamber 349 as in a retraction stroke. The seventeenth embodiment of FIGS. 54 to 56 is advantageous in having the transfer port 31 located at a height relatively close to the height of the end of the bottle to be received in the threaded collar 907 to minimize the volume of liquid in the bottle that cannot be pumped out by the pump 10.

Reference is made to FIGS. 57 to 60 which illustrate an eighteenth embodiment of a piston pump 10 in accordance with the present invention. The piston chamber-forming member 12 is coaxial about the center axis 13 and provides three chambers, namely, an inner chamber 401, an intermediate chamber 402 and an outer chamber 403, each increasing in diameter and each opening outwardly to the next axially outward chamber. The inner chamber 401 is closed at its inner end 203 by an annular end wall 430 which carries a center post member 110 which extends coaxially outwardly as a cylindrical post wall 114 to a closed outer end 113. Proximate the juncture between the second chamber 402 and the third chamber 403, a one-way valve structure

Figure 60:
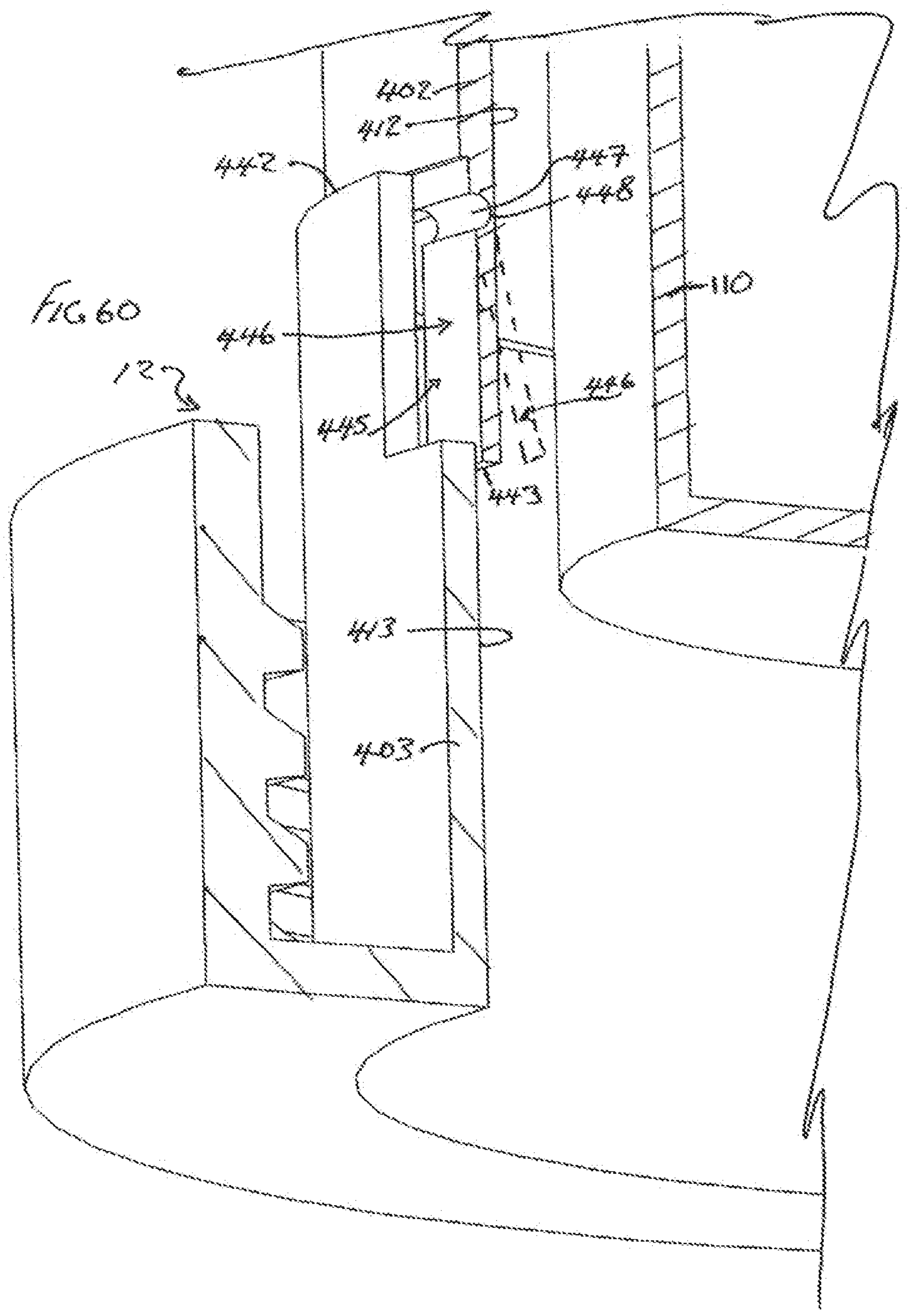
FIG. 60 shows portions of the pump of FIG. 59 within the broken line circle shown on FIG. 59 in an enlarged perspective view.

444 is provided which permits fluid flow radially inwardly through a wall 412 of the second chamber 402 yet restricts fluid flow radially outwardly. The one-way valve mechanism 444 is best seen in FIG. 60. The piston chamber-forming member 12 is formed from two components, an outer element 440 and an inner element 441 which are joined together so as to overlap an inner end 442 of the outer element 440 and an outer end 443 of the inner element 441. The inner end of the outer element 440 is provided with circumferentially spaced rectangular slots 445 which extend axially inwardly from the inner end 442 at circumferentially spaced locations as in a castellated manner. The inner element 441 has a series of complementary rectangular tabs 446 which extend axially outwardly at circumferentially spaced locations so as to overlie each of the slots 445 and effectively close the slots 445 to fluid flow therethrough. As can be seen in FIG. 60, a circumferentially extending channel 447 is cut from the inner member 441 proximate the axial outer end of each tab 446 so as to provide, in effect, a living hinge 448 about which the tab 446 may be pivoted from the position shown in solid lines in FIG. 60 to a position shown in dashed lines in FIG. 60, however, with the tab 446 having an inherent bias as to assume the position shown in solid lines in FIG. 60. When there is a pressure differential through each slot 445 across its respective tab 446 sufficient to overcome its inherent bias of the tab 446 to assume the closed position, the tab 446 is deflected radially inwardly towards an open position to permit fluid flow radially inwardly through the slots 445 from the bottle into the intermediate chamber 402. The channel 447 serves in providing for continuous communication through the wall 412 of the intermediate chamber 402 as can be advantageous to provide for air venting in a manner as will be described later. While the channel 447 as shown in FIG. 60 is adapted to provide for a relatively small opening for communication through the wall 412 at all times, it is to be appreciated that other valve structures could be provided which would not provide such communication at all times as, for example, by providing the channel 447 on a radially inward side of the tab 446 rather than on a radially outward side as shown.

The piston-forming element 14 is coaxial about the central axis 13 and has a central hollow piston stem 36 with a central passageway 37 from the discharge outlet 15 at an outer end to an inner opening 39 at an inner end 203 of the piston-forming element 14. A pair of foam inducing screens 64 and 64*a* are provided within the passageway 34 proximate the discharge outlet 15.

Figure 57:
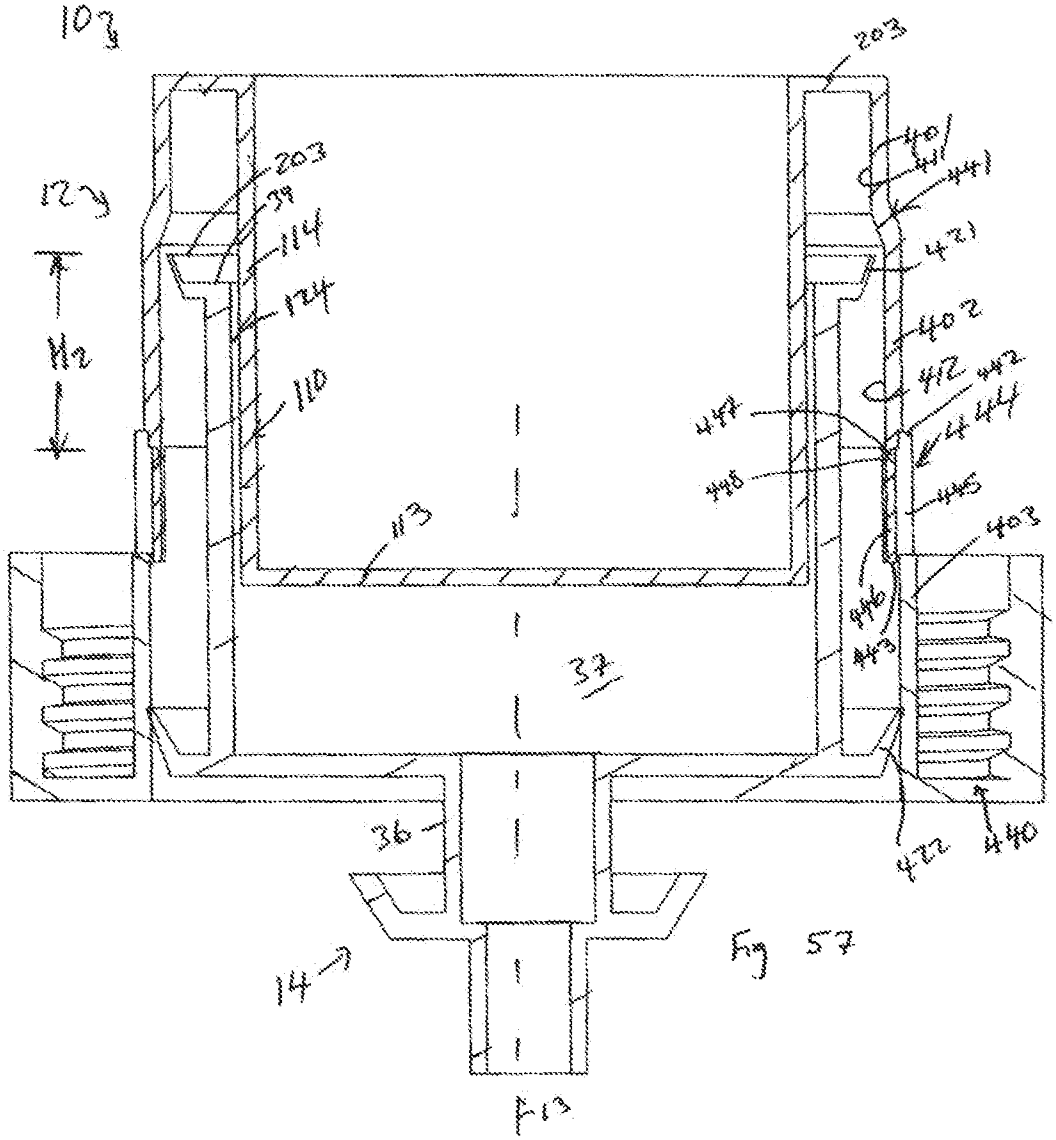
FIG. 57 is a cross-sectional front view of a piston pump in accordance with an eighteenth embodiment of a piston pump in accordance with the present invention with the piston-forming element in a fully extended position.
Figure 58:
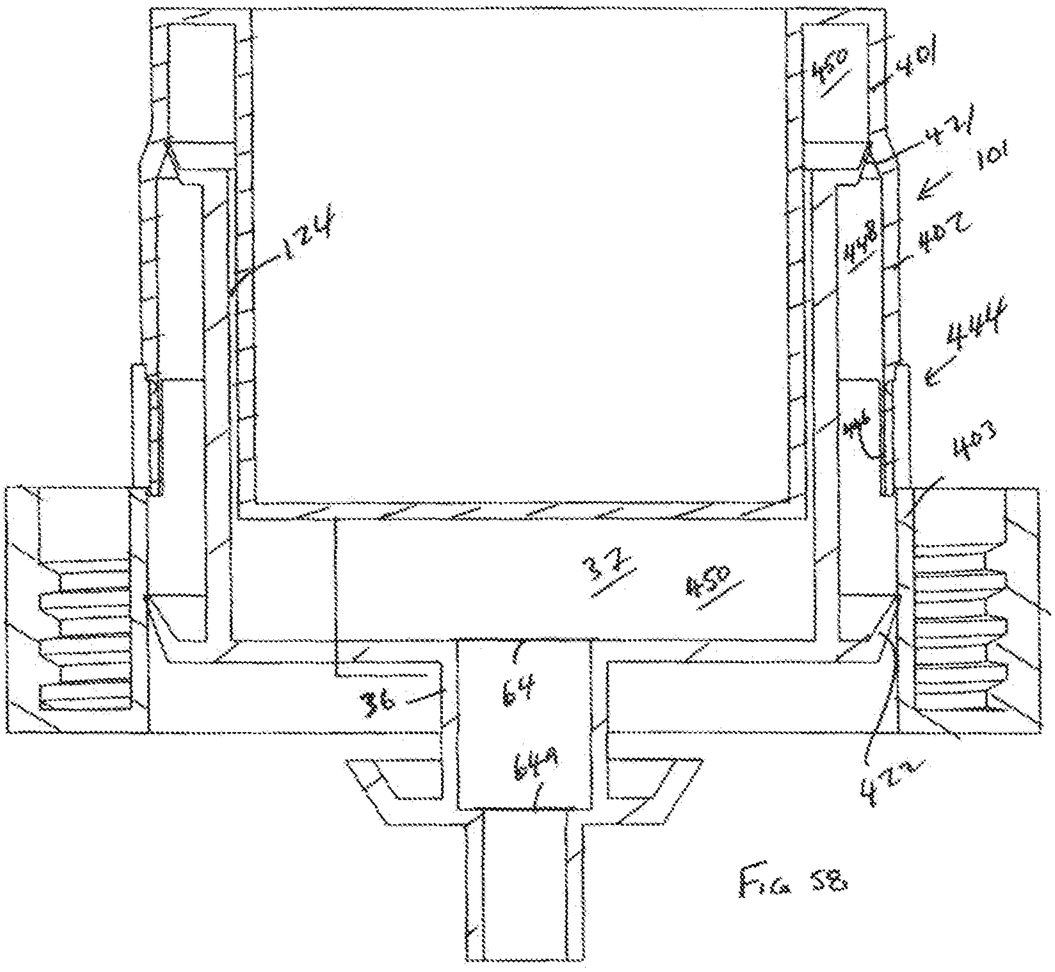
FIG. 58 is a cross-sectional front view of the pump of FIG. 57 with the piston-forming element in an intermediate position.
Figure 59:
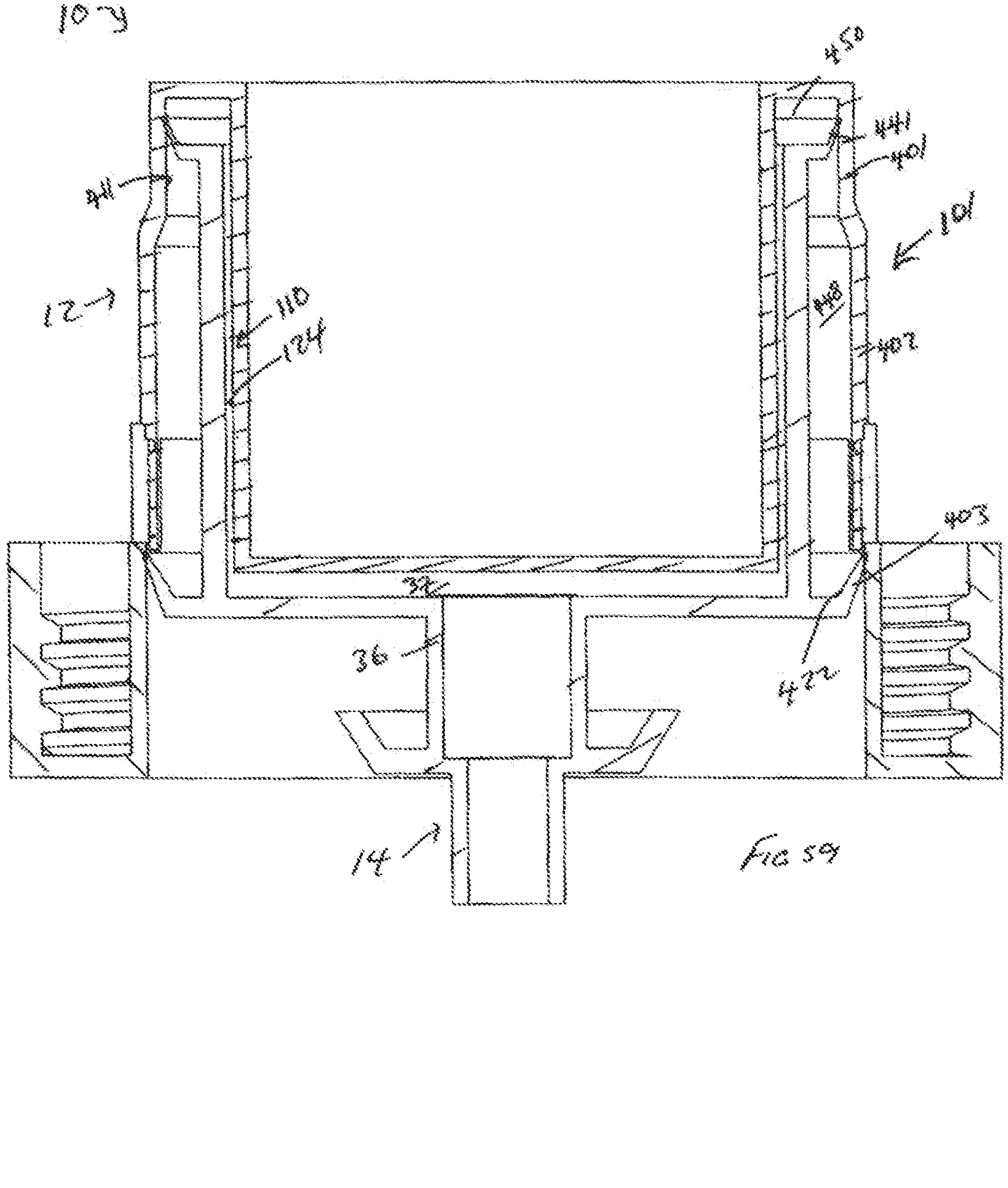
FIG. 59 is a cross-sectional front view of the pump of FIG. 57 with the piston-forming element in the fully retracted position.

An inner disc 421 extends radially outwardly from the stem 36 proximate the inner end 203 and an outer disc 422 extends radially outwardly from the stem axially outwardly at the inner disc 421. The outer disc 422 is received at all times within the outer chamber 403 and engages the wall 413 to prevent fluid flow at least axially outwardly therepast and preferably also axially inwardly therepast. The inner disc 421 is sized such that when the piston is between the intermediate position of FIG. 58 and the retracted position of FIG. 59, the disc 421 engages a wall 411 of the inner chamber 401 to form a seal therewith and prevent fluid flow axially outwardly therepast yet the inner disc 401 is deflectable radially inwardly to permit fluid flow axially inwardly therepast. When the piston-forming element 14 is in the extended position as seen in FIG. 57 and in positions outwardly from the intermediate position, the inner disc 421 is within the intermediate chamber 402 spaced from engagement with the wall 412 of the intermediate chamber 402 to permit fluid flow axially inwardly and outwardly therepast. In a retraction stroke, on moving from the intermediate position of FIG. 58 to the retracted position of FIG. 59, the inner disc 421 and the outer disc 422 form a stepped liquid pump 101 with a liquid compartment 448 formed inside the chambers 401 and 402 intermediate the inner disc 421 and the outer disc 422 with the volume of the liquid compartment 448 decreasing to close the one-way mechanism 444 by urging the tab 446 into engagement to cover the slot 445 and to force liquid to deflect the inner disc 421 and pass liquid axially upwardly past the inner disc 421 and into a discharge compartment 450 formed within the inner chamber 401 axially inwardly of the inner disc 421 and including the passageway 37. In movement from the intermediate position of FIG. 58 to the retracted position of FIG. 59, the volume of the discharge compartment 450 is reduced discharging liquid and air simultaneously through the screens 64 and 64*a* and out the discharge outlet 15 as foam. In a withdrawal stroke on moving from the retracted position of FIG. 59 to the intermediate position of FIG. 58, the volume of the liquid compartment 448 increases drawing liquid from the bottle through the one-way valve mechanism 444 by displacement of the tab 446 inwardly and, at the same time, the volume of the discharge chamber 450 increases drawing air inwardly into the discharge chamber 450 via the discharge outlet 15. On movement from the intermediate position of FIG. 58 to the fully extended position of FIG. 57, the inner disc 421 enters the intermediate chamber 402 and becomes spaced from the wall 412 providing communication between the bottle and the outlet 15 via the channel 447 and the discharge chamber 450 such that air may pass through the channel 447 into the bottle to relieve any excess vacuum developed therein. By reason of the height H.sub.2 of the inner end 203 of the piston stem 36 above the channel 447 there is resistance to liquid flowing from the reservoir out to the discharge outlet 15.

Figure 61:
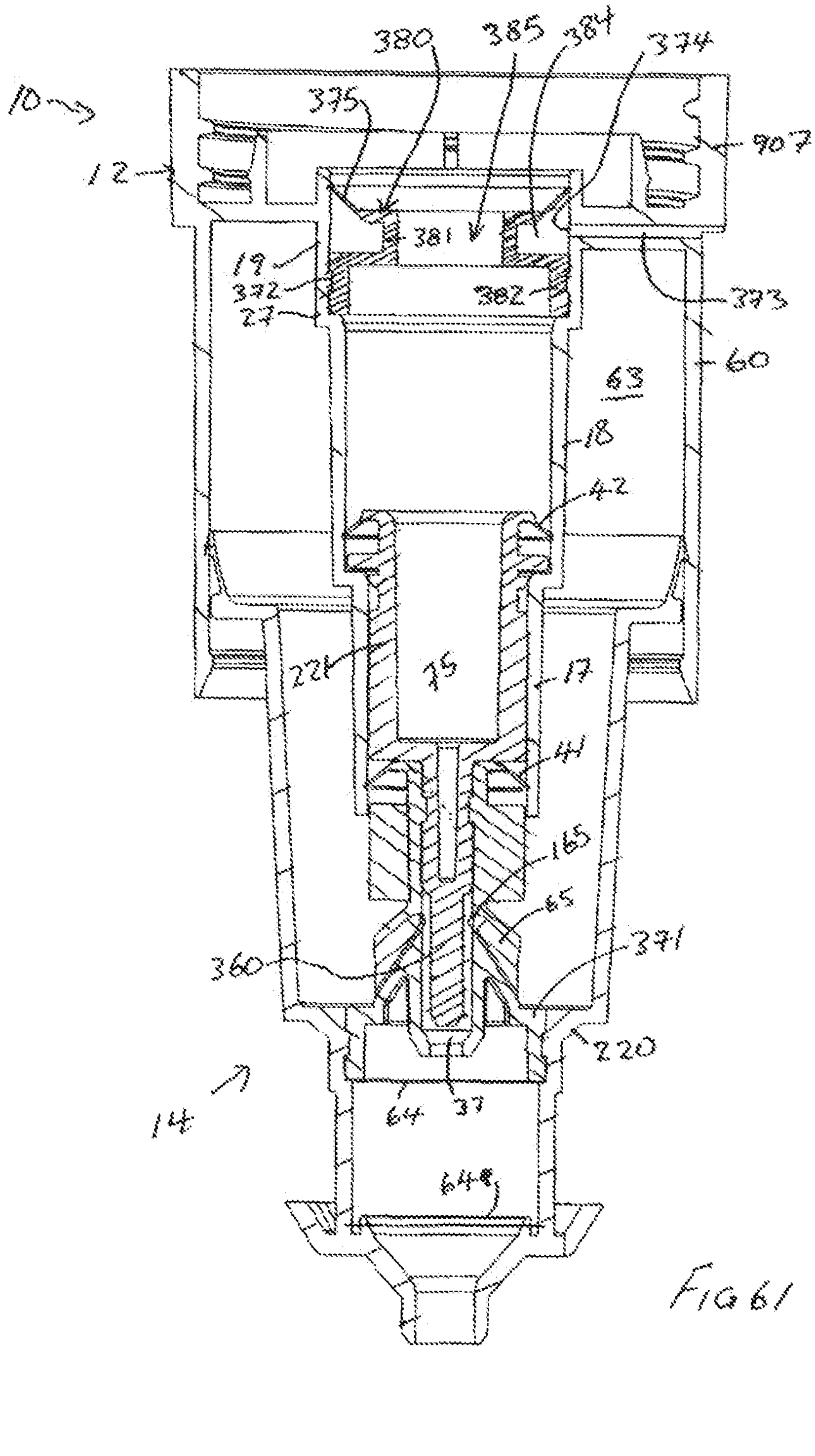
FIG. 61 is a cross-sectional front view of a piston pump in accordance with a nineteenth embodiment of a piston pump in accordance with the present invention with the piston-forming element in a fully extended position.
Figure 62:
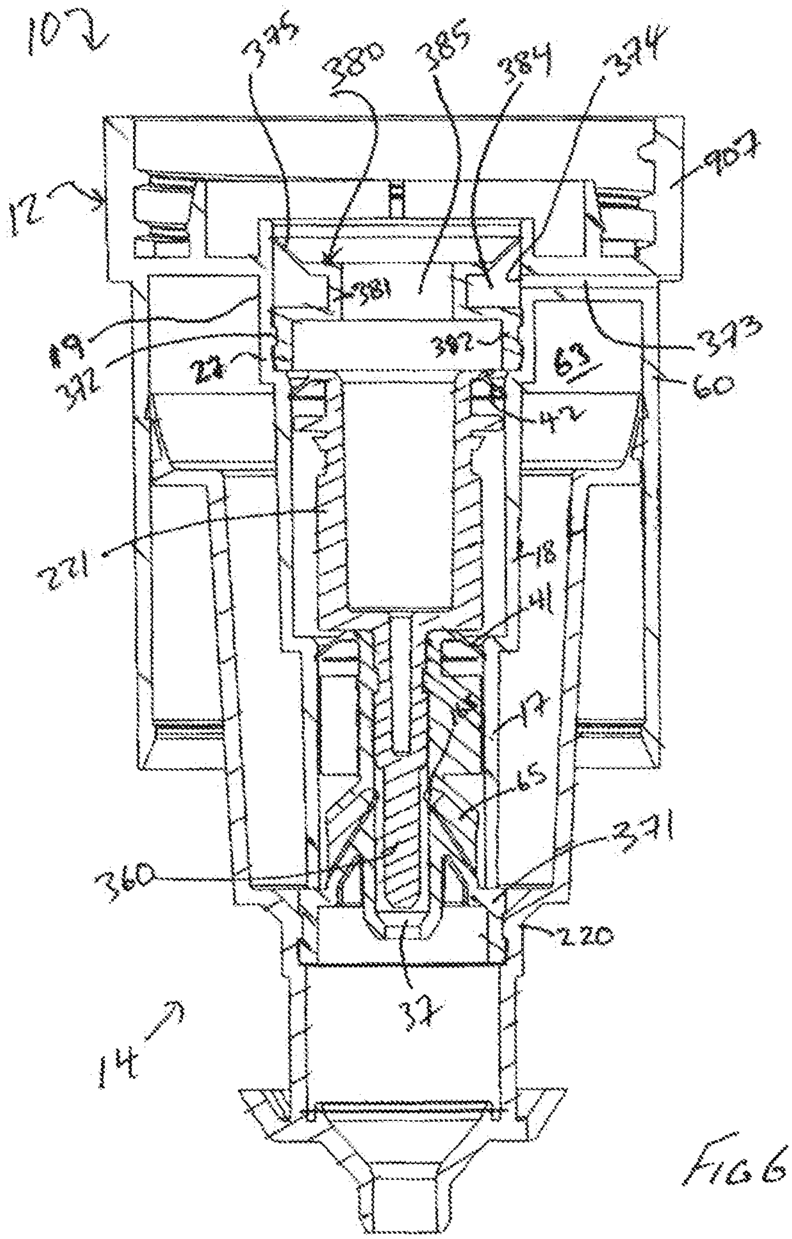
FIG. 62 is a cross-sectional front view of the pump of FIG. 61 with the piston-forming element in the fully retracted position.

Reference is made to FIGS. 61 and 62 showing a nineteenth embodiment of a piston pump 10 in accordance with the present invention. The nineteenth embodiment of FIGS. 61 and 62 have many similarities to the eighth embodiment of FIG. 23, and the following differences:

1. the inner member 222 of FIG. 23 best shown in FIG. 24 is eliminated;

2. the intermediate member 221 of FIG. 23 best shown in FIG. 24 is amended (a) to increase the axial outward extent of the outer end of the intermediate member 221 such that it extends axially outwardly as a central tubular element 360 axially outwardly past the outlet 165 of the channel 65 inside the passageway 37 within the innermost element 371 of the outer member 220, and (b) to close the inner passageway to axial flow through the intermediate member 221;

3. the piston chamber-forming member 12 is modified so as to provide axially inwardly from the inner chamber 18, an inner air chamber 19 with a side wall 27. The inner air chamber 19 is sized to permit insertion of the intermediate member 221 coaxially axially inwardly therethrough.

4. the inner air chamber 19 is shown as being provided with an annular retaining boss 372 extending radially inwardly; and 5. an air vent channel 373 is provided which extends radially from a radially inner end 374 in the wall 27 of the inner air chamber 19 to the atmosphere; with the air vent channel 373 is axially outwardly of the threaded collar 907 and axially inwardly of the air compartment 63 and its air chamber 60.

An air vent tube 380 is secured within the inner air chamber 19 and comprises a hollow stem 381 from which a cylindrical seal disc 382 extends radially outwardly for sealed engagement with the wall 27 of the inner air chamber 19 as engaged about the retaining boss 372. Inwardly from the seal disc 382, an air vent disc 375 extends radially outwardly on the stem 381 into engagement with the wall 27 of the inner chamber 19. The air vent disc 375 extends axially inwardly and radially outwardly to a distal end which is biased into engagement with the wall 27, however, may be deflected radially inward to permit air flow axially inwardly therepast when a sufficient pressure differential exists between the atmospheric air and the inside of the bottle. The air vent channel 373 provides communication from the atmosphere into an annular air compartment 384 defined within the inner chamber 19 between the wall 27 and the stem 381 intermediate the seal disc 382 and the air vent 375 disc. The air vent disc 375 operates as a one-way valve to relieve vacuum within the bottle by atmospheric air communicated from the atmosphere via the air vent channel 373. The stem 381 provides a hollow central passageway 385 for flow of liquid from the bottle through the inner air chamber 19 into the inner chamber 18 for subsequent flow past the disc 42 and the disc 41 with operation of the stepped liquid pump.

Figure 63:
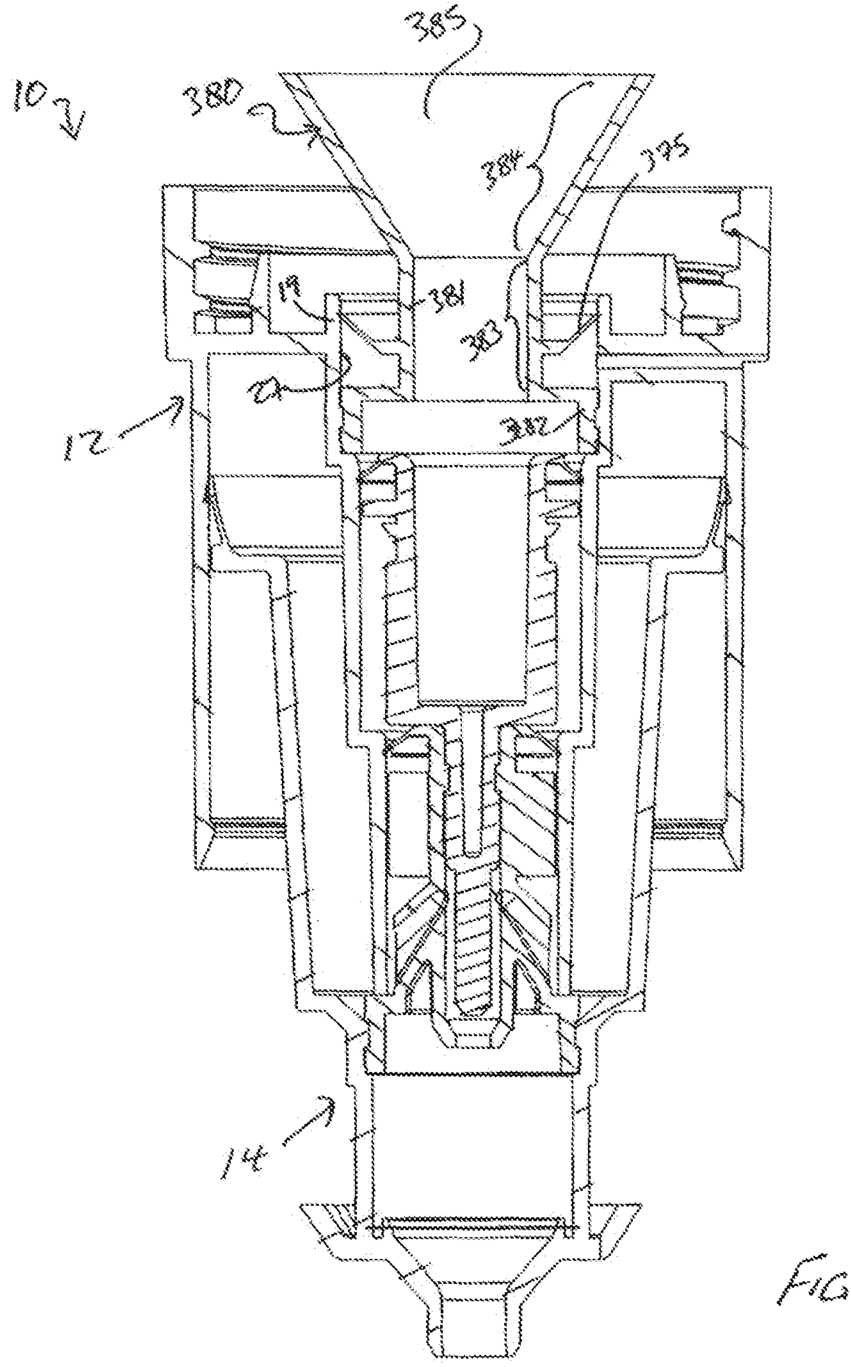
FIG. 63 is a cross-sectional front view of a piston pump in accordance with a twentieth embodiment of a piston pump in accordance with the present invention with the piston-forming element in a fully retracted position.
Figure 64:
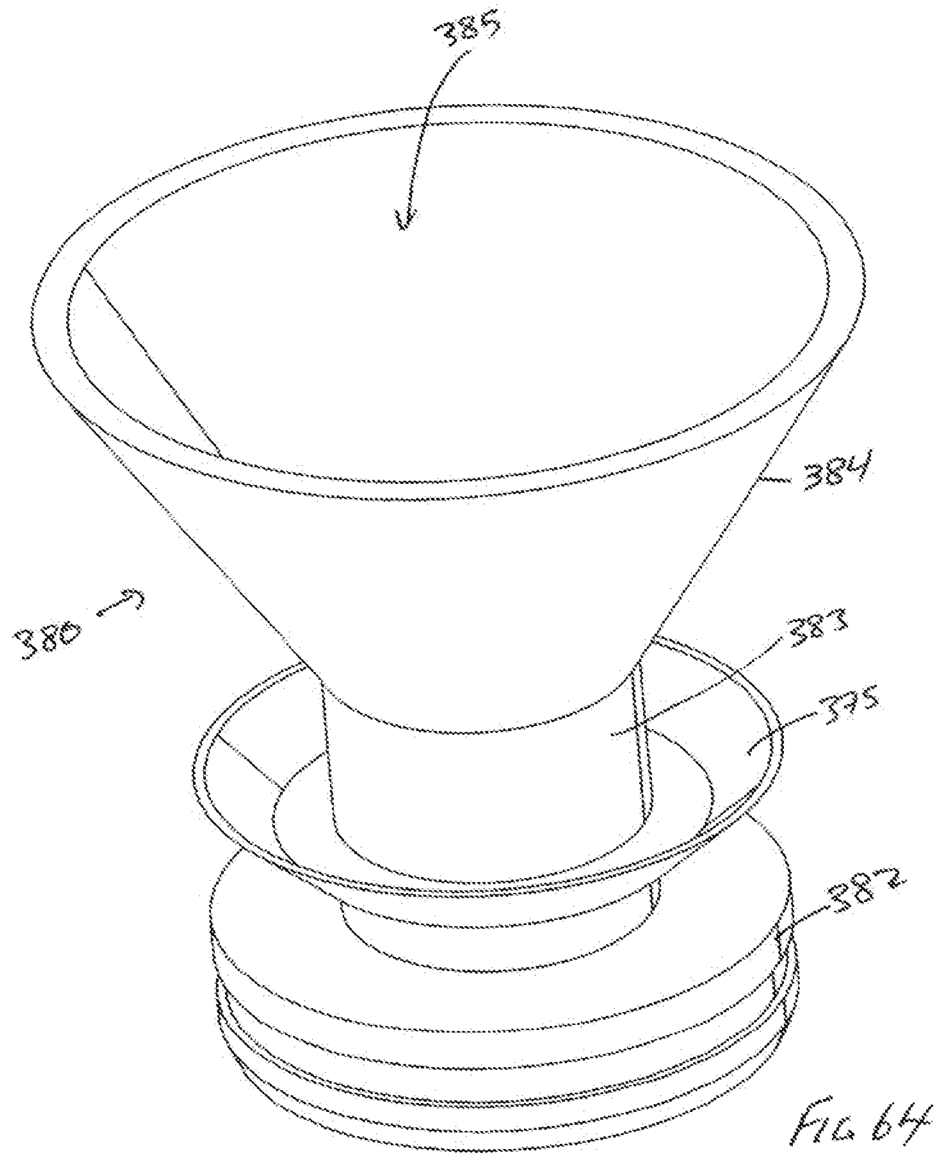
FIG. 64 is a top perspective view of the innermost end of an air vent tube of the pump shown in FIG. 63.

Reference is made to FIGS. 63 and 64 which show a piston pump 10 in accordance with a twentieth embodiment of the present invention. The piston pump 10 of the twentieth embodiment of FIGS. 63 and 64 is identical to the piston pump of the nineteenth embodiment of FIGS. 61 and 62 with the exception of the modification of the air vent tube 380 so as to provide the stem 381 to extend axially inwardly from the air vent disc 375, firstly, as a cylindrical tube 383 which merges into a frustoconical tube 384 enlarging in diameter axially inwardly. These tubes 383 and 384 on the stem 381 provide for advantageous separation of firstly the location where air may enter the bottle, at the intersection of the air vent disc 375 and the wall 27 of the inner air chamber 19 and the central entranceway for liquid through the center passageway 385 in the stem 381. The frustoconical tube 384 deflects air which may enter the bottle past the air vent disc 375 axially upwardly and radially outwardly away from the central passageway 385 through the stem 381 as can be advantageous to avoid air bubbles being formed in a viscous fluid which air bubbles might disadvantageously prevent continuous liquid flow through the central passageway 385 into the liquid pump. FIG. 64 best shows in pictorial view, the air vent tube 380 shown in cross-section in FIG. 63.

Figure 65:
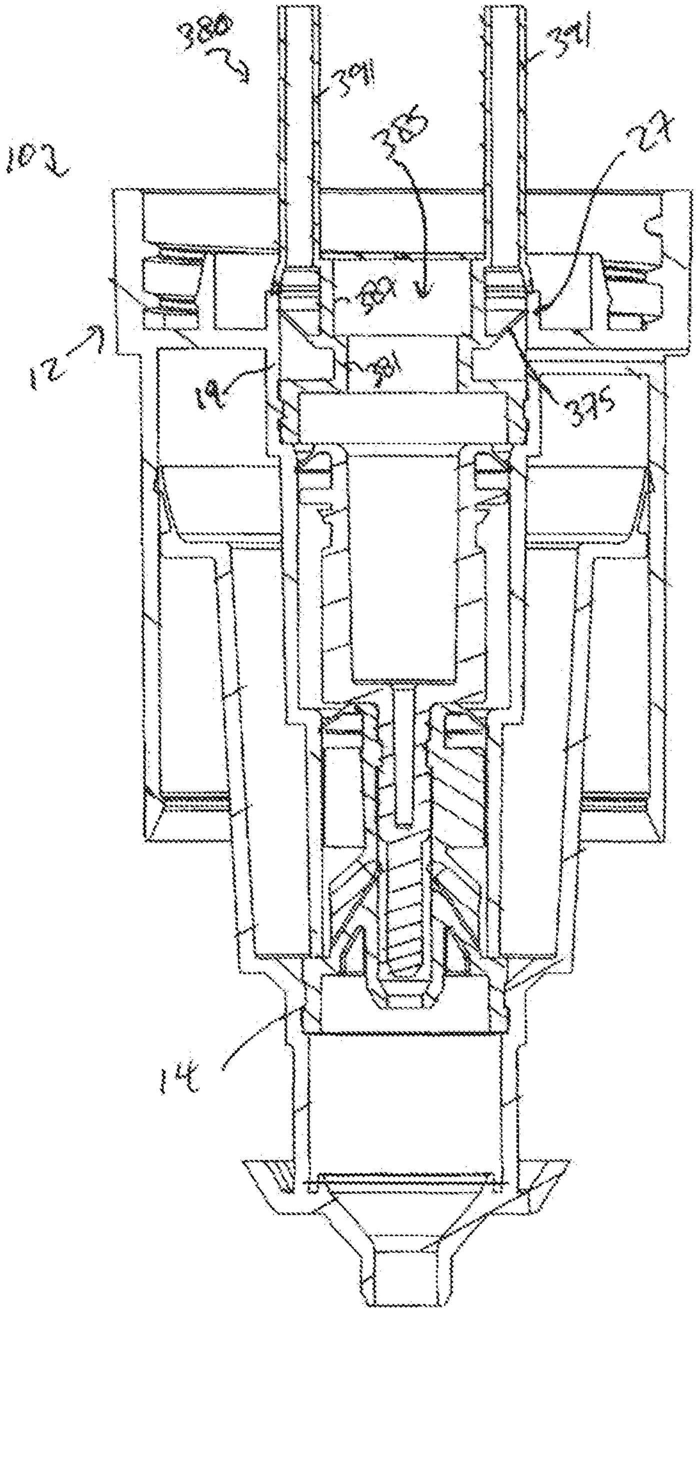
FIG. 65 is a cross-sectional front view of a piston pump in accordance with a twenty-first embodiment of a piston pump in accordance with the present invention with the piston-forming element in a fully retracted position.
Figure 66:
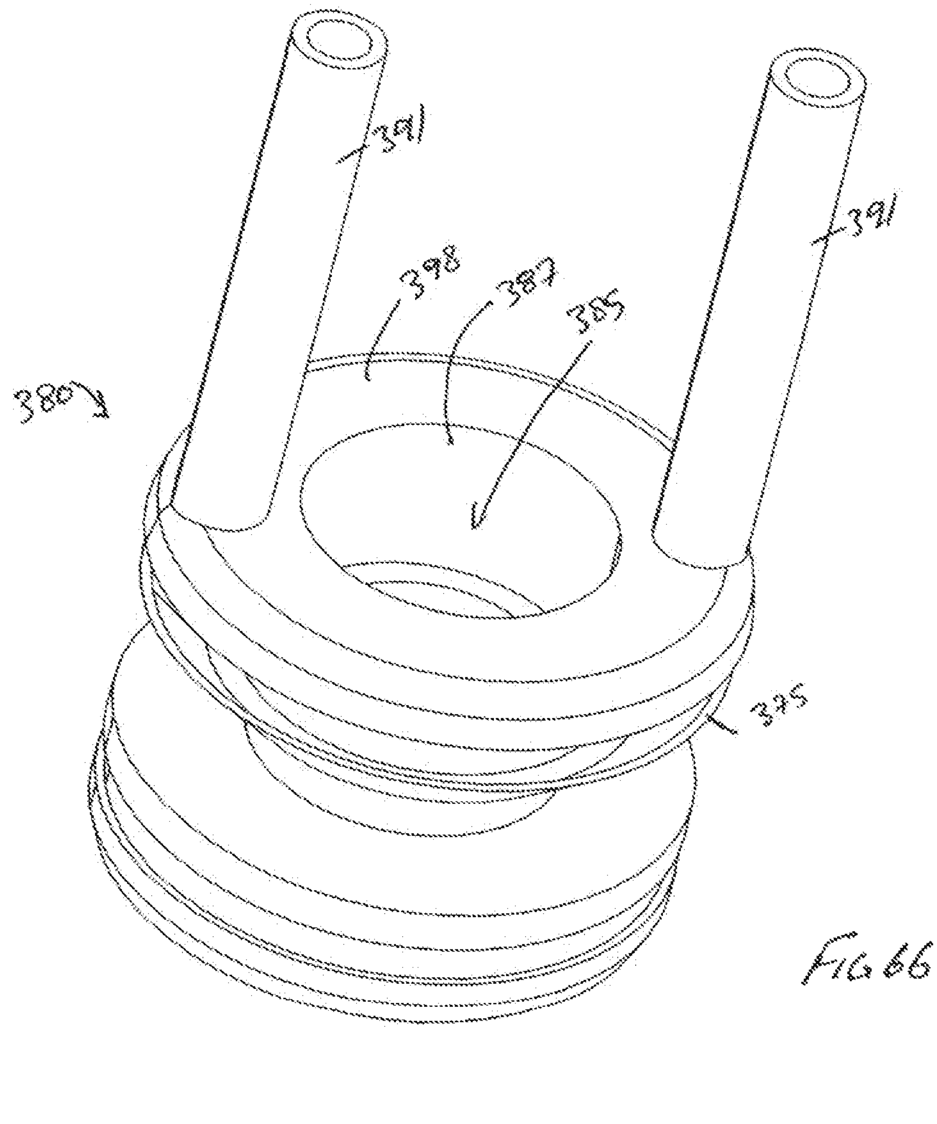
FIG. 66 is a top perspective view of the innermost end of an air vent tube of the pump shown in FIG. 65.

Reference is made to FIGS. 65 and 66 which show a twenty-first embodiment of piston pump 10 in accordance with the present invention. The twenty-first embodiment of FIGS. 65 and 66 is identical to the twentieth embodiment of FIGS. 63 and 64 with the exception that the air vent tube 380 shown in pictorial view in FIG. 63 is replaced by an air vent tube 380 having a configuration best shown in pictorial view in FIG. 66. The air vent tube 380 of FIG. 66 has a cylindrical tubular extension 387 of the stem 381 which ends axially at a radially outwardly extending air capture flange 398 which extends radially outwardly from the stem 381 to a distal end 389 which engages within an inner end of the inner air chamber wall 27 so as to confine any air which passes axially inwardly past the air vent disc 375. A pair of air tubes 391 extend axially inwardly from the annular flange 389 such that in operation, air which is vented past the air vent disc 375 into the bottle is captured by the annular flange 389 and directed to the air tubes 391 and air is vented through the liquid upwardly at the inner end of each of the air tubes 391 and thus spaced from the central passageway 385 through the air vent tube 380 where liquid is to pass to the liquid pump.

Figure 67:
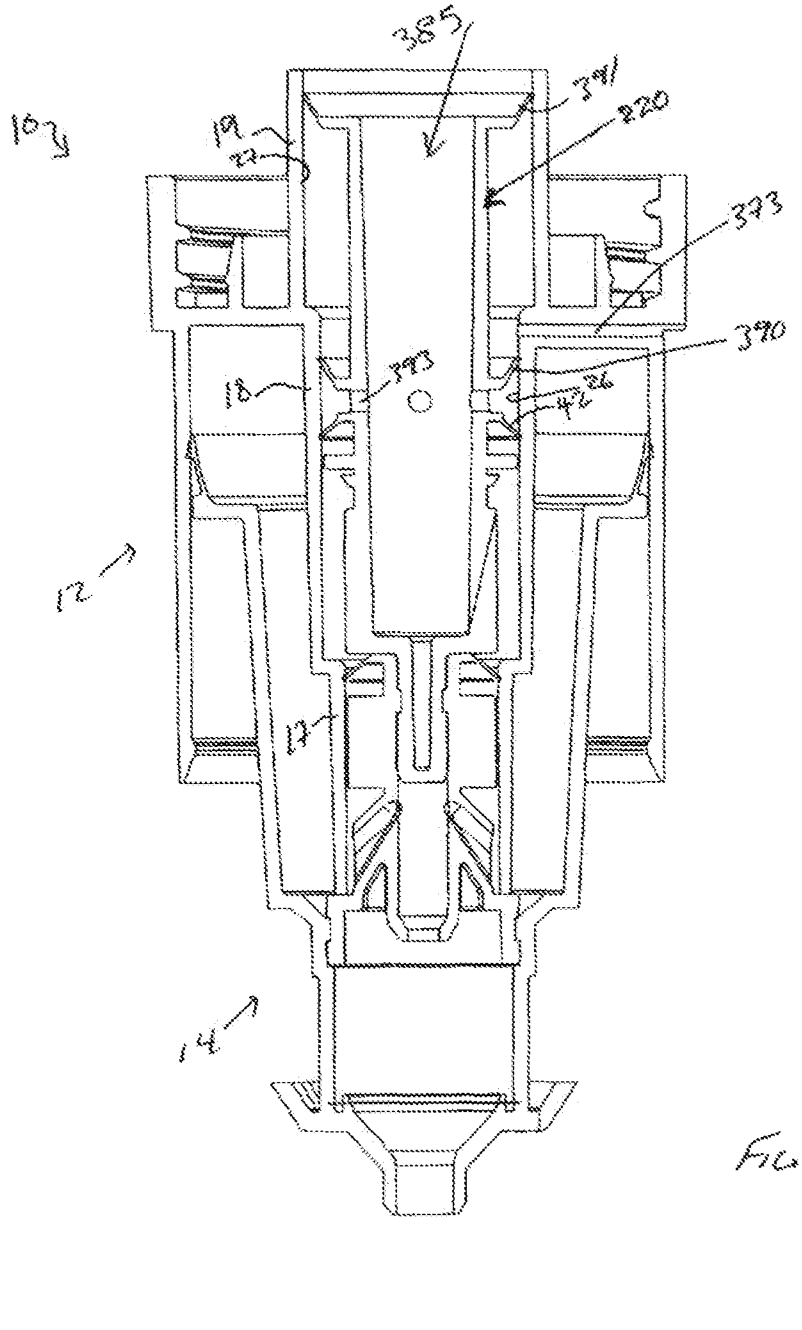
FIG. 67 is a cross-sectional front view of a piston pump in accordance with a twenty-second embodiment of a piston pump in accordance with the present invention with the piston-forming element in a fully retracted position.

Reference is made to FIG. 67 which illustrates a twenty-second embodiment of a piston pump 10 in accordance with the present invention. The piston pump 10 of the twenty-second embodiment is substantially identical to the piston pump 10 of the nineteenth embodiment of FIG. 62 with the following exceptions:

1. the inner air chamber 19 is extended axially inwardly and the annular retaining boss 372 is eliminated therefrom;

2. the air vent 380 tube of FIG. 19 which is fixed in the inner air chamber of FIG. 62 is eliminated;

3. the intermediate member 221 of the piston-forming element 10 is extended axially inwardly from the disc 42 so as to extend its hollow stem axially inwardly; a first sealing disc 390 is provided on this stem inwardly from the disc 42 for engagement with the wall 26 of the inner chamber 18 axially outwardly of the air vent channel 373; and an air vent disc 391 is provided on the inner end of this stem for engagement with the wall 27 of the inner air chamber 19 axially inwardly of the air vent channel 373.

Liquid from the bottle exits through the central passageway 385 in the stem of the intermediate member 221 to a duct 393 extending through the wall of this stem between the disc 42 and the seal disc 390 and hence is drawn by the stepped liquid pump past the disc 42 and the disc 41. An annular inner air compartment 49 is defined between the stem of the intermediate member 221 and the inner air chamber wall 27 between the sealing disc 390 and the air vent disc 391. The air vent disc 391 operates as a one-way valve when there is sufficient vacuum within the bottle to permit air to flow therepast to relieve the vacuum.

Figure 68:
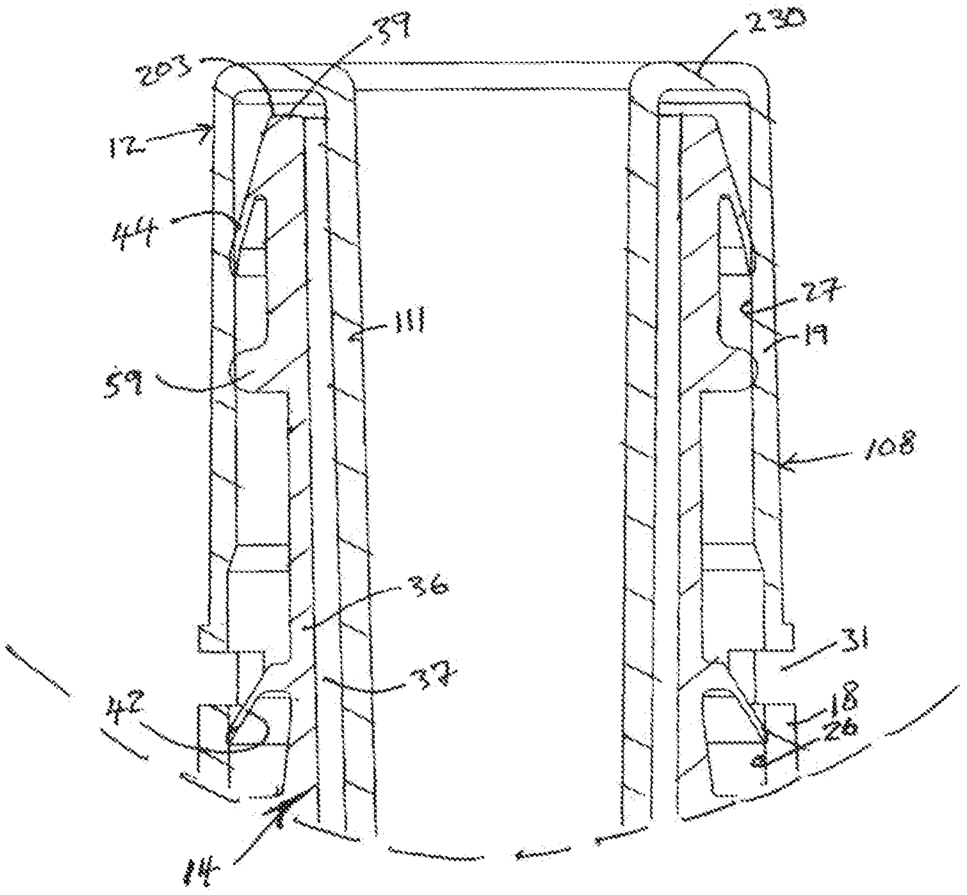
FIG. 68 is a partial cross-sectional front view of a piston pump in accordance with a twenty-third embodiment of the piston pump in accordance with the present invention with the piston-forming element in a fully retracted position.
Figure 69:
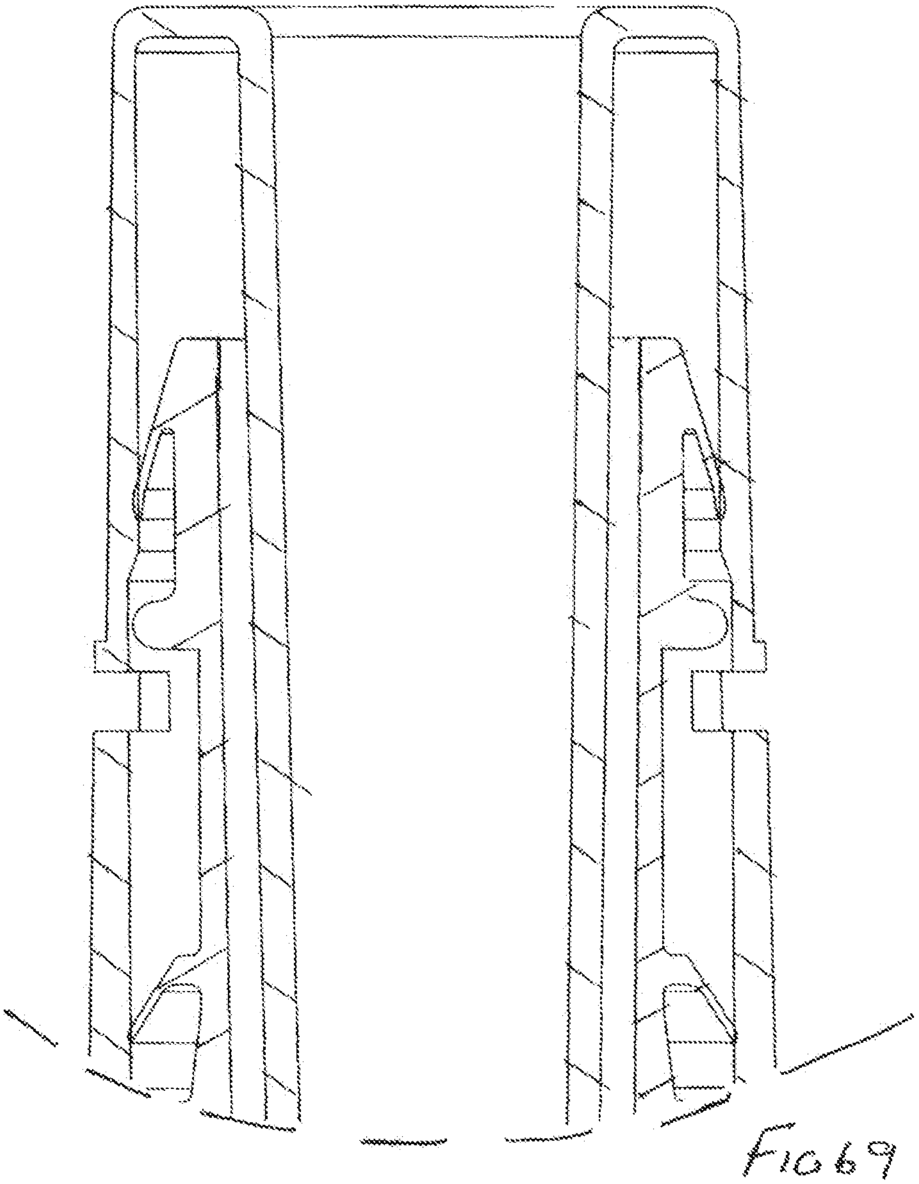
FIG. 69 is a partial cross-section front view of the pump of FIG. 68 in a fully extended position.

Reference is made to FIGS. 68 and 69 showing a twenty-third embodiment of a piston pump in accordance with the present invention. The piston pump of FIGS. 68 and 69 is identical to the piston pump of the eleventh embodiment of FIGS. 33 to 40 but for modifications shown on FIGS. 68 and 69 and in which FIG. 68 represents an enlarged view of the twenty-third embodiment within the broken line circle shown in FIG. 33 and FIG. 69 represents an enlarged view shown within the broken line shown on FIG. 34.

As seen in FIGS. 68 and 69, the piston chamber-forming member 12 is provided with the center tube 111, the annular end wall 230, with an outer tubular member 108 comprising the inner air chamber 19 and the inner chamber 18 with a transfer port 31 formed through the wall of the inner chamber 18 proximate the junction of the inner chamber 18 and the inner air chamber 19. The inner air chamber 19 is shown to have its wall 27 to be of a substantially constant cross-sectional shape, possibly tapering marginally outwardly. The wall 26 of the inner chamber 18 is of a larger diameter than the diameter of the wall 27 of the inner air chamber 19. The disc 42 is received within the inner chamber 18 axially outwardly of the air port 31. The piston-forming element 14 has the hollow stem 36 which extends inwardly to an inner end 39 of the central passageway 37 at the inner end 203 of the stem 36. Proximate the inner end 203, the stem 36 carries an air vent disc 44 which extends radially outwardly and axially outwardly for engagement with the wall 27 of the inner air chamber 19 at all times during the movement of the piston-forming element 14 from the retracted position as seen in FIG. 68 and the extended position as seen in FIG. 69. As with other embodiments such as, for example, the first embodiment of FIGS. 1 to 3, the air vent disc 44 is adapted to deflect radially inwardly away from the wall 27 of the chamber 19 to permit vacuum relief of a vacuum within a bottle when the axially outwardly directed side of the air disc 44 is open to the vacuum in the bottle.

Axially outwardly from the air vent disc 44, an air seal disc 59 is provided extending radially outwardly from the stem 36. The air seal disc 59, when received within the wall 27 of the inner air chamber 19, engages the wall 27 of the inner air chamber 19 to prevent fluid flow inwardly or outwardly therepast. When the air seal disc 59 is within the outer chamber 18, the air seal disc 59 is spaced radially inwardly from the wall 26 of the inner chamber 18 to permit fluid flow therepast. Thus, when the air seal disc 59 is in the inner chamber 18, the axially outward side of the air seal disc 44 is open to the interior of the reservoir through the transfer port 31 and vacuum relief of vacuum created within the bottle can occur if the vacuum within the bottle is sufficient to overcome the bias of the air vent disc 44 into the wall 27 of the inner air chamber 19. In the context of FIGS. 68 and 69, rather than having the inner air chamber 19 to have two portions 28 and 29 of different diameters, the same effect is achieved by reason of the air seal disc 59 entering into the larger diameter inner chamber 18 during a stroke of operation.

In FIG. 68, the inner disc 42 and the air seal disc 59 are shown as being integrally formed with the stem 36 as is possible so as to manufacture the piston-forming element as a unitary element by injection molding.

Figure 70:
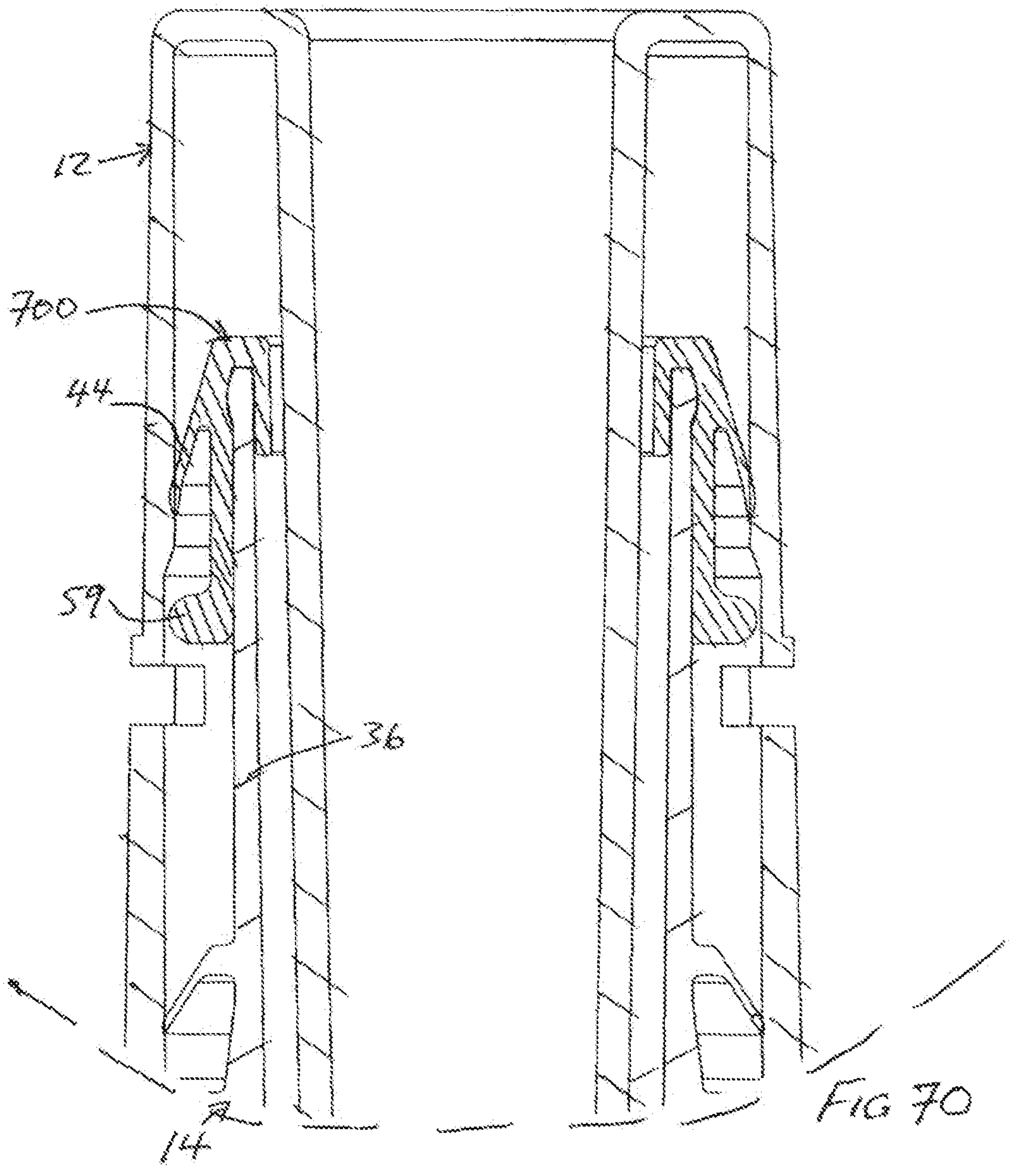
FIG. 70 is a partial cross-sectional front view of a piston pump in accordance with a twenty-fourth embodiment of the piston pump in accordance with the present invention with the piston-forming element in a fully retracted position.

Reference is made to FIG. 70 which illustrates a twenty-fourth embodiment in accordance with the present invention. The embodiment of FIG. 70 is identical to the embodiment of FIG. 9 and FIG. 70 is identical to FIG. 69 with the exception that the air vent disc 44 and the air seal disc 59 are provided on as portions of a separate annular seal member 700 which is formed as a separate part from the remainder of the stem 36 and its piston-forming element 14. The annular seal member 700 may preferably be formed from a different material more flexible and resilient that the material of the stem 36 for example to provide enhanced control of the extent to which the air disc 44 may engage the wall 27 of the inner chamber 19. For example the stem may comprise a polyethylene material. The annular seal member 700 may comprise silicon. The annular seal member is fixedly secured to the stem 36 against removal. The arrangement as illustrated in FIG. 70 with a separate annular seal member 700 as, for example, preferably formed from a silicon material may be advantageous, for example, in use of low-viscosity liquids such as alcohol which provide increased difficulties for the air vent disc 44 to be formed and provide a seal to prevent air flow into the bottle and liquid flow outwardly past the air disc seal 59.

Figure 71:
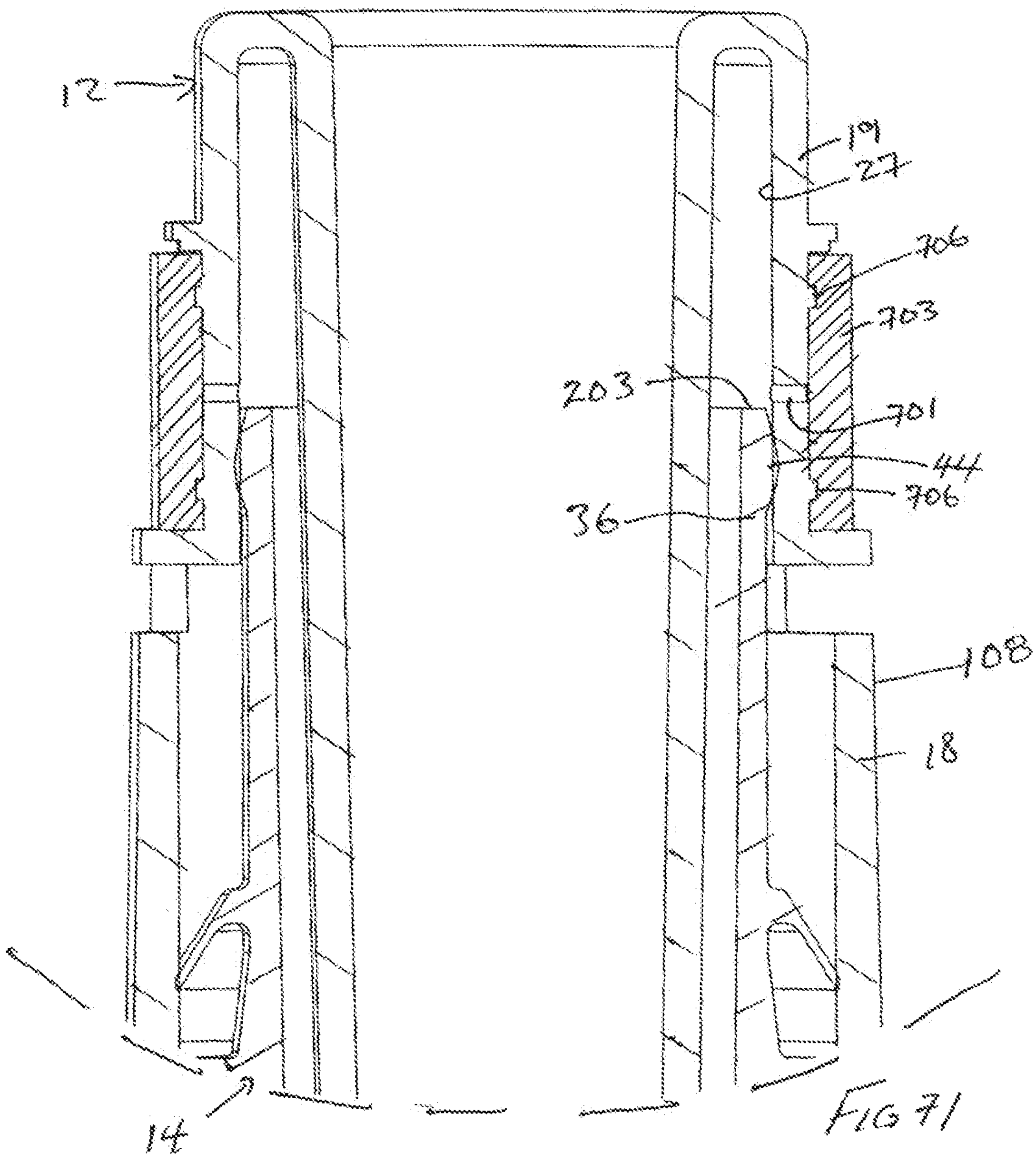
FIG. 71 is a partial cross-sectional front view of a piston pump in accordance with a twenty-fifth embodiment of the piston pump in accordance with the present invention with the piston-forming element in a fully retracted position.
Figure 72:
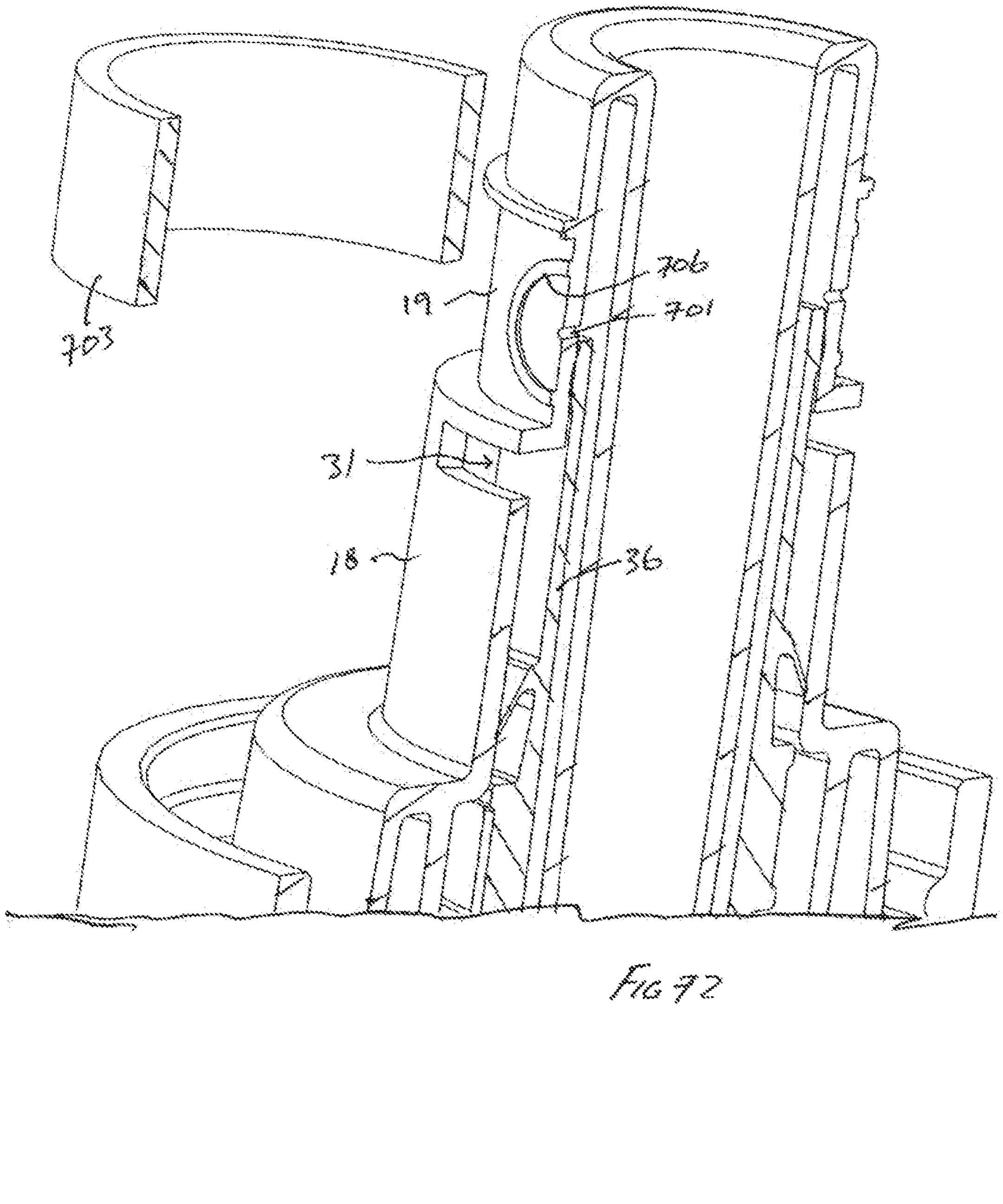
FIG. 72 is a partial exploded pictorial view of the piston pump as shown in FIG. 71.

Reference is made to FIGS. 71 and 72 which illustrate a twenty-fifth embodiment of a pump in accordance with the present invention. FIG. 71, like FIGS. 69 and 70, shows but a side view of a piston pump in the broken line circle of FIG. 34 with the pump of FIG. 71 being identical to the pump shown in the embodiment of FIGS. 33 to 40 but for the changes shown in FIG. 71.

In FIG. 71, the inner chamber 19 has a chamber wall 27 substantially of constant diameter or possibly marginally frusto-conical tapering outwardly. An air vent port 701 is provided extending axially outwardly through the chamber wall 19 at selected circumferential locations. The air vent disc 44 continues to be in a circumferential annular bead extending annularly outwardly about the stem 36 near its inner end 203 and into engagement with the wall 27 of the inner air chamber 19. When the piston-forming element 14 is in the extended position as shown in FIG. 71, the air seal disc 44 is axially outwardly of the air vent port 701. When the piston-forming element 14 is moved to a retracted position, not shown, the air vent disc 44 is moved axially inwardly and engages the wall 27 of the inner air chamber 19 axially inwardly of the air vent port 701 substantially preventing flow therepast. As can best be seen in FIG. 72 in an exploded cross-section, an annular seal ring 703 extends circumferentially about the outer tubular member 108 radially outwardly about the inner air chamber 19 so as to overlie the air vent ports 701. As shown, a circular boss 706 is provided extending radially outwardly on the axial outward surface of the inner air chamber 19 about each air vent port 701. The annular ring 703 is resilient and when engaged about the inner air chamber 19, due to its inherent bias, is biased into engagement with the circular boss 706 forming a seal which prevents flow radially inwardly through the air vent ports 701, however, the annular ring 706 may be biased against its inherent bias away from engagement with the circular boss 706 so as to permit air flow radially outwardly through the air vent ports 701 when the air seal disc 44 is located in the air chamber 19 axially outwardly of the air vent ports 701 and vacuum conditions exist in the bottle sufficiently greater than the pressure within the inner air chamber 19, such that the air vent ports 701 are open to the atmosphere as via the passageway 37 and the discharge outlet 15. In the embodiment of FIGS. 71 and 72, as in the embodiment of FIG. 70, the provision of the annular seal ring 706 as a separate member permits the annular seal ring 706 to be made of a material of enhanced resilient properties as can be advantageous to provide a positive seal against liquid flow through the air vent port as when the liquid has low viscosity such as alcohol.

While the invention has been described with reference to preferred embodiments, many modifications and variations will now occur to persons skilled in the art. For a definition of the invention, reference is made to the following claims.

We claim:

1. A piston pump for dispensing from a discharge outlet a liquid from a reservoir, comprising:

a piston chamber-forming member disposed about an axis, the piston chamber-forming member defining a pump chamber and an inner air chamber, the pump chamber in communication with the reservoir via the inner air chamber, each of the pump chamber and the inner air chamber are coaxial about the axis, the inner air chamber extending from an inner end of the pump chamber to an open inner end of the inner air chamber open into the reservoir, the inner air chamber defined within an axially extending circumferential inner air chamber wall, an air vent tube in the inner air chamber disposed coaxially about the axis, the air vent tube comprising a hollow axially extending tube stem with an axially extending tube passageway therethrough from an open axially inner end to an open axially outer end, an inner flexing disc extending radially outwardly from the tube stem between the inner end and the outer end of the air vent tube, the inner flexing disc having an elastically deformable edge portion proximate the inner air chamber wall circumferentially thereabout, the inner flexing disc substantially preventing fluid flow in the inner air chamber past the inner flexing disc in an outward direction, the inner flexing disc elastically deforming away from the inner air chamber wall to permit fluid flow in the inner air chamber past the inner flexing disc in an inward direction, a sealing disc extending radially outwardly from the tube stem spaced axially outwardly from the inner flexing disc, the sealing disc engaging the inner air chamber wall circumferentially thereabout to prevent fluid flow in the inner air chamber past the sealing disc inwardly and outwardly, an air vent channel extending through the piston chamber-forming member providing communication between the inner air chamber and atmosphere, the air vent channel open into the inner air chamber at a location on the inner air chamber wall axially between the inner flexing disc and the sealing disc, a piston-forming element, the piston-forming element coaxially slidably received in the pump chamber of the piston chamber-forming member for reciprocal axial inward and outward movement in a cycle of operation: to discharge the liquid from the pump chamber, and to draw the liquid into the pump chamber from the reservoir through the inner air chamber via the tube passageway of the air vent tube.

2. A piston pump as claimed in claim 1 wherein the air vent tube is secured to the piston chamber-forming member in the inner air chamber and is independent of the piston-forming element.

3. A piston pump as claimed in claim 1 wherein the piston-forming element having a hollow axially extending piston stem including the tube stem, the piston stem having a central passageway through the piston stem, the central passageway including the tube passageway, the central passageway extending axially inwardly from the discharge outlet at an axial outer end of the piston stem inwardly to through the open axially outer end of the tube passageway to the open axially inner end of the tube passageway, the piston stem comprising an outer pump portion for reciprocal coaxial sliding in the pump chamber and an inner portion comprising the air vent tube for reciprocal coaxial sliding in the inner air chamber, the piston stem of the piston-forming element coaxially slidably received in the piston chamber-forming member with the air vent tube in the inner air chamber and the outer pump portion in the pump chamber of the piston chamber-forming member wherein with reciprocal axial inward and outward movement the outer pump portion cooperates with the pump chamber in the cycle of operation to discharge the liquid from the pump chamber, and to draw the liquid into the pump chamber from the reservoir through the inner air chamber via the central passageway through the inner air chamber.

4. A piston pump as claimed in claim 1 wherein the air vent channel extending radially through the piston chamber-forming member from the location on the inner air chamber wall to an opening on the piston chamber-forming member open to the atmosphere.

5. A piston pump as claimed in claim 2 wherein the air vent channel extending radially through the piston chamber-forming member from the location on the inner air chamber wall to an opening on the piston chamber-forming member open to the atmosphere.

6. A piston pump as claimed in claim 3 wherein the air vent channel extending radially through the piston chamber-forming member from the location on the inner air chamber wall to an opening on the piston chamber-forming member open to the atmosphere.

7. A piston pump as claimed in claim 1 wherein the air vent channel extending radially through the piston chamber-forming member axially inwardly of the inner end of the pump chamber.

8. A piston pump as claimed in claim 1 wherein an annular collar is carried by the piston chamber-forming member annularly about inner air chamber, the annular collar open axially inwardly for sealing engagement with an outlet of the reservoir, the air vent channel extending radially through the piston chamber-forming member axially outwardly of the annular collar.

9. A piston pump as claimed in claim 2 wherein an annular collar is carried by the piston chamber-forming member annularly about inner air chamber, the annular collar open axially inwardly for sealing engagement with an outlet of the reservoir, the air vent channel extending radially through the piston chamber-forming member axially outwardly of the annular collar.

10. A piston pump as claimed in claim 3 wherein an annular collar is carried by the piston chamber-forming member annularly about inner air chamber, the annular collar open axially inwardly for sealing engagement with an outlet of the reservoir, the air vent channel extending radially through the piston chamber-forming member axially outwardly of the annular collar.

11. A piston pump as claimed in claim 4 wherein an annular collar is carried by the piston chamber-forming member annularly about inner air chamber, the annular collar open axially inwardly for sealing engagement with an outlet of the reservoir, the air vent channel extending radially through the piston chamber-forming member axially outwardly of the annular collar.

12. A piston pump as claimed in claim 5 wherein an annular collar is carried by the piston chamber-forming member annularly about inner air chamber, the annular collar open axially inwardly for sealing engagement with an outlet of the reservoir, the air vent channel extending radially through the piston chamber-forming member axially outwardly of the annular collar.

13. A piston pump as claimed in claim 6 wherein an annular collar is carried by the piston chamber-forming member annularly about inner air chamber, the annular collar open axially inwardly for sealing engagement with an outlet of the reservoir, the air vent channel extending radially through the piston chamber-forming member axially outwardly of the annular collar.

14. A piston pump as claimed in claim 13 wherein the tube stem of the air vent tube extends axially inwardly to locate the open axially inner end of the tube passageway axially inwardly of the open inner end of the inner air chamber.

15. A piston pump as claimed in claim 1 wherein the tube stem of the air vent tube increases in radius as it extends axially inwardly of the open inner end of the inner air chamber to the open axially inner end of the tube passageway axially inwardly of the open inner end of the inner air chamber.

16. A piston pump as claimed in claim 1 wherein the tube passageway is coaxially through the tube stem.

17. A piston pump as claimed in claim 2 wherein the tube passageway includes an inner portion coaxially through the tube stem of a first cross sectional area normal to the axis and an outer portion presenting the open axially inner end of the tube passageway inwardly of the open inner end of the inner air chamber to have a second cross sectional area normal to the axis less the first cross sectional area.

18. A piston pump for dispensing from a discharge outlet a liquid from a reservoir, comprising:

a piston chamber-forming member disposed about an axis, the piston chamber-forming member defining a pump chamber and an inner air chamber, the pump chamber in communication with the reservoir via the inner air chamber, each of the pump chamber and the inner air chamber are coaxial about the axis, the inner air chamber extending from an inner end of the pump chamber to an open inner end of the inner air chamber open into the reservoir, the inner air chamber defined within an axially extending circumferential inner air chamber wall, a piston-forming element, the piston-forming element having a hollow axially extending stem, the stem having a central passageway through the stem from an axial inner end to the discharge outlet at an axial outer end of the stem, the central passageway open at its axial inner end and at the discharge outlet, the stem comprising an outer pump portion for reciprocal coaxial sliding in the pump chamber and an inner portion comprising an air vent tube for reciprocal coaxial sliding in the inner air chamber, an inner flexing disc extending radially outwardly from the air vent tube, the inner flexing disc having an elastically deformable edge portion proximate the inner air chamber wall circumferentially thereabout, the inner flexing disc substantially preventing fluid flow in the inner air chamber past the inner flexing disc in an outward direction, the inner flexing disc elastically deforming away from the inner air chamber wall to permit fluid flow in the inner air chamber past the inner flexing disc in an inward direction, a sealing disc extending radially outwardly from the air vent tube spaced axially outwardly from the inner flexing disc, the sealing disc engaging the inner air chamber wall circumferentially thereabout to prevent fluid flow in the inner air chamber past the sealing disc inwardly and outwardly, the stem of the piston-forming element coaxially slidably received in the piston chamber-forming member with the air vent tube in the air inlet chamber and the outer pump portion in the pump chamber of the piston chamber-forming member wherein with reciprocal axial inward and outward movement the outer pump portion cooperates with the pump chamber in a cycle of operation to discharge the liquid from the pump chamber, and to draw the liquid into the pump chamber from the reservoir through the inner air chamber via the central passageway through the inner air chamber, an air vent channel extending through the piston chamber-forming member providing communication between the inner air chamber and atmosphere, the air vent channel open into the inner air chamber at a location on the inner air chamber wall axially between the inner flexing disc and the sealing disc.

19. A piston pump as claimed in claim 18 wherein the air vent channel extending radially through the piston chamber-forming member from the location on the inner air chamber wall to an opening on the piston chamber-forming member open to the atmosphere.

20. A piston pump as claimed in claim 19 wherein an annular collar is carried by the piston chamber-forming member annularly about inner air chamber, the annular collar open axially inwardly for sealing engagement with an outlet of the reservoir, the air vent channel extending radially through the piston chamber-forming member axially outwardly of the annular collar.

* * * * *